(12) United States Patent
Wright et al.

(10) Patent No.: US 12,406,237 B2
(45) Date of Patent: Sep. 2, 2025

(54) UNIVERSAL TOKENISATION SYSTEM FOR BLOCKCHAIN-BASED CRYPTOCURRENCIES

(71) Applicant: nChain Holdings Limited, St. John's (AG)

(72) Inventors: Craig Steven Wright, London (GB); Stephane Savanah, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 17/831,395

(22) Filed: Jun. 2, 2022

(65) Prior Publication Data
US 2022/0292471 A1 Sep. 15, 2022

Related U.S. Application Data

(62) Division of application No. 16/079,088, filed as application No. PCT/IB2017/050819 on Feb. 14, 2017, now Pat. No. 11,373,152.

(30) Foreign Application Priority Data

Feb. 23, 2016 (GB) .................................. 1603125
Mar. 11, 2016 (GB) .................................. 1604225

(51) Int. Cl.
*G06Q 20/06* (2012.01)
*G06F 16/182* (2019.01)
(Continued)

(52) U.S. Cl.
CPC ..... *G06Q 20/0658* (2013.01); *G06F 16/1834* (2019.01); *G06F 16/27* (2019.01);
(Continued)

(58) Field of Classification Search
None
See application file for complete search history.

(56) References Cited

U.S. PATENT DOCUMENTS 5,535,276 A 7/1996 Ganesan
5,600,725 A 2/1997 Rueppel et al.
(Continued)

FOREIGN PATENT DOCUMENTS

AU 2016100059 A4 3/2016
CA 2867765 A1 4/2016
(Continued)

OTHER PUBLICATIONS

Pour: "Bitcoin multisig the hard way: Understanding raw P2SH multisig transactions", Dec. 20, 2014, URL: https://www.soroushjp.com/2014/12/20/bitcoin-multisig-the-hard-way-understanding-raw-multisignature-bitcoin-transactions/ (Year: 2014).*

(Continued)

*Primary Examiner* — Patrick McAtee
*Assistant Examiner* — Jason B Fenstermacher
(74) *Attorney, Agent, or Firm* — Tarolli, Sundheim, Covell & Tummino LLP

(57) ABSTRACT

A method of creating, redeeming, and transferring tokens on a peer-to-peer distributed ledger including generating a blockchain transaction having an output related to a quantity of cryptocurrency, and a hash of a redeem script usable for spending the output. The redeem script comprises metadata, which in turn comprises a token representing a tokenised entity. The redeem script additionally comprises at least one public cryptographic key. The metadata is provided in the redeem script at a location designated in the underlying blockchain protocol as a location for a cryptographic key.

13 Claims, 13 Drawing Sheets

(51) Int. Cl.

| | |
|---|---|
| *G06F 16/27* | (2019.01) |
| *G06Q 20/38* | (2012.01) |
| *H04L 9/06* | (2006.01) |
| *H04L 9/08* | (2006.01) |
| *H04L 9/32* | (2006.01) |
| *H04L 9/00* | (2022.01) |

(52) U.S. Cl.
CPC ....... *G06Q 20/3829* (2013.01); *G06Q 20/385* (2013.01); *H04L 9/0643* (2013.01); *H04L 9/0861* (2013.01); *H04L 9/3234* (2013.01); *H04L 9/3239* (2013.01); *H04L 9/3247* (2013.01); *H04L 9/50* (2022.05); *H04L 2209/56* (2013.01)

(56) References Cited

U.S. PATENT DOCUMENTS

| | | |
|---|---|---|
| 5,761,305 A | 6/1998 | Vanstone et al. |
| 5,867,578 A | 2/1999 | Brickell et al. |
| 5,889,865 A | 3/1999 | Vanstone et al. |
| 5,896,455 A | 4/1999 | Vanstone et al. |
| 5,920,630 A | 7/1999 | Wertheimer et al. |
| 5,933,504 A | 8/1999 | Vanstone et al. |
| 6,061,449 A | 5/2000 | Candelore et al. |
| 6,078,667 A | 6/2000 | Johnson |
| 6,118,874 A | 9/2000 | Okamoto et al. |
| 6,122,736 A | 9/2000 | Vanstone et al. |
| 6,141,420 A | 10/2000 | Vanstone et al. |
| 6,286,098 B1 | 9/2001 | Wenig et al. |
| 6,487,660 B1 | 11/2002 | Vanstone et al. |
| 6,490,352 B1 | 12/2002 | Schroeppel |
| 6,618,483 B1 | 9/2003 | Vanstone et al. |
| 6,662,299 B1 | 12/2003 | Price, III |
| 6,704,870 B2 | 3/2004 | Vanstone et al. |
| 6,785,813 B1 | 8/2004 | Vanstone et al. |
| 6,792,530 B1 | 9/2004 | Qu et al. |
| 6,819,766 B1 | 11/2004 | Weidong |
| 6,876,745 B1 | 4/2005 | Kurumatani |
| 7,003,665 B1 | 2/2006 | Dultz et al. |
| 7,006,633 B1 | 2/2006 | Reece |
| 7,095,851 B1 | 8/2006 | Scheidt |
| 7,181,017 B1 | 2/2007 | Nagel et al. |
| 7,912,747 B2 | 3/2011 | Sachedina |
| 7,929,702 B2 | 4/2011 | Brown et al. |
| 7,970,135 B1 | 6/2011 | Schwenk |
| 8,166,481 B2 | 4/2012 | Dadiomov et al. |
| 8,401,185 B1 | 3/2013 | Telang |
| 8,520,855 B1 | 8/2013 | Kohno et al. |
| 8,522,011 B2 | 8/2013 | Spalka et al. |
| 8,855,318 B1 | 10/2014 | Patnala et al. |
| 9,209,980 B2 | 12/2015 | Bowman et al. |
| 9,251,531 B2 | 2/2016 | Sarkissian |
| 9,258,130 B2 | 2/2016 | Hwang et al. |
| 9,298,806 B1 | 3/2016 | Vessenes et al. |
| 9,350,549 B2 | 5/2016 | Lumb |
| 9,436,923 B1 | 9/2016 | Sriram et al. |
| 9,641,338 B2 | 5/2017 | Sriram et al. |
| 9,673,975 B1 | 6/2017 | Machani |
| 9,961,030 B2 | 5/2018 | Murphy et al. |
| 10,050,779 B2 | 8/2018 | Alness et al. |
| 10,068,228 B1 | 9/2018 | Winklevoss et al. |
| 10,354,325 B1 | 7/2019 | Skala et al. |
| 10,510,053 B2 | 12/2019 | Armstrong |
| 10,516,527 B1 | 12/2019 | Machani et al. |
| 10,659,223 B2 | 5/2020 | Wright et al. |
| 10,719,816 B1 | 7/2020 | Kurani |
| 11,115,196 B1 | 9/2021 | Triandopoulos et al. |
| 11,188,907 B1 | 11/2021 | Vijayvergia et al. |
| 11,372,455 B2 | 6/2022 | Gauthier, Jr. |
| 11,455,378 B2 | 9/2022 | Wright et al. |
| 11,663,609 B2 | 5/2023 | Christidis et al. |
| 2001/0002486 A1 | 5/2001 | Kocher et al. |
| 2001/0050990 A1 | 12/2001 | Sudia |
| 2002/0112171 A1 | 8/2002 | Ginter et al. |
| 2002/0198791 A1 | 12/2002 | Perkowski |
| 2003/0026432 A1 | 2/2003 | Woodward |
| 2003/0046202 A1 | 3/2003 | Knapp |
| 2003/0048906 A1 | 3/2003 | Vora et al. |
| 2003/0081785 A1 | 5/2003 | Boneh et al. |
| 2003/0188153 A1 | 10/2003 | Demoff et al. |
| 2004/0030932 A1 | 2/2004 | Juels et al. |
| 2004/0049687 A1 | 3/2004 | Orsini et al. |
| 2004/0078775 A1 | 4/2004 | Chow et al. |
| 2004/0111484 A1 | 6/2004 | Young et al. |
| 2004/0190181 A1 | 9/2004 | Hikosaka et al. |
| 2004/0193890 A1 | 9/2004 | Girault |
| 2004/0252831 A1 | 12/2004 | Uehara |
| 2005/0071283 A1 | 3/2005 | Randle et al. |
| 2005/0094806 A1 | 5/2005 | Jao et al. |
| 2005/0138374 A1 | 6/2005 | Zheng et al. |
| 2006/0023887 A1 | 2/2006 | Agrawal et al. |
| 2006/0034494 A1 | 2/2006 | Holloran |
| 2006/0153365 A1 | 7/2006 | Beeson |
| 2006/0153366 A1 | 7/2006 | Beeson |
| 2006/0153367 A1 | 7/2006 | Beeson |
| 2006/0153368 A1 | 7/2006 | Beeson |
| 2006/0153370 A1 | 7/2006 | Beeson |
| 2006/0156012 A1 | 7/2006 | Beeson |
| 2006/0156013 A1 | 7/2006 | Beeson |
| 2006/0161485 A1 | 7/2006 | Meldahl |
| 2006/0173788 A1 | 8/2006 | Nath Pandya et al. |
| 2006/0179319 A1 | 8/2006 | Krawczyk |
| 2006/0242038 A1 | 10/2006 | Giudilli |
| 2006/0248114 A1 | 11/2006 | Anderson et al. |
| 2007/0055880 A1 | 3/2007 | Lauter et al. |
| 2007/0165843 A1 | 7/2007 | Lauter et al. |
| 2007/0192842 A1 | 8/2007 | Beaulieu et al. |
| 2007/0223706 A1 | 9/2007 | Gantman et al. |
| 2007/0265978 A1 | 11/2007 | Kahn et al. |
| 2007/0269040 A1 | 11/2007 | Yuval et al. |
| 2007/0276836 A1 | 11/2007 | Chatterjee et al. |
| 2007/0288320 A1 | 12/2007 | Cooper et al. |
| 2008/0048022 A1 | 2/2008 | Vawter |
| 2008/0082817 A1 | 4/2008 | Takahashi et al. |
| 2008/0101596 A1 | 5/2008 | Cerruti et al. |
| 2008/0137857 A1 | 6/2008 | Bellare et al. |
| 2008/0144836 A1 | 6/2008 | Sanders et al. |
| 2008/0165955 A1 | 7/2008 | Ibrahim |
| 2008/0195499 A1 | 8/2008 | Meredith et al. |
| 2008/0260143 A1 | 10/2008 | Ibrahim |
| 2008/0263357 A1 | 10/2008 | Boyen |
| 2008/0285759 A1 | 11/2008 | Shaw |
| 2008/0288773 A1 | 11/2008 | Nguyen et al. |
| 2009/0022311 A1 | 1/2009 | Vanstone et al. |
| 2009/0048979 A1 | 2/2009 | Al-Herz et al. |
| 2009/0074179 A1 | 3/2009 | Futa et al. |
| 2009/0161876 A1 | 6/2009 | Sherkin |
| 2009/0282243 A1 | 11/2009 | Rose et al. |
| 2010/0005302 A1 | 1/2010 | Vishnu et al. |
| 2010/0023771 A1 | 1/2010 | Struik |
| 2010/0031369 A1 | 2/2010 | Grummt |
| 2010/0037055 A1 | 2/2010 | Fazio et al. |
| 2010/0042839 A1 | 2/2010 | Ho |
| 2010/0054458 A1 | 3/2010 | Schneider |
| 2010/0054480 A1 | 3/2010 | Schneider |
| 2010/0131752 A1 | 5/2010 | Flegel |
| 2010/0131755 A1 | 5/2010 | Zhu et al. |
| 2010/0134848 A1 | 6/2010 | Lynggaard et al. |
| 2010/0146292 A1 | 6/2010 | Shi et al. |
| 2010/0150341 A1 | 6/2010 | Dodgson et al. |
| 2010/0172501 A1 | 7/2010 | Tian et al. |
| 2010/0199095 A1 | 8/2010 | Ho |
| 2010/0217986 A1 | 8/2010 | Schneider |
| 2010/0228973 A1 | 9/2010 | Dancer et al. |
| 2010/0241848 A1 | 9/2010 | Smith et al. |
| 2010/0268778 A1 | 10/2010 | Kim et al. |
| 2010/0312810 A1* | 12/2010 | Horton .................... G06F 21/10 707/812 |
| 2011/0016510 A1 | 1/2011 | Matsuda et al. |
| 2011/0022854 A1 | 1/2011 | Macchetti et al. |
| 2011/0058672 A1 | 3/2011 | Sannino et al. |
| 2011/0202773 A1 | 8/2011 | Ghouti et al. |
| 2011/0208790 A1 | 8/2011 | Brown et al. |

(56) References Cited

U.S. PATENT DOCUMENTS

| | | |
|---|---|---|
| 2011/0208970 A1 | 8/2011 | Brown et al. |
| 2011/0246766 A1 | 10/2011 | Orsini et al. |
| 2011/0307698 A1 | 12/2011 | Vanstone |
| 2011/0311051 A1 | 12/2011 | Resch et al. |
| 2012/0011362 A1 | 1/2012 | Lambert |
| 2012/0039474 A1 | 2/2012 | Ho |
| 2012/0100833 A1 | 4/2012 | Gao |
| 2012/0198228 A1 | 8/2012 | Oberheide et al. |
| 2012/0214441 A1 | 8/2012 | Raleigh |
| 2012/0233674 A1 | 9/2012 | Gladstone et al. |
| 2012/0243687 A1 | 9/2012 | Li et al. |
| 2012/0284794 A1 | 11/2012 | Trent et al. |
| 2012/0290830 A1 | 11/2012 | Resch et al. |
| 2012/0331287 A1 | 12/2012 | Bowman et al. |
| 2013/0030941 A1 | 1/2013 | Meredith et al. |
| 2013/0034642 A1 | 2/2013 | Eckstrom |
| 2013/0051552 A1 | 2/2013 | Handschuh et al. |
| 2013/0061049 A1 | 3/2013 | Irvine |
| 2013/0077783 A1 | 3/2013 | Anshel et al. |
| 2013/0103945 A1 | 4/2013 | Cannon et al. |
| 2013/0159413 A1 | 6/2013 | Davis et al. |
| 2013/0177157 A1 | 7/2013 | Li et al. |
| 2013/0191632 A1 | 7/2013 | Spector et al. |
| 2013/0198104 A1 | 8/2013 | Parker |
| 2013/0287210 A1 | 10/2013 | Matsuda et al. |
| 2013/0304642 A1 | 11/2013 | Campos |
| 2013/0305057 A1 | 11/2013 | Greco et al. |
| 2013/0305333 A1 | 11/2013 | Katzer et al. |
| 2013/0318578 A1 | 11/2013 | Palagummi |
| 2013/0318588 A1 | 11/2013 | Metzger |
| 2014/0012751 A1 | 1/2014 | Kuhn et al. |
| 2014/0068246 A1 | 3/2014 | Hartley et al. |
| 2014/0082358 A1 | 3/2014 | Nakhjiri et al. |
| 2014/0108473 A1 | 4/2014 | Nowoczynski et al. |
| 2014/0129441 A1 | 5/2014 | Blanco et al. |
| 2014/0129844 A1 | 5/2014 | Johnson et al. |
| 2014/0188719 A1 | 7/2014 | Poornachandran et al. |
| 2014/0195425 A1 | 7/2014 | Campos et al. |
| 2014/0223580 A1 | 8/2014 | Neivanov et al. |
| 2014/0250006 A1 | 9/2014 | Makhotin et al. |
| 2014/0270401 A1 | 9/2014 | Irwin et al. |
| 2014/0330923 A1 | 11/2014 | Baptist et al. |
| 2015/0006386 A1 | 1/2015 | Tebbe |
| 2015/0024764 A1 | 1/2015 | Dochow et al. |
| 2015/0039470 A1 | 2/2015 | Crites |
| 2015/0052369 A1 | 2/2015 | Koning et al. |
| 2015/0066748 A1 | 3/2015 | Winslow et al. |
| 2015/0086020 A1 | 3/2015 | Harjula et al. |
| 2015/0089616 A1 | 3/2015 | Brezinski et al. |
| 2015/0095648 A1 | 4/2015 | Nix |
| 2015/0120567 A1 | 4/2015 | Van Rooyen et al. |
| 2015/0120569 A1 | 4/2015 | Belshe et al. |
| 2015/0124961 A1 | 5/2015 | Lambert et al. |
| 2015/0154562 A1 | 6/2015 | Emmerson |
| 2015/0170112 A1 | 6/2015 | DeCastro |
| 2015/0188698 A1 | 7/2015 | Tsai |
| 2015/0188700 A1 | 7/2015 | Ben Saied et al. |
| 2015/0205929 A1 | 7/2015 | Brama |
| 2015/0206106 A1 | 7/2015 | Yago |
| 2015/0213433 A1 | 7/2015 | Khan |
| 2015/0244690 A1 | 8/2015 | Mossbarger |
| 2015/0254463 A1 | 9/2015 | Ryhorchuk et al. |
| 2015/0254639 A1 | 9/2015 | Radu |
| 2015/0256347 A1 | 9/2015 | Tseng et al. |
| 2015/0262139 A1 | 9/2015 | Shtylman |
| 2015/0262140 A1 | 9/2015 | Armstrong |
| 2015/0269570 A1 | 9/2015 | Phan et al. |
| 2015/0278780 A1 | 10/2015 | Vaidyanathan et al. |
| 2015/0294425 A1 | 10/2015 | Benson |
| 2015/0296570 A1 | 10/2015 | Altamura et al. |
| 2015/0302401 A1 | 10/2015 | Metral |
| 2015/0304302 A1 | 10/2015 | Zhang |
| 2015/0310497 A1 | 10/2015 | Valin et al. |
| 2015/0324764 A1 | 11/2015 | Van Rooyen et al. |
| 2015/0324789 A1 | 11/2015 | Dvorak et al. |
| 2015/0332224 A1 | 11/2015 | Melika et al. |
| 2015/0332395 A1* | 11/2015 | Walker ............... G06Q 20/3678 705/69 |
| 2015/0348017 A1 | 12/2015 | Allmen |
| 2015/0349958 A1 | 12/2015 | Lindell |
| 2015/0350171 A1 | 12/2015 | Brumley |
| 2015/0356523 A1 | 12/2015 | Madden |
| 2015/0363768 A1 | 12/2015 | Melika et al. |
| 2015/0363770 A1* | 12/2015 | Ronca ................. G06Q 20/382 705/64 |
| 2015/0363773 A1 | 12/2015 | Ronca et al. |
| 2015/0363777 A1 | 12/2015 | Ronca et al. |
| 2015/0371224 A1 | 12/2015 | Lingappa |
| 2015/0379510 A1 | 12/2015 | Smith |
| 2015/0381729 A1 | 12/2015 | Manohar et al. |
| 2016/0012465 A1 | 1/2016 | Sharp |
| 2016/0026918 A1 | 1/2016 | Barbieri et al. |
| 2016/0027229 A1 | 1/2016 | Spanos et al. |
| 2016/0028552 A1 | 1/2016 | Spanos et al. |
| 2016/0055511 A1 | 2/2016 | Chidella et al. |
| 2016/0055583 A1 | 2/2016 | Liberty et al. |
| 2016/0065370 A1 | 3/2016 | Le Saint et al. |
| 2016/0071108 A1 | 3/2016 | Caldera et al. |
| 2016/0085955 A1 | 3/2016 | Lerner |
| 2016/0086175 A1 | 3/2016 | Finlow-Bates et al. |
| 2016/0092870 A1 | 3/2016 | Salama et al. |
| 2016/0092988 A1 | 3/2016 | Letourneau |
| 2016/0098723 A1 | 4/2016 | Feeney |
| 2016/0132684 A1 | 5/2016 | Barbas et al. |
| 2016/0140335 A1 | 5/2016 | Proulx et al. |
| 2016/0149878 A1 | 5/2016 | Pogorelik et al. |
| 2016/0162897 A1 | 6/2016 | Feeney |
| 2016/0203522 A1 | 7/2016 | Shiffert et al. |
| 2016/0203572 A1 | 7/2016 | Mcconaghy et al. |
| 2016/0210617 A1 | 7/2016 | Leger |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1 | 9/2016 | Ford |
| 2016/0269182 A1 | 9/2016 | Sriram et al. |
| 2016/0275294 A1 | 9/2016 | Irvine |
| 2016/0275492 A1 | 9/2016 | Brickell et al. |
| 2016/0283941 A1 | 9/2016 | Andrade |
| 2016/0292672 A1 | 10/2016 | Fay et al. |
| 2016/0294562 A1 | 10/2016 | Oberheide et al. |
| 2016/0321434 A1 | 11/2016 | McCoy et al. |
| 2016/0335533 A1 | 11/2016 | Davis et al. |
| 2016/0335924 A1 | 11/2016 | Ikarashi et al. |
| 2016/0337119 A1 | 11/2016 | Hosaka et al. |
| 2016/0337124 A1 | 11/2016 | Rozman |
| 2016/0342977 A1 | 11/2016 | Lam |
| 2016/0342994 A1 | 11/2016 | Davis |
| 2016/0344543 A1 | 11/2016 | Alness et al. |
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2016/0381010 A1 | 12/2016 | Bhandari et al. |
| 2017/0005804 A1* | 1/2017 | Zinder ................. H04L 9/3239 |
| 2017/0011394 A1 | 1/2017 | Kumar et al. |
| 2017/0012948 A1 | 1/2017 | Peeters et al. |
| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046668 A1 | 2/2017 | Rowley et al. |
| 2017/0046693 A1 | 2/2017 | Haldenby et al. |
| 2017/0046698 A1 | 2/2017 | Haldenby et al. |
| 2017/0046792 A1 | 2/2017 | Haldenby et al. |
| 2017/0046806 A1* | 2/2017 | Haldenby ............ G06Q 20/405 |
| 2017/0061138 A1 | 3/2017 | Lambert |
| 2017/0061833 A1 | 3/2017 | Joye et al. |
| 2017/0075877 A1 | 3/2017 | Lepeltier |
| 2017/0083907 A1 | 3/2017 | McDonough et al. |
| 2017/0083910 A1 | 3/2017 | Kraemer et al. |
| 2017/0091148 A1 | 3/2017 | Takahashi |
| 2017/0091750 A1 | 3/2017 | Maim |
| 2017/0091764 A1 | 3/2017 | Lloyd et al. |
| 2017/0103385 A1 | 4/2017 | Wilson, Jr. et al. |
| 2017/0109540 A1 | 4/2017 | Heiman et al. |

(56) References Cited

U.S. PATENT DOCUMENTS

| | | | |
|---|---|---|---|
| 2017/0116608 A1 | 4/2017 | Forzley et al. | |
| 2017/0124348 A1 | 5/2017 | Pourzandi et al. | |
| 2017/0132620 A1 | 5/2017 | Miller et al. | |
| 2017/0132621 A1 | 5/2017 | Miller et al. | |
| 2017/0148016 A1 | 5/2017 | Davis | |
| 2017/0154331 A1 | 6/2017 | Voorhees | |
| 2017/0154391 A1 | 6/2017 | Watkins et al. | |
| 2017/0169403 A1 | 6/2017 | Zhang | |
| 2017/0178237 A1 | 6/2017 | Wong | |
| 2017/0178263 A1 | 6/2017 | Kraemer et al. | |
| 2017/0185527 A1 | 6/2017 | Ueda | |
| 2017/0187535 A1* | 6/2017 | Middleton | H04L 9/3247 |
| 2017/0200137 A1 | 7/2017 | Vilmont | |
| 2017/0228547 A1 | 8/2017 | Smith et al. | |
| 2017/0243193 A1 | 8/2017 | Manian et al. | |
| 2017/0243214 A1 | 8/2017 | Johnsrud et al. | |
| 2017/0250801 A1 | 8/2017 | Chen et al. | |
| 2017/0300877 A1 | 10/2017 | Mann et al. | |
| 2017/0308580 A1 | 10/2017 | Naganuma et al. | |
| 2017/0316390 A1 | 11/2017 | Smith et al. | |
| 2017/0324663 A1 | 11/2017 | Menase | |
| 2017/0324715 A1 | 11/2017 | Frincu et al. | |
| 2018/0025670 A1 | 1/2018 | Karashi et al. | |
| 2018/0034810 A1 | 2/2018 | Pe'Er et al. | |
| 2018/0109377 A1 | 4/2018 | Fu | |
| 2018/0123780 A1 | 5/2018 | Ikarashi | |
| 2018/0131512 A1 | 5/2018 | Gajek | |
| 2018/0146367 A1 | 5/2018 | Altin et al. | |
| 2018/0176017 A1 | 6/2018 | Rodriguez et al. | |
| 2018/0176222 A1 | 6/2018 | Bhaskar et al. | |
| 2018/0225431 A1 | 8/2018 | Karashi et al. | |
| 2018/0240107 A1 | 8/2018 | Andrade | |
| 2018/0247191 A1 | 8/2018 | Katz et al. | |
| 2018/0285840 A1 | 10/2018 | Hasan | |
| 2018/0341648 A1 | 11/2018 | Kakavand et al. | |
| 2018/0349572 A1 | 12/2018 | Chen et al. | |
| 2018/0367298 A1 | 12/2018 | Wright et al. | |
| 2018/0376318 A1 | 12/2018 | Wang et al. | |
| 2019/0014094 A1 | 1/2019 | Le Saint | |
| 2019/0034936 A1 | 1/2019 | Nolan et al. | |
| 2019/0080321 A1 | 3/2019 | Mundis et al. | |
| 2019/0080404 A1 | 3/2019 | Molinari et al. | |
| 2019/0080406 A1 | 3/2019 | Molinari et al. | |
| 2019/0130368 A1 | 5/2019 | Li et al. | |
| 2019/0149337 A1 | 5/2019 | Savanah et al. | |
| 2019/0158470 A1 | 5/2019 | Wright et al. | |
| 2019/0188793 A1 | 6/2019 | Molinari et al. | |
| 2019/0199531 A1 | 6/2019 | Staples et al. | |
| 2019/0220859 A1 | 7/2019 | Weight et al. | |
| 2019/0229911 A1 | 7/2019 | Allen | |
| 2019/0238334 A1 | 8/2019 | Nakamura | |
| 2019/0266132 A1 | 8/2019 | Rubenstein | |
| 2019/0305863 A1 | 10/2019 | Fayyad | |
| 2019/0340352 A1 | 11/2019 | Peeters et al. | |
| 2019/0349733 A1 | 11/2019 | Nolan et al. | |
| 2019/0378139 A1 | 12/2019 | Stribady et al. | |
| 2019/0392118 A1 | 12/2019 | Elden et al. | |
| 2019/0392536 A1 | 12/2019 | Rice | |
| 2020/0026785 A1 | 1/2020 | Patangia et al. | |
| 2020/0250176 A1 | 8/2020 | Padmanabhan | |
| 2020/0285935 A1 | 9/2020 | Song et al. | |
| 2021/0056070 A1 | 2/2021 | Kakavand et al. | |
| 2021/0194677 A1 | 6/2021 | Pourzandi et al. | |
| 2021/0409489 A1 | 12/2021 | Speasl et al. | |

FOREIGN PATENT DOCUMENTS

| | | |
|---|---|---|
| CN | 1262007 A | 8/2000 |
| CN | 101447980 A | 6/2009 |
| CN | 101477669 A | 7/2009 |
| CN | 102144371 A | 8/2011 |
| CN | 102938036 A | 2/2013 |
| CN | 103440209 A | 12/2013 |
| CN | 103795529 A | 5/2014 |
| CN | 103927656 A | 7/2014 |
| CN | 104320262 A | 1/2015 |
| CN | 104331516 A | 2/2015 |
| CN | 104392354 A | 3/2015 |
| CN | 104463001 A | 3/2015 |
| CN | 104620535 A | 5/2015 |
| CN | 104704504 A | 6/2015 |
| CN | 105204802 A | 12/2015 |
| CN | 105306194 A | 2/2016 |
| CN | 105323064 A | 2/2016 |
| CN | 106022917 A | 10/2016 |
| CN | 106411503 A | 2/2017 |
| DE | 102010002241 B4 | 3/2012 |
| EP | 1477882 A2 | 11/2004 |
| EP | 2237473 A1 | 10/2010 |
| EP | 2538606 A1 | 12/2012 |
| EP | 2975570 A1 | 1/2016 |
| EP | 3010176 A1 | 4/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11239124 A | 8/1999 |
| JP | H11289324 A | 10/1999 |
| JP | 2000502553 A | 2/2000 |
| JP | 2001195479 A | 7/2001 |
| JP | 2002026895 A | 1/2002 |
| JP | 2004192587 A | 7/2004 |
| JP | 2004246882 A | 9/2004 |
| JP | 2006293764 A | 10/2006 |
| JP | 2007036910 A | 2/2007 |
| JP | 2007067631 A | 3/2007 |
| JP | 2007242221 A | 9/2007 |
| JP | 2008136063 A | 6/2008 |
| JP | 2008146601 A | 6/2008 |
| JP | 2009105824 A | 5/2009 |
| JP | 2009171292 A | 7/2009 |
| JP | 2009526411 A | 7/2009 |
| JP | 2010053320 A | 1/2010 |
| JP | 2010219912 A | 9/2010 |
| JP | 2011082662 A | 4/2011 |
| JP | 2011211461 A | 10/2011 |
| JP | 2012515393 A | 7/2012 |
| JP | 2014068140 A | 4/2014 |
| JP | A2014078770 A | 5/2014 |
| JP | 2014153583 A | 8/2014 |
| JP | 2015536617 A | 12/2015 |
| JP | 5858506 B1 | 2/2016 |
| JP | 5858507 B1 | 2/2016 |
| JP | 2019512909 A | 5/2019 |
| KR | 20110012085 A | 2/2011 |
| KR | 101544722 B1 | 8/2015 |
| KR | 101579232 B1 | 1/2016 |
| KR | 20160009716 A | 1/2016 |
| RU | 2015108134 A | 10/2016 |
| RU | 2015109271 A | 10/2016 |
| TW | 201202975 A | 1/2012 |
| WO | 2005096542 A1 | 10/2005 |
| WO | 2005107141 A1 | 11/2005 |
| WO | 2007113040 A1 | 10/2007 |
| WO | 2012039474 A1 | 3/2012 |
| WO | 2012054785 A1 | 4/2012 |
| WO | 2013034278 A2 | 3/2013 |
| WO | 2013053058 A1 | 4/2013 |
| WO | 2015127789 A1 | 9/2015 |
| WO | 2015142765 A1 | 9/2015 |
| WO | 2015171580 A1 | 11/2015 |
| WO | 2015175854 A2 | 11/2015 |
| WO | 2015188151 A1 | 12/2015 |
| WO | 2015194798 A1 | 12/2015 |
| WO | 2016022864 A2 | 2/2016 |
| WO | 2016137360 A2 | 9/2016 |
| WO | 2016137499 A1 | 9/2016 |
| WO | 2016161073 A1 | 10/2016 |

(56) References Cited

FOREIGN PATENT DOCUMENTS

| WO | 2017006134 A1 | 1/2017 |
|---|---|---|
| WO | 2017112664 A1 | 6/2017 |

OTHER PUBLICATIONS

Gauthierdickey, et al. "Secure Peer-to-Peer Trading in Small and Large Scale Multiplayer Games", Multimedia Systems, Apr. 29, 2014, 13 pages.

Feng et al., "A Next Generation Cryptocurrency Platform Ethereum and Its Evaluation", Oct. 14, 2015, 12 pages.

Ramaswami, U., et al., "Genotype and Phenotype in Hypochondroplasia", 1998, Mosby, Inc., 5 pages.

UK Commercial Search Report mailed Jan. 18, 2017, Patent Application No. GB510135, filed Mar. 16, 2016, 5 pages.

UK IPO Search Report mailed Sep. 9, 2016, Patent Application No. GB1605571.7, filed Apr. 1, 2016, 5 pages.

Vayngrib, "DHT hardening," GitHub, https://github.com/tradle/about/wiki/DHT-hardening, Feb. 2, 2015 (last updated May 21, 2015) [retrieved Dec. 13, 2018], 5 pages.

Vayngrib, "Future, operating business on chain," Github.com, May 4, 2015 [retrieved Jan. 30, 2017], https://github.com/tradle/about/wiki/Future,-operating-business-on-chain, 9 pages.

Vietnamese Office Action mailed Sep. 27, 2018, Patent Application No. 1-2018-03358, filed Feb. 16, 2017, 2 pages.

Walport et al., "Distributed Ledger Technology: beyond block chain—A report by the UK Government Chief Scientific Adviser," United Kingdom Government Office for Science, Dec. 2015, 88 pages.

Watanabe et al., "Blockchain contract: A complete consensus using blockchain," IEEE 4th Global Conference on Consumer Electronics, Oct. 27, 2015, 3 pages.

Weller et al., "CounterpartyXCP/Documentation: Protocol Specification," Github.com, Jan. 25, 2015 (last edited Jun. 17, 2019) [retrieved Jan. 13, 2020], https://github.com/CounterpartyXCP/Documentation/blob/master/Developers/protocol_specification.md, 10 pages.

White, "How Computers Work," Que Publishing 7th Edition, Oct. 15, 2003, 44 pages.

Whitequark, "#bitcoin-wizards on Jul. 30, 2015—irc logs at whitequark.org," whitequark.org, https://irclog.whitequark.org/bitcoin-wizards/2015-07-30, Jul. 30, 2015 [retrieved Dec. 12, 2018], 8 pages.

Wikipedia, "Counterparty (platform)," Wikipedia, the Free Encyclopedia, last edited Dec. 6, 2019 [retrieved Jan. 13, 2020], https://en.wikipedia.org/wiki/Counterparty_(platform), 2 pages.

Wikipedia, "Shamir's Secret Sharing," Wikipedia the Free Encyclopedia, Jan. 20, 2017 version [retrieved on Jan. 9, 2019], https://en.wikipedia.org/w/index.php?title=Shamir's_Secret_Sharing&oldid=761082071, 6 pages.

Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.

Willet et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 69 pages.

Willoms et al., "Using blockchain to save and verify software licensing," Bitcoin Forum, https://bitcointalk.org/index.php?topic=671435.0, Jun. 30, 2014 [retrieved Dec. 13, 2018], 3 pages.

Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.

Wright, "Registry and Automated Management Method for Blockchain Enforced Smart Contracts," U.S. Appl. No. 15/138,717, filed Apr. 26, 2016.

Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), pages.

Yaokai et al., "Experimental evaluation of the next-generation cryptocurrency platform Ethereum," CSS2015 Computer Security Symposium 2015 Proceedings 2015(3):1151-1158, Oct. 14, 2015.

Zhang et al., "AntShare Trading Platform," Github.com, Jun. 3, 2016 (last edited Aug. 21, 2016) [retrieved Jan. 30, 2017], https://github.com/AntShares/AntShares/wiki/Whitepaper-1.1, 9 pages.

Zyskind et al., "Decentralizing Privacy: Using a Blockchain to Protect Personal Data," 2015 IEEE CS Security and Privacy Workshops, May 21, 2015, 5 pages.

Zyskind et al., "Enigma: Decentralized Computation Platform with Guaranteed Privacy," arXiv preprint arXiv:1506, Jun. 10, 2015, 14 pages.

Zindros, Dionysis, "A Pseudonymous Trust System for a Decentralized Anonymous Marketplace", web-of-trust.md, https://gist.github.com/dionyziz/e3b296861175e0ebea4b, Jul. 2, 2014, 30 pages.

Subramanian, et al., "The State of Cryptocurrencies, Their Issues and Policy Interactions", International Information Management Association, vol. 24, No. 24, No. 3, 2015, pp. 25-40.

Abeikverdi et al., "Generating interactive, secure multiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.

Akutsu et al., "Taking on the challenge of creating epoch-making services that impress users. For services that can share the excitement of competitions around the world," NTT Technical Journal 27(5):10-14, May 1, 2015.

Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-contract-systems-ethereums-ours-1530490, Nov. 25, 2015 [retrieved Dec. 12, 2018], 4 pages.

Alonso et al., "Digital Economy Outlook," BBVA Research, Oct. 2015, https://www.bbvaresearch.com/wpcontent/uploads/2015/10/Digital_Economy_Outlook_Oct15_Cap1.pdf, 16 pages.

Andersen, "Blockchain Technology: A game-changer in accounting?," Deloitte & Touche GmbH Wirtschaftsprüfungsgesellschaft, Mar. 2016, 5 pages.

Andresen et al., "Relay OP_RETURN data TxOut as standard transaction type. #2738," Github, Jun. 4, 2013, https://github.com/bitcoin/bitcoin/pull/2738, 12 pages.

Anonymous, "Bitcoin Core 0.11 (ch 2): Data Storage—Bitcoin Wiki," retrieved from https://en.bitcoin.it/w/index.php?title=Bitcoin_core-0.11_(ch_2):_Data_Storage, Jan. 16, 2016, 10 pages.

Anonymous, "Bitcoin Developer Guide," Bitcoin Project, https://web.archive.org/web/20160515171209/https://bitcoin.org/en/developer-guide, May 15, 2016 [retrieved Mar. 13, 2019], 55 pages.

Anonymous, "Bitcoin Stats," retrieved from http://bitcoinstats.com/irc/bitcoin-dev/logs/2015/03/27, Mar. 27, 2015, 11 pages.

Anonymous, "Bitsquare—The decentralised bitcoin exchange," Bitsquare.io, Jan. 3, 2016 , 14 pages.

Anonymous, "Homepage," website operational as of 2017 [retrieved Nov. 30, 2020], https://www.coinffeine.com/, 2 pages.

Antonopoulos et al., "Bitcoin Book," GitHub, retrieved from https://github.com/bitcoinbook/bitcoinbook, Jun. 8, 2017, 4 pages.

Antonopoulos, "Mastering Bitcoin—Unlocking Digital Cryptocurrencies," O'Reilly Media, Inc., Dec. 20, 2014, 282 pages.

Australian Office Action for Application No. 2017223158, mailed Jun. 22, 2021, 7 pages.

Bitcoin Forum, "Counterparty—Pioneering Peer-to-Peer Finance", https://bitcointalk.org/index.php?topic=395761.0 Feb. 1, 2014, 7 pages.

bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.

Bitfreak et al, "Understanding Stealth Addresses/Payments," Bitcoin Forum, Jun. 10, 2015 (retrieved Jun. 16, 2020), https://bitcointalk.org/index.php?topic=1086498.0, 8 pages.

(56) References Cited

OTHER PUBLICATIONS

BitFury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.
BLOCK_CHAN, "Tweet dated Nov. 7, 2018," Twitter, Nov. 7, 2018, https://twitter.com/block_chan/status/1060336404163584000, 1 page.
Bluematt, http://bitcoinstats.com/irc/bitcoin-dev/logs/2015/03/16.
Bradbury, "Developers Battle Over Bitcoin Block Chain," Coindesk, http://www.coindesk.com/developers-battle-bitcoin-block-chain/, Mar. 25, 2014, 3 pages.
Brown et al., "Standards for Efficient Cryptography 1: Elliptic Curve Cryptography Version 2.0," Certicom Research, May 21, 2009, 144 pages.
Brown et al., "Standards for Efficient Cryptography 2: Recommended Elliptic Curve Domain Parameters Version 2.0," Certicom Research, Jan. 27, 2010, 37 pages.
Brown, "On Distributed Satabases and Distributed Ledgers", Thoughts on the Future of Finance, Nov. 8, 2016, https://gendal.me/page/3/, 44 pages.
Burgess et al., "The Promise of Bitcoin and the Blockchain," Consumers' Research, Jul. 13, 2015, 97 pages.
Buterin et al., "Ethereum Development Tutorial," GitHub, Jul. 1, 2014 [retrieved Jul. 20, 2021], https://github.com/ethereum/wiki/wiki/ethereum-development-tutorial/0c1f501ea03a787910049b03723f1bfd7a14c9c6, 13 pages.
Buterin, "Bitcoin Multisig Wallet: The Future of Bitcoin," Bitcoin Magazine, Mar. 13, 2014 [retrieved May 12, 2020], https://bitcoinmagazine.com/articles/multisig-future-bitcoin-1394686504, 7 pages.
Buterin, "Introducing Ethereum Script 2.0", Ethereum Foundation Blog, Feb. 3, 2014, 9 pages.
Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.
Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.
Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.
Christidis et al., "Blockchains and Smart Contracts for the Internet of Things," IEEE Access 4(1):2292-2303, May 10, 2016.
Coinprism, "80 bytes OP_RETURN explained," Coinprism Blog, http://blog.coinprism.com/2015/02/11/80-bytes-op-return/, Feb. 11, 2015 [retrieved Dec. 21, 2018], 8 pages.
Corallo, "[Bitcoin-development] Relative Checklocktimeverify (was CLTV proposal)," Linux Foundation, https://lists.linuxfoundation.org/pipermail/bitcoin-dev/2015-May/007858.html, May 4, 2015 [retrieved Dec. 12, 2018], 3 pages.
Counterparty, "Home Page," Counterparty, copyright 2018 [retrieved Jan. 13, 2020], counterparty.io, 3 pages.
Countyparty, "The Counterparty Protocol, " retrieved from https://github.com/jsimnz/Counterparty/blob/master/README.md, Jan. 8, 2014, 6 pages.
crpit.com, FYJC Mumbai 11th Online Admission 2021—Part-1, 2 Admission Form (mumbai.11thadmission.Org.in), https://crpit.com, Jul. 6, 2021 8 pages.
Danda et al., "hd-wallet-addrs," GitHub, https://github.com/dan-da/hd-wallet-addrs, Dec. 30, 2015 [retrieved Mar. 11, 2016], 7 pages.
Danda et al., "Is there any service/api for deriving HD wallet addresses from a master public key?," StackExchange, http://bitcoin.stackexchange.com/questions/38887/is-there-any-service-api-for-deriving-hdwallet-addresses-from-a-master-public-k, Jul. 30, 2015, 2 pages.
Danda, "Help / FAQ," MyBitPrices, https://mybitprices.info/hd-wallet-addrs.html, Jan. 1, 2016 [retrieved Mar. 11, 2016], 4 pages.
Das, "As Exchanges Pause Withdrawals, Chinese Bitcoin Investors Switch to P2P Trading," CCN, Feb. 13, 2017 [retrieved May 12, 2020], https://www.ccn.com/chinese-bitcoin-investors-switch-p2p-trading-exchanges-pause-withdrawals/, 4 pages.
Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip-0047.mediawiki, 16 pages.
Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.
Dixon, "True peer-to-peer currency exchange?," DGC Magazine, Jul. 2, 2013 [retrieved May 12, 2020], http://dgcmagazine.com/true-peer-to-peer-currency-exchange/, 6 pages.
Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.
Drcode, "New Kid on the Blockchain," Hacker News, https://news.ycombinator.com/item?id=11372455, Mar. 28, 2016 [Dec. 12, 2018], 32 pages.
Durback, "Standard BIP Draft: Turing Pseudo-Completeness," Bitcoin-Dev, Dec. 10, 2015, https://bitcoin-development.narkive.com/uRciVtAQ/standard-bip-draft-turing-pseudo-completeness, 11 pages.
Eragmus et al., "Time to lobby Bitcoin's core devs: "SF Bitcoin Devs Seminar—Scalability to billions of transactions per day, satoshi-level Micropayments, near-zero risk of custodial theft, & Instant transactions" . . . but only w/ a malleability-fixing soft fork," Reddit r/bitcoin, https://www.reddit.com/r/Bitcoin/comments/2z2191/time_to_lobby_bitcoins_core_devs_sf_bitcoin_devs/, Mar. 14, 2015 [Dec. 12, 2018], 21 pages.
Ethereum, "EIP-20: Token Standard," retrieved from https://eips.ethereum.org/EIPS/eip-20, Nov. 19, 2015, 5 pages.
European Communication pursuant to Article 94(3) EPC mailed Jan. 2, 2020, Patent Application No. 18166910.2-1218, filed Feb. 16, 2017, 4 pages.
Swan, "Blockchain: Blueprint for a New Economy," O'Reilly, Feb. 2015, 149 pages.
Swanson, "Great Chain of Numbers: Chapter 3: Next Generation Platforms," Great Wall of Numbers, Mar. 4, 2014 [retrieved Jan. 30, 2017], http://www.ofnumbers.com/2014/03/04/chapter-3-next-generation-platforms/, 25 pages.
Taiwanese Office Action mailed Apr. 12, 2021, Patent Application No. 109142412, 5 pages.
Taiwanese Office Action mailed Jul. 28, 2020, Patent Application No. 106105709, 9 pages.
Taiwanese Office Action mailed Oct. 7, 2020, Patent Application No. 106105713, 4 pages.
Tasca et al., "Digital Currencies: Principles, Trends, Opportunities, and Risks," ECUREX Research Working Paper, Sep. 7, 2015 (Oct. 2015 version), 110 pages.
Third-Party Submission Under 37 CFR 1.290 mailed Jun. 12, 2019, U.S. Appl. No. 16/078,605, filed Aug. 21, 2018, 31 pages.
Third-Party Submission Under 37 CFR 1.290 mailed Jun. 12, 2019, U.S. Appl. No. 16/079,089, filed Aug. 22, 2018, 19 pages.
Timeisnow77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.
Toomim, "P2pool as prior art for nChain's Turing Complete Transactions patent—or, how to patent all blockchain apps without anybody noticing," Medium, Sep. 3, 2018, https://medium.com/@j_73307/p2pool-as-prior-art-for-nchains-turing-complete-transactions-patent-or-how-to-patent-all-40f3d429eaa4, 13 pages.
Tuesta et al., "Smart contracts: the ultimate automation of trust?," BBVA Research Financial Inclusion Unit, Oct. 2015, 5 pages.
UK Commercial Search Report mailed Apr. 25, 2016, Patent Application No. 11603117.1, filed Feb. 23, 2016, 11 bages.
UK Commercial Search Report mailed Feb. 17, 2017, Patent Application No. 1604493.5, 8 pages.
UK Commercial Search Report mailed Jan. 13, 2017, Patent Application No. 1604498.4, 8 pages.
UK Commercial Search Report mailed Jun. 12, 2017, Patent Application No. GB510912, 6 pages.

(56) References Cited

OTHER PUBLICATIONS

UK Commercial Search Report mailed Jun. 14, 2016, Patent Application No. 1607249.8, 4 pages.
UK Commercial Search Report mailed Jun. 27, 2016, Patent Application No. GB1603123.9, filed Feb. 23, 2016, 11 pages.
UK Commercial Search Report mailed Jun. 27, 2016, Patent Application No. GB1603125.4, filed Feb. 23, 2016, 11 pages.
UK Commercial Search Report mailed Jun. 28, 2016, Patent Application No. GB1603122.1, filed Feb. 23, 2016, 12 pages.
UK Commercial Search Report mailed Jun. 6, 2016, Patent Application No. 1604497.6, filed Mar. 16, 2016, 6 pages.
UK Commercial Search Report mailed Jun. 9, 2016, Patent Application No. GB1603114.8 , 4 pages.
UK Commercial Search Report mailed Jun. 9, 2016, Patent Application No. GB1603117.1, filed Feb. 23, 2016, 12 pages.
UK Commercial Search Report mailed May 16, 2016, Patent Application No. GB1603125.4, 8 pages.
UK Commercial Search Report mailed May 20, 2016, Patent Application No. 1605026.2, 4 pages.
UK Commercial Search Report mailed May 24, 2016, Patent Application No. GB1605571.7, filed Apr. 1, 2016, 3 bages.
UK Commercial Search Report mailed May 9, 2016, Patent Application No. GB1603112.2, 6 pages.
UK Commercial Search Report mailed May 9, 2016, Patent Application No. GB1603114.8, filed Feb. 23, 2016, 2 pages.
UK Commercial Search Report mailed Nov. 14, 2016, Patent Application No. GB1607063.3, 8 pages.
UK Commercial Search Report mailed Nov. 30, 2016, Patent Application No. 1607058.3, filed Apr. 22, 2016, 7 pages.
UK Commercial Search Report mailed Oct. 10, 2016, Patent Application No. GB1607484.1, filed Apr. 29, 2016, 5 pages.
UK Commercial Search Report mailed Sep. 30, 2016, Patent Application No. 1606630.0, filed Apr. 15, 2016, 7 pages.
UK Expanded Commercial Search Report mailed Jun. 15, 2016, Patent Application No. 1605026.2, 5 pages.
UK IPO Search Report mailed Dec. 12, 2016, Patent Application No. GB1606630.0, filed Apr. 15, 2016, 4 pages.
UK IPO Search Report mailed Dec. 15, 2016, Patent Application No. GB1607063.3, 6 pages.
UK IPO Search Report mailed Dec. 21, 2016, Patent Application No. GB1607058.3, 3 pages.
UK IPO Search Report mailed Dec. 21, 2016, Patent Application No. GB1607058.3, filed Apr. 22, 2016, 3 pages.
UK IPO Search Report mailed Dec. 23, 2016, Patent Application No. GB1604495.0, 5 pages.
UK IPO Search Report mailed Dec. 28, 2016, Patent Application No. GB1604497.6, filed Mar. 16, 2016, 4 pages.
UK IPO Search Report mailed Dec. 5, 2016, Patent Application No. 1607249.8, 4 pages.
UK IPO Search Report mailed Dec. 6, 2016, Patent Application No. 1604493.5, 6 pages.
UK IPO Search Report mailed Dec. 6, 2016, Patent Application No. 1607482.5, 5 pages.
UK IPO Search Report mailed Jan. 25, 2017, Patent Application No. 1605026.2, 3 pages.
UK IPO Search Report mailed Jan. 3, 2017, Patent Application No. 1604498.4, 4 pages.
UK IPO Search Report mailed Jul. 26, 2016, Patent Application No. GB1603114.8, filed Feb. 23, 2016, 5 pages.
UK IPO Search Report mailed Jul. 4, 2016, Patent Application No. GB1603125.4, filed Feb. 23, 2016, 6 pages.
UK IPO Search Report mailed Jul. 5, 2016, Patent Application No. GB1603123.9, filed Feb. 23, 2016, 5 pages.
UK IPO Search Report mailed Oct. 17, 2016, Patent Application No. GB1603117.1, filed Feb. 23, 2016, 5 bages.
UK IPO Search Report mailed Oct. 21, 2016, Patent Application No. GB1603112.2, 4 pages.
UK IPO Search Report mailed Oct. 26, 2016, Patent Application No. GB1603122.1, filed Feb. 23, 2016, 4 pages.
UK IPO Search Report mailed Oct. 9, 2017, Patent Application No. GB1707788.4, 6 pages.
Bitfury Group, "Public Versus Private Blockchains", Part 2: Permissionless Blackchains, in collaboration with Jeff Garzik, Version 1.0, Oct. 20, 2015, 20 pages.
Greenspan, Dr. Gideon, "MultiChain Private Blcokchain", White Paper, Jun. 2015, 17 pages.
Swanson, Tim, "Watermarked Tokens and Pseudonymity on Public Blockchains", Nov. 4, 2015, 78 pages.
Manabu Takata et al., "NIKKEI BP Mook, FinTech Revolution, Financial Common Sense Dissolved by Technology", Nikkei Business Publications, Inc., Jan. 27, 2016, ISBN: 978-4-8222-7188-6, pp. 44-47.
Atsushi Takeda et al., "System Architecture for Decentralized Authentication in P2P Network", IPSJ SIG technical Reports, Information Processing Society of Japan, Jun. 12, 2008, vol. 2008 No. 54, [ISSN] 0919-6072, pp. 63-68.
Japanese Office Action mailed Oct. 8, 2019, Patent Application No. 2018-539895, 9 pages.
Jesionek et al., "BIP0032: Hierarchical Deterministic Wallets," GitHub, https://github.com/bitcoin/bips/blob/master/bip-0032.mediawiki, Jan. 2014, 9 pages.
I2012 et al., "MinAddress : Now remember your addresses easily," BitCoinTalk, Sep. 16, 2014 (retrieved Jun. 16, 2020), https://bitcointalk.org/index.php?topic=774741.150;wap2, 3 pages.
Ken K., "Tutorial 1: Your first contract," Ethereum.org, Dec. 2014, https://web.archive.org/save/_embed/https://forum.ethereum.org/discussion/1634/tutorial-1-your-first-contract/p1, 22 pages.
Kens et al., "Cryptocontracts Will Turn Contract Law Into a Programming Language ," Hacker News, Feb. 23, 2014, https://news.ycombinator.com/item?id=7287155, 12 pages.
Killerstorm et al., "Transcript for #bitcoin-dev 2012/09/03," BitcoinStats, http://www.bitcoinstats.com/irc/bitcoin-dev/logs/2012/09/03, Sep. 3, 2012 [retrieved Dec. 21, 2018], 14 pages.
Koblitz et al., "Cryptocash, Cryptocurrencies, and Cryptocontracts," Designs, Codes and Cryptography 78 (1):87-102, publication available online Oct. 1, 2015, print publication Jan. 2016.
Kosba et al., "Hawk: The Blockchain Model of Cryptography and Privacy-Preserving Smart Contracts," IEEE Symposium on Security and Privacy, May 22, 2016, 31 pages.
Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMultiledgerModelForFinancialIndustry.md, 2 pages.
Krawczyk, "HMQV: A High-Performance Secure Diffie-Hellman Protocol," Annual International Cryptology Conference 2005, Aug. 14, 2005, first disclosed online Jul. 5, 2005, 66 pages.
Krellenstein, "The Counterparty Protocol," GitHub, https://github.com/jsimnz/Counterparty/blob/master/README.md, Jan. 8, 2014 [Dec. 12, 2018], 4 pages.
Lebeau, "An Ethereum Journey to Decentralize All Things," retrieved from https://medium.com/@SingularDTV/an-ethereum-journey-to-decentralize-all-things- 8d62b02e232b#.r6n9w8kqh, Jul. 11, 2016, 10 pages.
Luu et al., "Demystifying Incentives in the Consensus Computer," ISBN, Oct. 2015, 14 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
Maxwell et al., "Deterministic wallets," Bitcoin Forum, https://bitcointalk.org/index.php?topic=19137.0;all, Jun. 18, 2011 [retrieved Dec. 10, 2018], 104 pages.
McCorry et al., "Authenticated Key Exchange over Bitcoin," International Conference on Research in Security Standardisation 2015, Dec. 15, 2015, 18 pages.
Menezes et al., "Handbook of Applied Cryptography: pp. 33, 38," CRC Press, Oct. 16, 1996, 3 pages.
Mezzomix et al., "Angebot: BTC (2-aus-3) Multisig Escrow (Treuhandabwicklung)," Bitcoin Forum, Feb. 9, 2014, https://bitcointalk.org/index.php?topic=456563.0, 7 pages.

(56) References Cited

OTHER PUBLICATIONS

Michalko et al., "Decent Whitepaper," retrieved from http://forklog.net/decent-finalizes-its-decentralized-content-distribution-platform/, Nov. 2015, 20 pages.
Michalko, "Decent Finalizes its Decentralized Content Distribution Platform," retrieved from http://forklog.net/decent-finalizes-its-decentralized-content-distribution-platform/, Dec. 14, 2016, 2 pages.
Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
Minsky et al., "Computation: Finite and Infinite Machines Chapter 14: Very Simple Bases for Computability," Prentice Hall, Inc, 1967, 29 pages.
Mrbandrews, "Bitcoin Core 0.11 (ch 2): Data Storage," Bitcoin Wiki, Jan. 13, 2016 (last revision Jan. 21, 2016) [retrieved May 8, 2020], https://en.bitcoin.it/w/index.php?title=Bitcoin_Core_0.11_(ch_2):_Data_storage&oldid=60024, 10 pages.
Mülli, "A Decentralized Bitcoin Exchange with Bitsquare—Attack Scenarios and Countermeasures," University of Zurich Department of Informatics Communication Systems Group Master Thesis, Jul. 30, 2015, 61 pages.
Nakamoto, "Bitcoin: A Peer-to-Peer Electronic Cash System," Bitcoin, Oct. 31, 2008, https://bitcoin.org/bitcoin.pdf, 9 pages.
Noizat et al., "Blockchain Electronic Vote," retrieved from https://www.weusecoins.com/assets/pdf/library/blockchain-electronic-vote.pdf, Apr. 29, 2015, 9 pages.
Noizat, "Handbook of Digital Currency Chapter 22: Blockchain Electronic Vote," Elsevier Inc., David Lee Kuo Chuen (ed.), May 2015, 9 pages.
NXT, "Voting," nxt.org, website archived on Feb. 18, 2016 [retrieved May 31, 2022], https://web.archive.org/web/20160218021746/https://nxt.org/what-is-nxt/voting/, 3 pages.
Openchain, "Home Page," openchain.org, Dec. 22, 2015 [retrieved May 8, 2020], https://web.archive.org/web/20151222083734/https://www.openchain.org/, 18 pages.
OpenSSL Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.
OpenSSL Wiki, "EVP Key Agreement," OpenSSL, https://wiki.openssl.org/index.php/EVP_Key_Agreement, Apr. 28, 2017 [retrieved Dec. 10, 2018], 2 pages.
Perry, "Tapeke: Bitcoin Accounting for Non-Accountants," http://codinginmysleep.com/tapeke-bitcoin-accounting-for-non-accountants/, Jan. 21, 2015, 1 page.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.
Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.
Reddit, "Could Microsoft use the blockchain as a license key for it's software?," r/Bitcoin, Sep. 7, 2015 [retrieved May 8, 2020], https://www.reddit.com/r/Bitcoin/comments/3jz09c/could_microsoft_use_the_blockchain_as_a_license/?st=iw26pndq&sh=b862bf7d, 2 pages.
Reiner et al., "Bitcoin Wallet Identity Verification Specification," diyhpluswiki, http://diyhpl.us/-bryan/papers2/bitcoin/armory-verisign -bitcoin-wallet-identityspecification.pdf, Feb. 27, 2015 (retrieved Jan. 27, 2016), 24 pages.
Rockwell, "BitCongress—Process for Blockchain Voting & Law," retrieved from http://generalbitcoin.com/BitCongress_Whitepaper.pdf, Feb. 12, 2016, 8 pages.
Ryepdx et al., "Answer to 'What is the Global Registrar?'," Ethereum Stack Exchange, Feb. 26, 2016 [retrieved Jan. 30, 2017], http://ethereum.stackexchange.com/questions/1610/what-is-the-global-registrar, 3 pages.
Sams, "Ethereum: Turing-complete, programmable money," Cryptonomics, Feb. 1, 2014, https://cryptonomics.org/2014/02/01/ethereum-turing-complete-programmable-money, 4 pages.
Sanchez, "Marketplaces," GitHub, Jun. 10, 2015 [retrieved May 12, 2020], https://github.com/drwasho/openbazaar-documentation/blob/master/04%20Marketplaces.md, 37 pages.
Sanchez, "Protocol," Github, https://github.com/drwasho/openbazaar-documentation/blob/master/03%20Protocol.md, Jun. 15, 2015, 53 pages.
Sanchez, "Ricardian Contracts in OpenBazaar," Github, https://gist.github.com/drwasho/a5380544c170bdbbbad8, Jan. 2016, 12 pages.
Sardesai, "Coinffeine: A P2P Alternative to Centralised Bitcoin Exchanges," Cryptocoins News, Mar. 2, 2014 [retrieved Feb. 14, 2017], https://www.cryptocoinsnews.com/coinffeine-p2p-alternative-centralised-bitcoin-exchanges/, 5 pages.
Satoshi et al., "Connection Limits," Bitcoin Forum, Aug. 9, 2010, https://bitcointalk.org/index.php?topic=741.0;prev_next=prev, 2 pages.
Scott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.
Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.
Snow et al., "Factom: Business Processes Secured by Immutable Audit Trails on the Blockchain Version 1.2," factom.com, Apr. 25, 2018, 38 pages.
Stampery, "Features: Blockchain-based data certification at your fingertips," Stampery.com, https://stampery.com/features/, archived Mar. 5, 2016 [retrieved Nov. 3, 2016], 4 pages.
Sullivan et al., "Peer-to-peer Affine Commitment using Bitcoin," Carnegie Mellon University, Jun. 17, 2015, 54 pages.
Drwasho, "Openbazaar Documentation", Github, Jun. 2015, 53 pages.
Bluematt, "Contract", Bitcoin Wiki, Oct. 22, 2015, 12 pages.
UK IPO Search Report mailed Dec. 21, 2016, Patent Application No. GB1607484.1, 4 pages.
Gutoski et al., "Hierarchical Deterministic Bitcoin Wallets That Tolerate Key Leakage", Lecture Notes in Computer Science book series (LNSC, vol. 8975), Jan. 1, 2015, 9 pages.
Mirzadeh et al., "CPFP: An Efficient Key Management Scheme for Large Scale Personal Networks", IEEE, 2008, 6 pages.
Menezes et al., "Handbook of Applied Cryptography," CRC Press, Oct. 16, 1996, 811 pages.
Deloitte, "Blockchain Technology a Game-changer in Accounting", Mar. 2016, 5 pages.
Lazarovich, Amir, "Invisible Ink: Blockchain for Data Privacy", May 8, 2015, 85 pages.
European Communication pursuant to Article 94(3) EPC mailed Jul. 1, 2019, Application No. 17707121.4-1218, filed Feb. 14, 2017, 6 pages.
Extended European Search Report mailed Jul. 18, 2018, Patent Application No. 18166910.2-1218, filed Feb. 16, 2017, 8 pages.
Familiar et al., "Transcript for #bitcoin-dev 2015/03/27," BitcoinStats, http://bitcoinstats.com/irc/bitcoin-dev/logs/2015/03/27, Mar. 27, 2015 [archived version Jun. 27, 2016], 11 pages.
Fimkrypto, "FIMK 0.6.4 Released," Github.com, Feb. 11, 2016 [retrieved Jan. 30, 2017], https://github.com/fimkrypto/fimk/releases, 17 pages.
Flood et al., "Contract as Automaton: The Computational Representation of Financial Agreements," Office of Financial Research Working Paper No. 15-04, Mar. 26, 2015, 25 pages.
Fotiou et al., "Decentralized Name-based Security for Content Distribution using Blockchains," retrieved from, Mobile Multimedia Laboratory, Department of Informatics, Apr. 14, 2016, 6 pages.
Franco, "Understanding Bitcoin: Cryptography, Engineering and Economics," Wiley, ISBN: 978-1-119-01916-9, Oct. 2014, 144 pages.

(56) References Cited

OTHER PUBLICATIONS

Friedenbach et al., "Freimarkets: extending bitcoin protocol with user-specified bearer instruments, peer-to-peer exchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.
Friedenbach, "[Bitcoin-development] New Output Script Type," Linux Foundation, Sep. 14, 2013, https://lists.linuxfoundation.org/pipermail/bitcoin-dev/2013-September/003256.html, 2 pages.
Fuchita, "Special Topic: Innovation and Finance, Blockchain and Financial Transaction Innovation," Nomura Capital Market Quarterly 19-2(74):11-35, Nov. 1, 2015.
Fujimura et al., "Bright: A Concept for a Decentralized Rights Management System Based on Blockchain," 2015 IEEE 5th International Conference on Consumer Electronics-Berlin (ICCE-Berlin), Sep. 6, 2015, 2 pages.
Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.
Gennaro et al., "Threshold-Optimal DSA/ECDSA Signatures and an Application to Bitcoin Wallet Security," International Conference on Applied Cryptography and Network Security, Jun. 9, 2016, 42 pages.
Gitbook, "Ethereum Frontier Guide," Gitbook (Legacy), Feb. 4, 2016, 293 pages.
Github, "Bitcoin/Bips," retrieved from http://web.archive.org/web/20150307191218/https://github.com/bitcoin/bips/blob/master/bip-0016.mediawiki, Apr. 5, 2014, 4 pages.
github.com, "Dual Key Stealth Address", About Shadow, https://github.com/shadowproject/Shadow-Docs/blob/88501b5ba019780ef9a62d26678932c54a434e08/source/index.md, Mar. 10, 2016, 27 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.
Goldfeder et al., "Securing Bitcoin wallets via threshold signatures" Princeton's Center for Information Technology Policy, Mar. 28, 2014, 11 pages.
Goldfeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.
Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.
Hacker News, "Cryptocontracts Will Turn Contract Law into a Programming Language," retrieved from https://news.ycombinator.com/item?id=7287155, Feb. 23, 2014, 12 pages.
Hao, "On Robust Key Agreement Based on Public Key Authentication," International Conference on Financial Cryptography and Data Security, Jan. 25, 2010, 12 pages.
Harayama et al., "Key escrow method of personal decryptographic key by using elliptic curve calculation," Institute of Electronics, Information and Communication Engineers (IEICE) Technical Report 109(85):91-96, Jun. 11, 2009.
Hearn, "Distributed markets," Bitcoin Wiki, https://en.bitcoin.it/wiki/Distributed_markets, Jul. 11, 2015 [retrieved Sep. 20, 2016], 5 pages.
Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.
International Search Report and Written Opinion mailed Apr. 10, 2017, Patent Application No. PCT/IB2017/050861, 11 pages.
International Search Report and Written Opinion mailed Apr. 12, 2017, Patent Application No. PCT/IB2017/050818, 10 pages.
International Search Report and Written Opinion mailed Apr. 12, 2017, Patent Application No. PCT/IB2017/050829, 9 pages.
International Search Report and Written Opinion mailed Apr. 12, 2017, Patent Application No. PCT/IB2017/050866, 10 pages.
International Search Report and Written Opinion mailed Apr. 21, 2017, Patent Application No. PCT/IB2017/050820, 12 pages.
International Search Report and Written Opinion mailed Apr. 26, 2017, International Patent Application No. PCT/IB2017/050865, filed Feb. 16, 2017, 9 pages.
International Search Report and Written Opinion mailed Apr. 3, 2017, Patent Application No. PCT/IB2017/050824, filed Feb. 14, 2017, 13 pages.
International Search Report and Written Opinion mailed Apr. 3, 2017, Patent Application No. PCT/IB2017/050827, 10 pages.
International Search Report and Written Opinion mailed Apr. 3, 2017, Patent Application No. PCT/IB2017/050827, 13 pages.
International Search Report and Written Opinion mailed Aug. 3, 2018, Patent Application No. PCT/IB2018/053289, 10 pages.
International Search Report and Written Opinion mailed Mar. 29, 2017, Patent Application No. PCT/IB2017/050821, 10 pages.
International Search Report and Written Opinion mailed Mar. 29, 2017, Patent Application No. PCT/IB2017/050821, 13 pages.
International Search Report and Written Opinion mailed Mar. 30, 2017, Patent Application No. PCT/IB2017/050819, 13 pages.
International Search Report and Written Opinion mailed Mar. 30, 2017, Patent Application No. PCT/IB2017/050825, 9 pages.
International Search Report and Written Opinion mailed May 29, 2017, International Patent Application No. PCT/IB2017/050815, filed Feb. 14, 2017, 10 pages.
International Search Report and Written Opinion mailed May 31, 2017, Patent Application No. PCT/IB2017/050856, filed Feb. 16, 2017, 11 pages.
International Search Report and Written Opinion mailed May 31, 2017, Patent Application No. PCT/IB2017/050867, 11 pages.
International Search Report and Written Opinion mailed May 31, 2017, Patent Application No. PCT/IB2017/050979, filed Feb. 21, 2017, 11 pages.
International Search Report and Written Opinion mailed May 31, 2017, Patent Application No. PCT/IB2017/050980, 12 pages.
Japanese Notice of Reason(s) for Rejection mailed Mar. 30, 2021, Patent Application No. 2018-539890, 8 pages.
Japanese Notice of Reason(s) for Rejection mailed Mar. 30, 2021, Patent Application No. 2018-539893, 6 pages.
Japanese Office Action mailed Feb. 16, 2021, Patent Application No. 2018-539331, 7 pages.
Japanese Office Action mailed Jan. 22, 2019, Patent Application No. 2018-516682, filed Feb. 16, 2017, 14 pages.
Japanese Office Action mailed Oct. 6, 2020, Patent Application No. 2018-539865, 14 pages.
Omnilayer, Omni Protocol Specification (formerly Mastercoin), retrieved from https://github.com/OmniLayer/spec/blob/9978cc3984ae0b6e51216c4ae74042fc4097b993/README.md on Apr. 19, 2024, 58 pages.
Wikipedia, "Public-key Cryptography", Zosterops (talk contribs), Jul. 5, 2015, Retrieved from https://en.wikipedia.org/w/index.php?title=Public-key_cryptography$oldid=670016308, 14 pages.
The Institute of Electrical and Electronics Engineers, Inc., "IEEE P1363, D1-pre Draft Standard for Public Key Cryptography", Prepared by the 1363 Working Gorup of the C/MSC Committee, Jun. 2009, 362 pages.
Antonopoulos, "Mastering Bitcoin, Chapter 4, Keys, Addresses, Wallets", O'Reilly, Dec. 20, 2014, 34 pages.
Antonopoulos Andreas M.: "Mastering Bitcoin", O'Reilly, (2010), 30 pages.

* cited by examiner

1. Issuer (I) creates a first token (T1) for first user (A)

2. First user (A) redeems first token (T1) with issuer (I)

3. First user (A) transfers value of first token (T1) to second user (B)

4. First user (A) redeems a first portion (R1) of the token with issuer (I)

5. First user (A) transfers a first portion (R1) of the token to second user (B)

UNIVERSAL TOKENISATION SYSTEM FOR BLOCKCHAIN-BASED CRYPTOCURRENCIES

CROSS-REFERENCE TO RELATED APPLICATIONS

This application is a divisional of U.S. patent application Ser. No. 16/079,088, filed Aug. 22, 2018, entitled "UNIVERSAL TOKENISATION SYSTEM FOR BLOCKCHAIN-BASED CRYPTOCURRENCIES," which is a 371 of International Patent Application No. PCT/IB2017/050819, filed Feb. 14, 2017, entitled "UNIVERSAL TOKENISATION SYSTEM FOR BLOCKCHAIN-BASED CRYPTOCURRENCIES," which claims priority to United Kingdom Patent Application No. 1604225.1, filed Mar. 11, 2016, entitled "METHOD AND SYSTEM FOR THE EFFICIENT TRANSFER OF TOKENS ON A BLOCKCHAIN BASED ON A CODIFCATION PROCESS," and United Kingdom Patent Application No. 1603125.4, filed Feb. 23, 2016, entitled "UNIVERSAL TOKENISATION SYSTEM FOR BLOCKCHAIN BASED CRYPTOCURRENCIES," the disclosures of which are hereby incorporated herein in their entirety.

TECHNICAL FIELD

The present disclosure relates generally to a solution for the control and/or transfer of an asset, or the transfer of ownership of an asset. In particular, it relates to a method of creating, transferring ownership, and redeeming tokens that represent assets. The present disclosure has particular application to creating tokens associated with transactions on a peer-to-peer distributed ledger such as, for example, the Bitcoin blockchain. The token may be representative of a contractual right, smart contract, or other form of asset.

BACKGROUND

Commercial transactions may involve the transfer of property rights. Such rights may include real property, or personal property (including both tangible and intangible property). Furthermore, contracts between parties may also include contractual rights that bind both parties. In the digital economy, there may be an expectation for transactions to be performed in a timely manner and across vast distances. This expectation, along with practical limitations, means that traditional forms of transferring property, such as physical delivery of hardcopy of documents representing a contract, negotiable instrument, etc. or the tangible property itself is not desirable. In more recent times, blockchains have been used for the transfer of digital assets.

A blockchain is an electronic ledger that is implemented as a computer-based decentralised, distributed, peer-to-peer system made up of blocks which in turn are made up of transactions. Each transaction (Tx) is a data structure that encodes the transfer of control of a digital asset between participants in the blockchain system, and includes at least one input and at least one output. Each block contains a hash of the previous block so that blocks become chained together to create a permanent, unalterable record of all transactions that have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated." Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; ii) added to a new block built by a miner; and iii) mined, i.e., added to the public ledger of past transactions.

Although blockchain technology is most widely known for its use in cryptocurrency implementations, digital entrepreneurs have begun exploring the use of both the cryptographic security system Bitcoin is based on and the data that can be stored on the blockchain to implement new systems. It would be highly advantageous if the blockchain could be used for automated tasks and processes that are not limited to the realm of cryptocurrency. Such solutions would be able to harness the benefits of the blockchain (e.g., a permanent, tamper proof record of events, distributed processing, etc.) while being more versatile in their applications.

One area of current research is the use of the blockchain for the implementation of "smart contracts." These are computer programs designed to automate the execution of the terms of a machine-readable contract or agreement. Unlike a traditional contract that would be written in natural language, a smart contract is a machine-executable program that comprises rules that can process inputs in order to produce results, which can then cause actions to be performed dependent upon those results.

Another area of blockchain-related interest is the use of "tokens" (or "coloured coins") to represent and transfer real-world or virtual entities via the blockchain. A potentially sensitive or secret item can be represented by the token that has no discernible meaning or value. The token thus serves as an identifier that allows the asset to be referenced from the blockchain.

Any discussion of documents, acts, materials, devices, articles, or the like, that has been included in the present specification is not to be taken as an admission that any or all of these matters form part of the prior art base or were common general knowledge in the field relevant to the present disclosure as it existed before the priority date of each claim of this application.

This document uses the term "blockchain" to include all forms of electronic, computer-based, peer-to-peer, distributed ledgers. These include, but are not limited to, consensus-based blockchain and transaction-chain technologies, permissioned, and unpermissioned ledgers, shared ledgers, and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

Throughout this specification the word "comprise," or variations such as "comprises" or "comprising," will be understood to imply the inclusion of a stated element, integer or step, or group of elements, integers or steps, but not the exclusion of any other element, integer or step, or group of elements, integers or steps.

SUMMARY

There is provided an invention as defined in the appended claims.

The present invention may provide solutions for the secure control and/or transfer of an asset or right via a blockchain. Additionally or alternatively, it may enable control and/or transfer of ownership of the asset or right. This may be a digital or virtual asset such as a smart contract, or a real-world/physical asset. The invention may use tokenisation techniques to facilitate this control or transfer. The invention may enable the transfer to be performed in a secure manner, incorporating the use of cryptographic keys, while not requiring any alteration of the underlying blockchain protocol.

The invention provides, not least: enhanced optimisation of memory usage for electronic transfers, improved security and data integrity through the use of hashing techniques, improved security through the removal of a need for a trusted third party, and enhanced anonymity of data. This list of advantages is not limiting or exhaustive.

The invention may require the interaction and intercommunication of various distinct and separate computer-based resources, such as one or more user devices and a distributed computer system (blockchain) which includes computing nodes arranged to execute blockchain-related software and protocols.

The invention may provide a method comprising the steps of:
  generating a blockchain transaction (Tx) having an output (TxO) related to a digital asset (B1) and a hash (H1) of a redeem script (RS1) that comprises:
    metadata comprising a token that is a representation of, or a reference to, a tokenised entity;
    and
    at least one (preferably two or more) public cryptographic keys.

The digital asset (B1) may be a quantity of cryptocurrency, e.g., Bitcoin. The redeem script may be provided within a locking script of the transaction output TxO. The metadata may be provided in the redeem script at a location that is designated in a blockchain protocol as a location for a cryptographic key.

The method may further include the step of submitting the transaction Tx to a blockchain. In effect, the cryptocurrency (B1) may thus be locked on the blockchain in association with the token. The quantity of cryptocurrency (B1) can only be spent (redeemed) upon provision of an unlocking script that meets the requirements of the locking script for the output TxO. In particular, a redeem script must be presented that, when hashed, matches the hash provided in the locking script for the output TxO. As the locking script for the output TxO comprises the hash of the redeem script, which in turn includes the token (in the metadata), the cryptocurrency (B1) is associated with the token. Upon presentation of the correct unlocking (redeem) script, ownership of the cryptocurrency (B1) may be transferred to the redeeming party or user; i.e., it is spent.

The terms "spending," "transferring," "redeeming," or "transferring ownership/control of" may be used interchangeably herein. Also, the term "user" may be used herein to refer to either a human user or a machine-based resource.

The public key(s) may be associated with a corresponding private key, to form a cryptographic key pair. The corresponding private key(s) may be required in order to unlock the transaction output (TxO) and thus enable transfer of the digital asset and/or ownership thereof. The tokenised entity may be stored on or off the blockchain. It may be a digital asset such as a (smart) contract or some other form/type of asset or entity. The token may be provided in the redeem script such that it appears to be, or is interpreted by the blockchain protocol, as a cryptographic key. Thus, the underlying blockchain protocol may be agnostic to the presence of the token and/or other metadata provided in the redeem script. However, the metadata can be interpreted and used as a token by a user who is party to the process of the invention.

Thus, the invention may comprise embodiments or aspects that enable the issuance of a digital token to a user in a cryptographically enforced and secure manner via a blockchain. A corresponding system may be provided, the system arranged to implement the method of any embodiment described above and comprising a blockchain network and associated nodes.

Additional or alternative wordings, features, or embodiments of the invention are now provided. Features described in relation to one or more aspects or embodiments of the invention may be used in relation to one or more other aspects or embodiments.

The invention may provide a computer-implemented method of creating a first token (T1) by an issuer (I). The first token (T1) may be associated with a first quantity of an encrypted, electronically transferrable digital asset (B1).

In addition or alternative to the method described above, the method may comprise one or more of the following steps: receiving, over a communications network, a request from a first user (A) for a first token (T1); determining a first user public key (P1A), wherein the first user public key (P1A) forms a cryptographic pair with a first user private key (V1A); and allocating a first quantity of an encrypted, electronically transferrable digital asset (B1) for association with the first token (T1); determining a first hash (H1) of a first redeem script (RS1), wherein the first redeem script (RS1) is based on: at least a first metadata (MD1) that includes information associated with the first token (T1); the first user public key (P1A); and a first issuer public key (P1I) associated with the issuer (I), wherein the first issuer public key (P1I) forms a cryptographic pair with a first issuer private key (V1I); sending, over the communications network, a first data output (O1) to a peer-to-peer distributed ledger comprising: an indication of a transaction of the first quantity of said digital asset (B1) to the first user (A); and the first hash (H1), wherein the first hash (H1) is associated with the first quantity of said digital asset (B1), to provide the first token (T1) that is associated with the first user (A) and issuer (I).

Determining a first hash (H1) of a first redeem script (RS1), wherein the first redeem script (RS1) is based on at least a first metadata (MD1) that includes information associated with the first token (T1), the first user public key (P1A) and a first issuer public key (P1I) associated with the issuer (I), and sending, over the communications network, a first data output (O1) comprising the first hash (H1) provides a number of advantages. Firstly, because the information regarding the token is securely embedded in a public ledger such as a blockchain, security of data transmission is provided, while avoiding the need for a trusted third party, since the transacting parties can rely on the details of the related transactions being locked in a publicly verifiable manner. Also, anonymity of the transactions is preserved, and since the first redeem script is hashed, it would be impracticably difficult to change the values of the metadata without causing a change in the corresponding hash values of the redeem script. The advantage is also provided that the first metadata can be embedded in one or more of the places available for public keys in the redeem script, thereby enabling nodes not suitable for processing the metadata to simply transmit the redeem script to a further node, as opposed to blocking its process. This in turn improves computational efficiency of the related transactions. The further advantage is provided that the metadata may contain a pointer to terms and conditions of the contract, thereby enabling this information to be stored in an off-block repository. This enables the amount of processing and memory resources used to be reduced, since the transaction can be processed without the need to transmit its entire transactional history, while also enabling the details of the related transactions to be reliably verified afterwards. A further advantage is provided that control data can be incorporated into the metadata, for example, an access code for a barrier in the case of the token representing a ticket for a venue or a travel ticket or voucher. A yet further advantage is provided that the token can be divided, enabling two or more transaction outputs, each of which can relate to a tokenised or untokenised digital asset.

The first data output (O1) may facilitate recording of a pay-to-script hash transaction.

In the method, the step of receiving a request from a first user (A) for a token (T) may comprise receiving an offer or an acceptance of a contract. The step of receiving a request from a first user (A) for a token (T) may further comprise receiving at least one or more terms and conditions of a contract.

The method may further comprise sending at least one or more terms and conditions of a contract to the first user (A).

The information in the first metadata (MD1) may comprise a hash of at least one or more terms and conditions of a contract. The information in the first metadata (MD1) comprises information on one or more of: a type of contract; one or more terms and conditions of a contract; a pointer to terms and conditions of a contract; and information on how to process the transaction.

The method may further comprise storing the first redeem script (RS1) in a data store.

In the method, the first redeem script (RS1) may be in the format:
  <NumSigs MD1 ... P1A P1I ... NumKeys OP_CHECK-MULTISIG>
  wherein
  NumSigs is the number of signatures required to redeem the first token (T1);
  NumKeys is the total of public key slots in the script, including the metadata and public keys;
  OP_CHECKMULTISIG is an operation comparing signatures with the public key slots in sequential order.

The method may further comprise: determining whether the first user (A) has an account (ACA) with the issuer (I) to facilitate transactions associated with the first token (T1), wherein if the first user (A) does not have an account, the method further comprises: sending, over a communications network, a request to open an account (ACA) for the first user (A), wherein the account (ACA) is associated with the cryptographic pair including the first user private key (V1A) and the first user public key (P1A) for the first user (A).

In the method, the step of allocating a first quantity of said digital asset (B1) for association with the first token (T1) may comprise: determining a first token value (TV1) of the first token (T1); determining a pegging rate (PR1) for the first token (T1); and determining the first quantity of said digital asset (B1) based on the pegging rate (PR1) and the first token value (TV1).

In one alternative, the step of allocating a first quantity of said digital asset (B1) for association with the first token (T1) may comprise: determining a minimum threshold of said digital asset (MT1) of the first token (T1); and determining a first quantity of said digital asset (B1) that is at or above the minimum threshold of said digital asset (MT1).

A computer-implemented method of redeeming a first token (T1) associated with a first quantity of said digital asset (B1) according to the method of creating a first token (T1) described above, the method comprising the issuer: receiving, over the communications network, a request from the first user (A) to redeem the first token (T1); determining the first redeem script (RS1) associated with the first token (T1); receiving the first user private key (V1A); signing, with the first user private key (VIA) and the first issuer private key (V1I), the first redeem script (RS1) to unlock the first quantity of said digital asset (B1) associated with the first token (T1); and sending, over the communications network, a second data output (O2) to the peer-to-peer distributed ledger comprising an indication of a transaction of the first quantity of said digital asset (B1) to the issuer (I).

In the method of redeeming a first token (T1), the first token (T1) may have a token value of a first portion (R1) and a second portion (R2), and wherein the request from the first user (A) to redeem the first token (T1) comprises a request to redeem a value of the first portion (R1), the method further comprising: determining the first user public key (P1A); and allocating a second quantity of said digital asset (B2) for association with a second token (T2), wherein the second token has a second token value (TV2) based on the second portion (R2). The method also comprises determining a second hash (H2) of a second redeem script (RS2), wherein the second redeem script (RS2) is based on: at least a second metadata (MD2) that is based, at least in part, on the first metadata (MD1) associated with the first token (T1); the first user public key (P1A); and the first issuer public key (P1I) associated with the issuer (I). In this method, the second data output (O2) to the public ledger may further comprise: an indication of a transaction of at least the second quantity of said digital asset (B2) to the first user (A); and the second hash (H2), wherein the second hash (H2) is associated with the second quantity of said digital asset (B2), to provide the second token (T2) that is associated with the first user (A) and the issuer (I).

A computer-implemented method of creating a third token (T3) by an issuer (I), wherein the third token is associated with a transfer of value from a first token (T1), according to the method of creating a first token (T1) described above, the method comprising: receiving, over the communications network, a request from the first user (A), and/or a second user (B), to create the third token (T3); determining the first redeem script (RS1) associated with the first token (T1); receiving the first user private key (VIA); and signing, with the first user private key (VIA) and the first issuer private key (V1I), the first redeem script (RS1) to unlock the first quantity of said digital asset (B1) associated with the first token (T1). The method further includes determining a second user public key (P1B), wherein the second user public key (P1B) forms a cryptographic pair with a second user private key (V1B); and allocating a third quantity of said digital asset (B3) for association with the third token (T3). The method further includes determining a third hash (H3) of a third redeem script (RS3), wherein the third redeem script (RS3) is based on: at least a third metadata (MD3) that is based, at least in part, on the first metadata (MD1) associated with first the token (T1); the second user public key (P1B); and the first issuer public key (P1I). The method also includes sending, over the communications network, a third data output (O3) to the peer-to-peer distributed ledger comprising: an indication of a transaction of at least the third quantity of said digital asset (B3) to the second user (B); and the third hash (H3), wherein the third hash (H3) is associated with the third quantity of said digital asset (B3) to provide the third token (T3) that is associated with the second user (B) and the issuer (I).

In the method of creating a third token (T3), the first token (T1) may have a token value of a first portion (R1) and a second portion (R2), and wherein the request to create the third token (T3) comprises a request to create the third token (T3) with a third token value (TV3) based on the first portion (R1), the method further comprising: determining the first user public key (P1A); and allocating a second quantity of said digital asset (B2) for association with a second token (T2), wherein the second token has a second token value (TV2) based on the second portion (R2). The method further includes determining a second hash (H2) of a second redeem script (RS2), wherein the second redeem script (RS2) is based on: at least a second metadata (MD2) that is based, at least in part, on the first metadata (MD1) associated with the first token (T1); the first user public key (P1A); and the first issuer public key (PH) associated with the issuer (I). In the method, the third data output (O3) to the peer-to-peer distributed ledger may further comprise: an indication of a transaction of at least the second quantity of said digital asset (B2) to the first user (A); and the second hash (H2), wherein the second hash (H1) is associated with the second quantity of said digital asset (B2), to provide the second token (T2) that is associated with the first user (A) and the issuer (I).

In the method of creating a third token (T3), the step of allocating a second quantity of said digital asset (B2) may comprise: determining a pegging rate (PR2) for the second token (T2); and determining the second quantity of said digital asset (B2) based on the pegging rate (PR2) and the second token value (TV2).

In the method of creating a third token (T3), the step of allocating a second quantity of said digital asset (B2) may comprise: determining a minimum threshold of said digital asset (MT2) of the second token (T2); and determining the second quantity of said digital asset (B2) that is at or above the minimum threshold of said digital asset (MT2) of the second token (T2).

In the method of creating a third token (T3), the second quantity of said digital asset (B2) and/or the third quantity of said digital asset (B3) includes, at least in part, the first quantity of said digital asset (B1).

The method of creating a third token (T3) may further comprise: determining a fourth quantity of said digital asset (B4) as a transaction fee, wherein the first data output (O1), second data output (O2), and third data output (O3) to the peer-to-peer distributed ledger further comprises an indication of a transaction of the fourth quantity of said digital asset (B4) as a transaction fee.

In the above described methods, the peer-to-peer distributed ledger may comprise the Bitcoin blockchain.

A computer-implemented method of redeeming a first token (T1) associated with a first quantity of said digital asset (B1) as defined above, the method comprising the issuer: receiving, over the communications network, a request from the first user (A) to redeem the first token (T1); determining the first redeem script (RS1) associated with the first token (T1); sending, over the communications network, the first redeem script (RS1) for signing by the first user (A); receiving, over the communications network, a first redeem script signed by the first user (RS1A) with the first user private key (V1A); signing, with the first issuer private key (V1I), the first redeem script signed by the first user (RS1A) to unlock the first quantity of said digital asset (B1) associated with the first token (T1); sending, over the communications network, a second data output (O2) to the peer-to-peer distributed ledger comprising an indication of a transaction of the first quantity of said digital asset (B1) to the issuer (I).

A computer-implemented method of creating a third token (T3) by an issuer (I), wherein the third token is associated with a transfer of value from a first token (T1), according to the method of creating a first token (T1) described above, the method comprising: receiving, over the communications network, a request from the first user (A), and/or a second user (B), to create the third token (T3); determining the first redeem script (RS1) associated with the first token (T1); sending, over the communications network, the first redeem script (RS1) for signing by the first user (A); receiving, over the communications network, a first redeem script signed by the first user (RS1A) with the first user private key (V1A); signing, with the first issuer private key (V1I), the first redeem script signed by the first user (RS1A) to unlock the first quantity of said digital asset (B1) associated with the first token (T1); determining a second user public key (P1B), wherein the second user public key (P1B) forms a cryptographic pair with a second user private key (V1B); allocating a third quantity of said digital asset (B3) for association with the third token (T3); determining a third hash (H3) of a third redeem script (RS3), wherein the third redeem script (RS3) is based on: at least a third metadata (MD3) that is based, at least in part, on the first metadata (MD1) associated with first the token (T1); the second user public key (P1B); and the first issuer public key (PH); sending, over the communications network, a third data output (O3) to the peer-to-peer distributed ledger comprising: an indication of a transaction of at least the third quantity of said digital asset (B3) to the second user (B); and the third hash (H3), wherein the third hash (H3) is associated with the third quantity of said digital asset (B3) to provide the third token (T3) that is associated with the second user (B) and the issuer (I).

The invention may further provide a tokenisation method. It may be implemented using a distributed peer-to-peer network, such as a blockchain. Thus, all of the known advantages of blockchain technology can be harnessed by the invention. The invention may provide an improved solution for secure transfer of data items via a blockchain platform. It may be described as a solution for efficient secure transfer of tokens on, for example, a blockchain.

The method may provide a solution for representing a contract for the supply of at least one asset and/or service. The contract may be a transferable contract.

The invention is not limited with regard to the nature, type, quantity etc of the asset and/or service being transferred by the contract. The method may provide a codification scheme for tokenising any type of transferable contract.

The method may comprise the step of generating a blockchain transaction. The transaction may comprise three parameters or data items. This data may be indicative of:

i) an amount of shares available under the contract (this may be referred to herein as "NumShares");

ii) a quantity of transfer units to be transferred from a sender to at least one recipient (this may be referred to herein as "ShareVal"); and iii) a factor for calculating a value for the quantity of transfer units (this may be referred to herein as a "pegging rate").

An advantage of the invention is that it can be used to encapsulate or represent contracts as tokens on a blockchain. This can be achieved using only the three parameters described above. In effect, the contract can be specified using a minimum of these three data items. As the invention provides a solution that can be used for any type of transferable contract, common algorithms can be devised and applied.

These three data items may be provided as metadata within the transaction. Advantageously, only a small amount of metadata (in bytes) is required to represent any type of contract. Thus, the invention provides an efficient and effective yet powerful mechanism for the transfer of tokens on a peer-to-peer distributed system such as a blockchain.

The data may further comprise an indication of the availability of the asset(s), i.e., goods and/or service(s), to be supplied under the contract. Additionally or alternatively, it may comprise an indication of the type and/or quantity of the asset(s) or service(s) being supplied under the contract.

The transaction may in practice also include a fourth parameter or data item, which identifies that particular asset being transferred, e.g., a house or racehorse, to which the transaction relates.

The method may further comprise the step of sending the transaction to the at least one recipient (or an address associated with the at least one recipient).

The transaction may comprise the contract, and/or information for accessing the contract or accessing a file containing the contract. This provides the advantage of a facility to transfer either the contract or information corresponding to the location of a file containing the contract via the blockchain.

The transaction may comprise a hash of the contract. This provides the advantage of a means to verify the authenticity of the contract.

The transaction may comprise at least one cryptographic signature. This provides the advantage of identifying an origin of the transaction.

The transaction may comprise at least one locking script and at least one public key. This provides the advantage of preventing the contract from being redeemed by someone other than an intended recipient of the transaction.

The transfer units may relate to a cryptocurrency, which may or may not be Bitcoin related. The transfer units may be an amount of Bitcoin, and the blockchain may be the Bitcoin Blockchain. This provides the advantage that the method may be implemented on existing infrastructure.

Thus, the invention provides a simple and efficient scheme for the secure transfer of contracts on a blockchain.

A computer program comprises machine-readable instructions to cause a processing device to implement any one of the methods described above.

A device includes a processing device to perform the method according to any one of the methods described above.

BRIEF DESCRIPTION OF DRAWINGS

Examples of the present disclosure will be described with reference to.

DESCRIPTION OF EMBODIMENTS

Overview of the System

Figure 1:
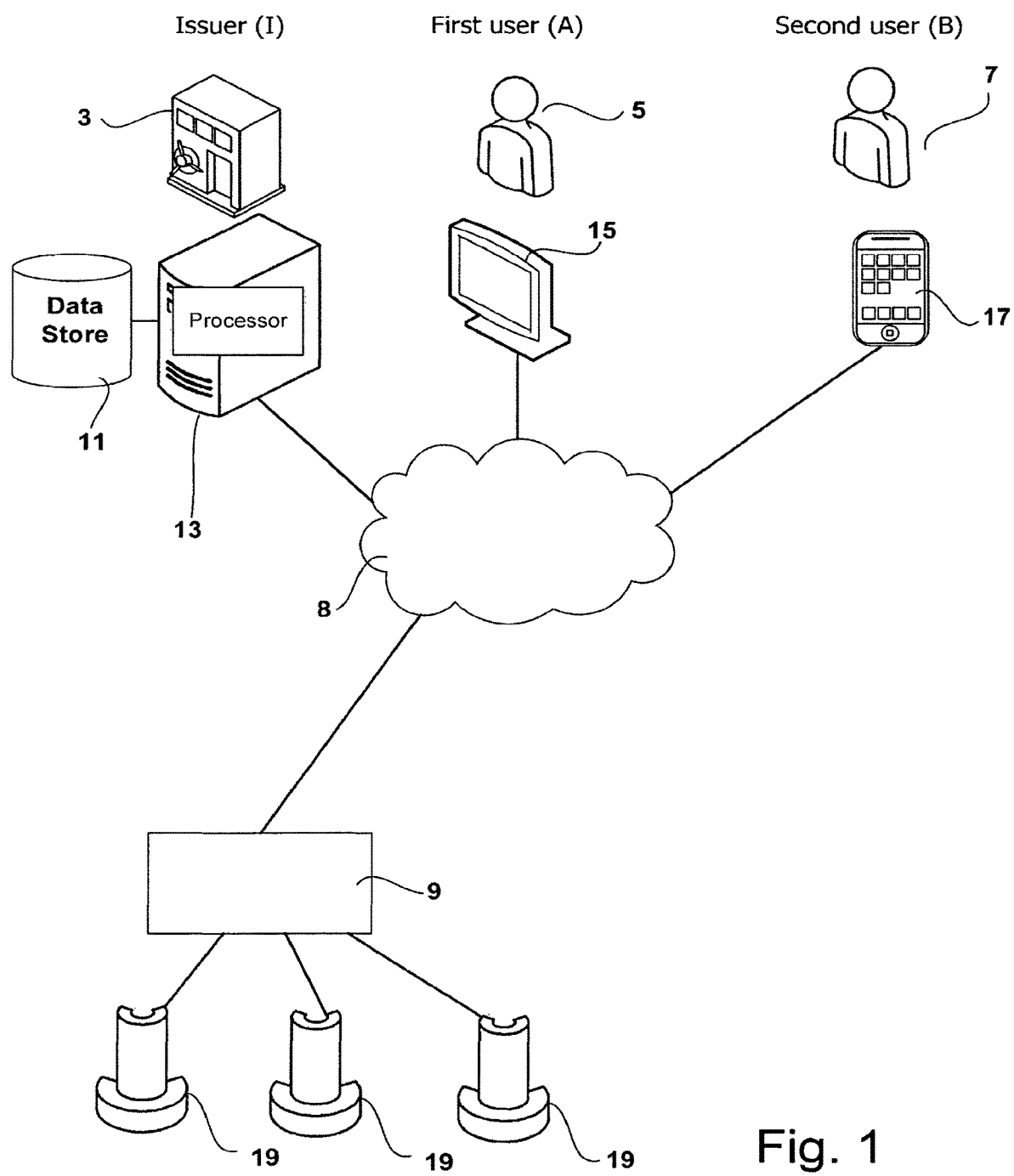
FIG. 1 is a schematic of an example system to create and redeem tokens.

A method and system to create, redeem and transfer tokens will now be described. FIG. 1 illustrates a system that includes an issuer (I) 3, a first user (A) 5 and a second user (B) 7. The issuer (I) 3 creates tokens and may be, for example, a bank, another financial institution, mint, company, etc. The issuer (I) 3 is associated first processing device 13, for performing the methods 100, 200, 300, and is in communications with a communications network 8. Although the first processing device 13 is illustrated as a single node, it is to be appreciated that the methods 100, 200, 300 described herein may be performed by more than one processing device 13 or nodes associated with the issuer (I) 3 and one or more steps may be distributed and performed at different nodes. The issuer (I) 3 may also have an associated data store 11.

The first user (A) 5 is associated with a second processing device 15 that is in communication, over a communications network 8, with the first processing device 13 of the issuer (I) 3. The first user (A) 5 may request the creation of tokens from the issuer (I) 3, redeeming of tokens with the issuer (I) 3, or request part of or all the value of a token be transferred to the second user (B) 7.

The second user (B) 7 is associated with a third processing device 17 that is in communication, over a communications network 8, with the first processing device 13. In some examples, the second processing device 15 and the third processing device 17 may be a computer, a mobile communication device, or other electronic device used by the respective first and second user 5, 7. In other examples, the second processing device 15 and the third processing device 17 may be virtual machines accessible by the first and second users via a terminal or other interface.

Also illustrated is a peer-to-peer distributed ledger 9 to record transactions. The peer-to-peer distributed ledger 9 may be associated with one or more processing devices 19 to receive and record transactions. An example of a peer-to-peer distributed ledger includes the blockchain, which is a distributed database of transactions based on the Bitcoin protocol. Thus, the processing device 19 associated with the ledger may be processing devices used by "miners."

Overview of Transactions Involving Tokens

In a non-limiting example, there are three general types of transactions that involve tokens, as illustrated in FIG. 2. In this example, the issuer (I) 3 is a financial institution that also manages an electronic wallet of the first user (A) 5 and second user (B) 7.

Figure 2A:
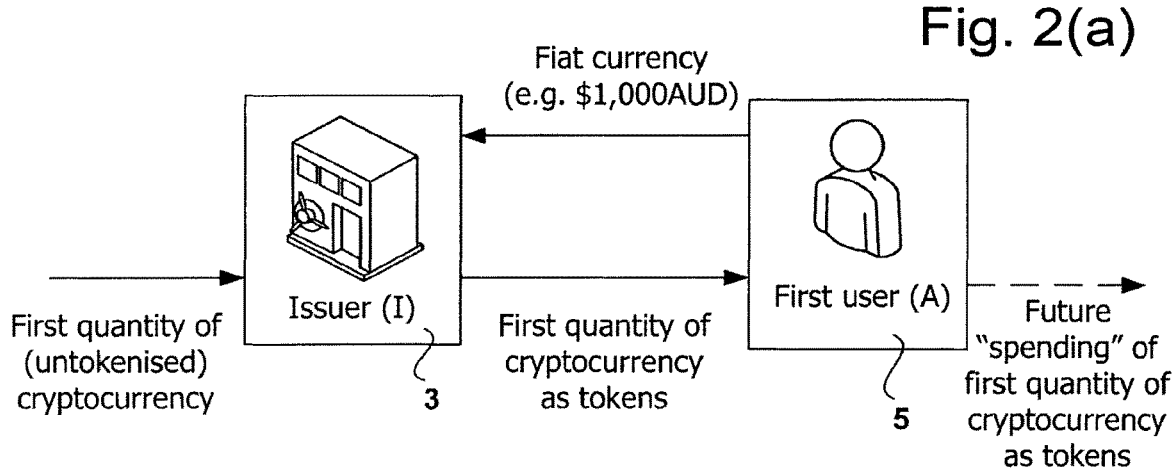
FIG. 2(a) is a diagram illustrating an example of a first type of transaction between a first user and an issuer that includes creating a token.

The first type of transaction, as shown in FIG. 2(a), involves the creation of a first token (T1) where the first user (A) 5 transfers fiat currency (e.g., $1,000 AUD) to the issuer (I) 3. In exchange for the fiat currency, the issuer (I) 3 "tokenises" a first quantity of cryptocurrency (B1), such that it has a token value, and transfers this first quantity of cryptocurrency (B1) to the first user (A) 5. The first token (T1) may be representative of a contract, such as a contract where the issuer (I) 3 agrees to redeem the bearer of the first token (T1) for a specified fiat currency amount (e.g., $1,000 AUD). Therefore, the first token (T1) may be similar to a negotiable instrument. "Cryptocurrency" is an encrypted, electronically transferrable digital asset such as, but not limited to, Bitcoin.

Figure 2B:
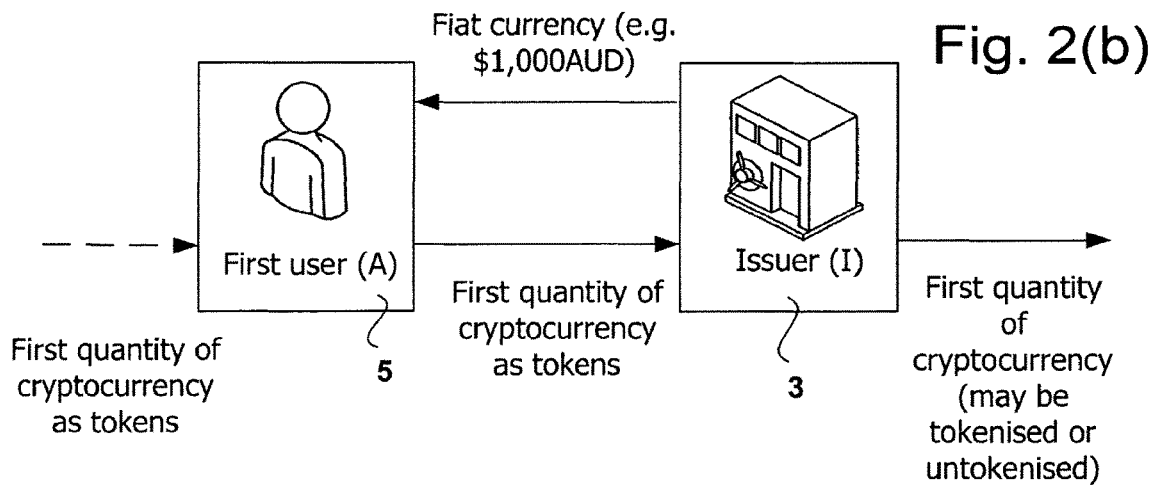
FIG. 2(b) is a diagram illustrating an example of a second type of transaction between a first user and an issuer that redeems a token.

The second type of transaction, as shown in FIG. 2(b), involves the first user (A) 5 redeeming the first token (T1) with the issuer (I) 3. In this transaction, the first quantity of cryptocurrency (B1) is transferred from the first user (A) 5 to the issuer (I) 3. In return, the issuer (I) 3 sends the redeemed value, in the form of fiat currency, to the first user (A) 5. The first quantity of cryptocurrency (B1) transferred to the issuer (I) 3 may be spent in other subsequent transactions. Whether this first quantity of cryptocurrency (B) with the issuer (I) 3 remains "tokenised" or is converted to "untokenised" cryptocurrency may be a choice for the issuer (I) 3.

Figure 2C:
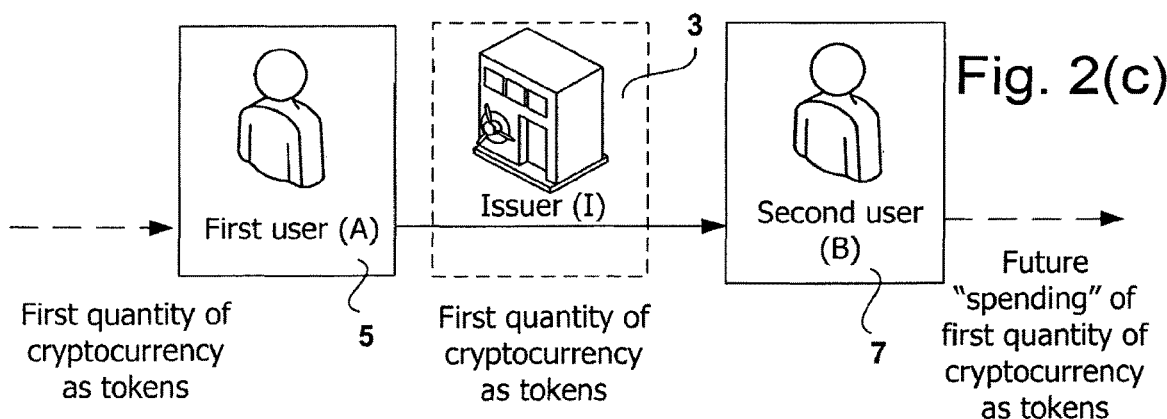
FIG. 2(c) is a diagram illustrating an example of a third type of transaction between the first user and a second user, and facilitated by the issuer, that results in a transfer of value of the token from the first user to the second user.

The third type of transaction, as shown in FIG. 2(c), involves the first user (A) 5 transferring the value of the first token (T1) to the second user (B) 7. In this example, the first quantity of cryptocurrency (B1) that represents the first token (T1) is transferred from the first user (A) 5 to the second user (B) 7. The issuer (I) 3 is involved in this transaction as the issuer (I) 3 needs to sign the redeem script (discussed below) to authorise the transaction. The result of this transaction is the second user (B) 7 having the first quantity of cryptocurrency (B1) that has a token value that may be "spent" by redeeming with the issuer (I) 3 (in a similar manner as discussed above) or transferred to another user.

In some instances, only a portion of the value of a first token (T1) may be spent by the first user (A) 5. This will be described as the fourth and fifth types of transactions, with reference to FIGS. 3(a) and 3(b), which are variations of the second and third types of transactions discussed above. In these examples, the first token (T1) has a total token value made up of a first portion (R1) plus a second portion (R2), and the first user (A) 5 wishes to "spend" the first portion (R1) and have the second portion (R2) returned as change.

Figure 3A:
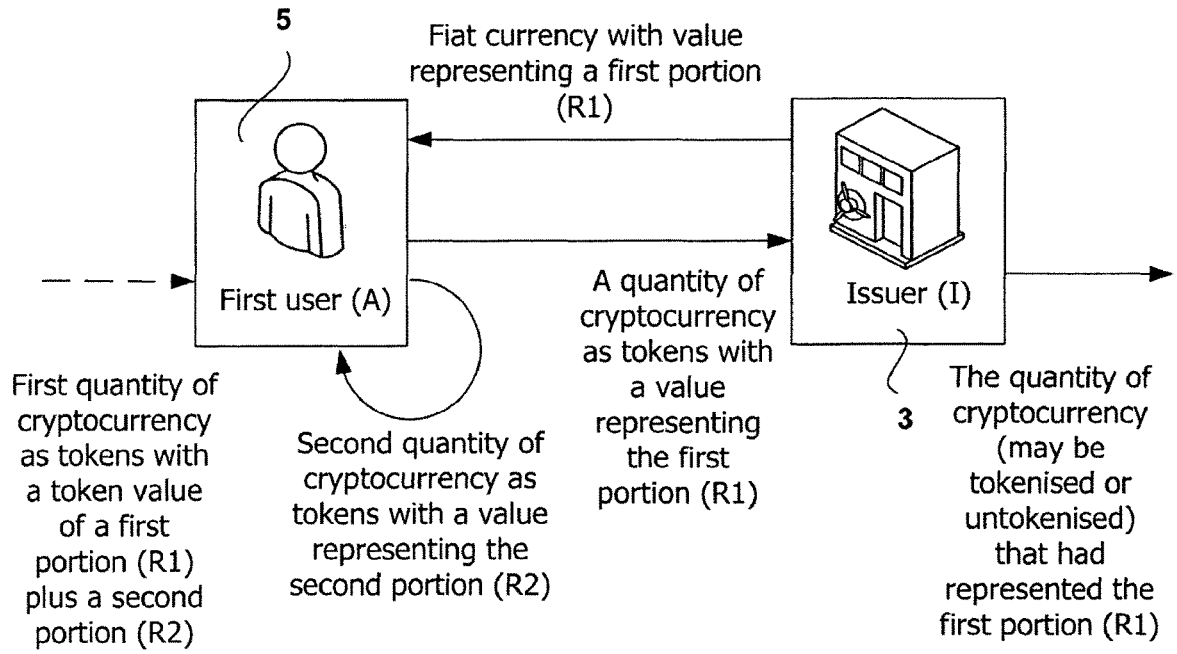
FIG. 3(a) is a diagram illustrating an example of a fourth type of transaction between the first user and the issuer that redeems a portion of value of the token.

In the fourth type of transaction, as shown in FIG. 3(a), the first user (A) 5 has a first quantity of cryptocurrency (B1) representing a first token (T1) from a previous transaction. The first user (A) 5 then redeems the first portion (R1) of the token (T1) by transferring a quantity of cryptocurrency as tokens with a value of the first portion (R1) and in return receives fiat currency with a value representing the first portion (R1). Because only the first portion (R1) is redeemed, the remaining second portion (R2) stays with the first user (A) 5. This is shown as the second quantity of cryptocurrency (B2) as tokens with a value representing the second portion (R2). In one example, the second quantity of cryptocurrency (B2) is the first quantity of cryptocurrency (B1) less the quantity transferred to the issuer (I) 3.

Figure 3B:
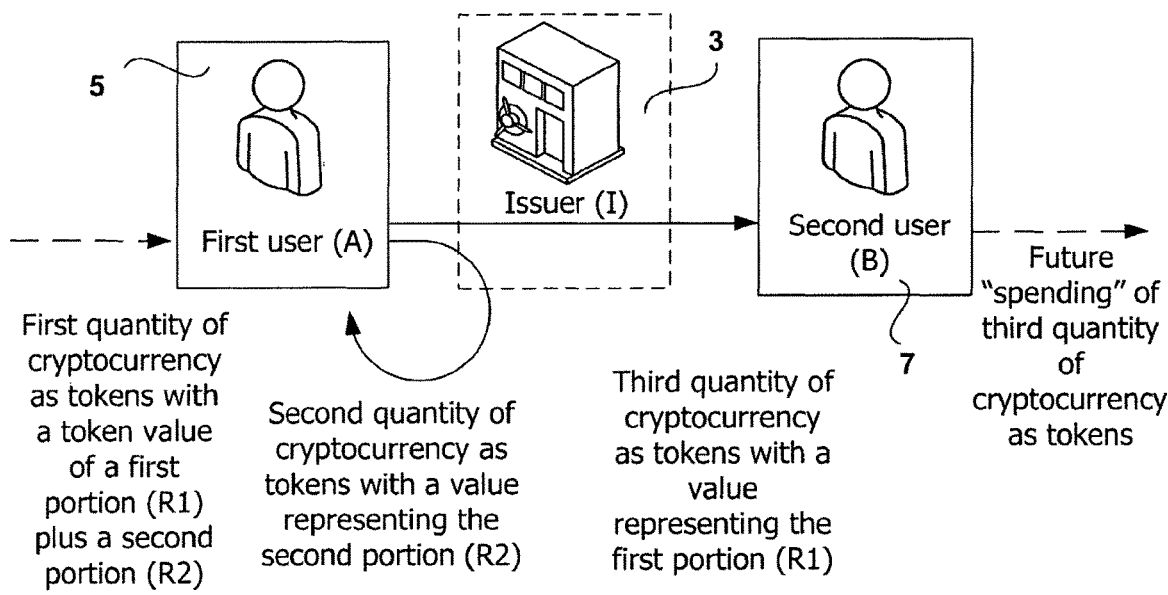
FIG. 3(b) is a diagram illustrating an example of a fifth type of transaction between the first user and the second user, and facilitated by the issuer, that results in a transfer of a portion of the value of the token from the first user to the second user.

In the fifth type of transaction, as shown in FIG. 3(b), the first user (A) 5 also has a first quantity of cryptocurrency (B1) representing a first token (T1) from a previous transaction. The first user (A) 5 then transfers the first portion (R1) of the tokens (T1) by transferring a third quantity of cryptocurrency (B3) as tokens with a value of the first portion (R1) to the second user (B) 7. Because only the first portion (R1) is transferred, the remaining second portion (R2) stays with the first user (A) 5. This is shown as the second quantity of cryptocurrency (B2) as tokens with a value representing the second portion (R2). In one example, the second quantity of cryptocurrency (B2) and the third quantity of cryptocurrency (B3) are derived from the first quantity of cryptocurrency (B1).

Detailed examples of the above mentioned types of transactions will now be described.

First Type of Transaction—Issuer Creates a First Token (T1) for the First User (A)

A non-limiting example application of the method described herein includes a first user (A) 5 that deposits a fiat currency amount (e.g., $1000 AUD) to the issuer (I) 3 (e.g., a financial institution) who in turn creates a first token (T1) for the first user (A) 5 that represents the value of the deposited fiat currency. Depending on the particular terms and conditions, the first user (A) 5 may redeem the first token (T1) at a future date for a value associated with the deposited fiat currency. The terms and conditions may also allow the first user (A) 5 to have at least part of the value of the token transferred to a second user (B). Such terms and conditions may be specific to the token or may be general terms and conditions between the users 5, 7 and the issuer (I) 3.

Overview of the Method of Creating a Token

Figure 4:
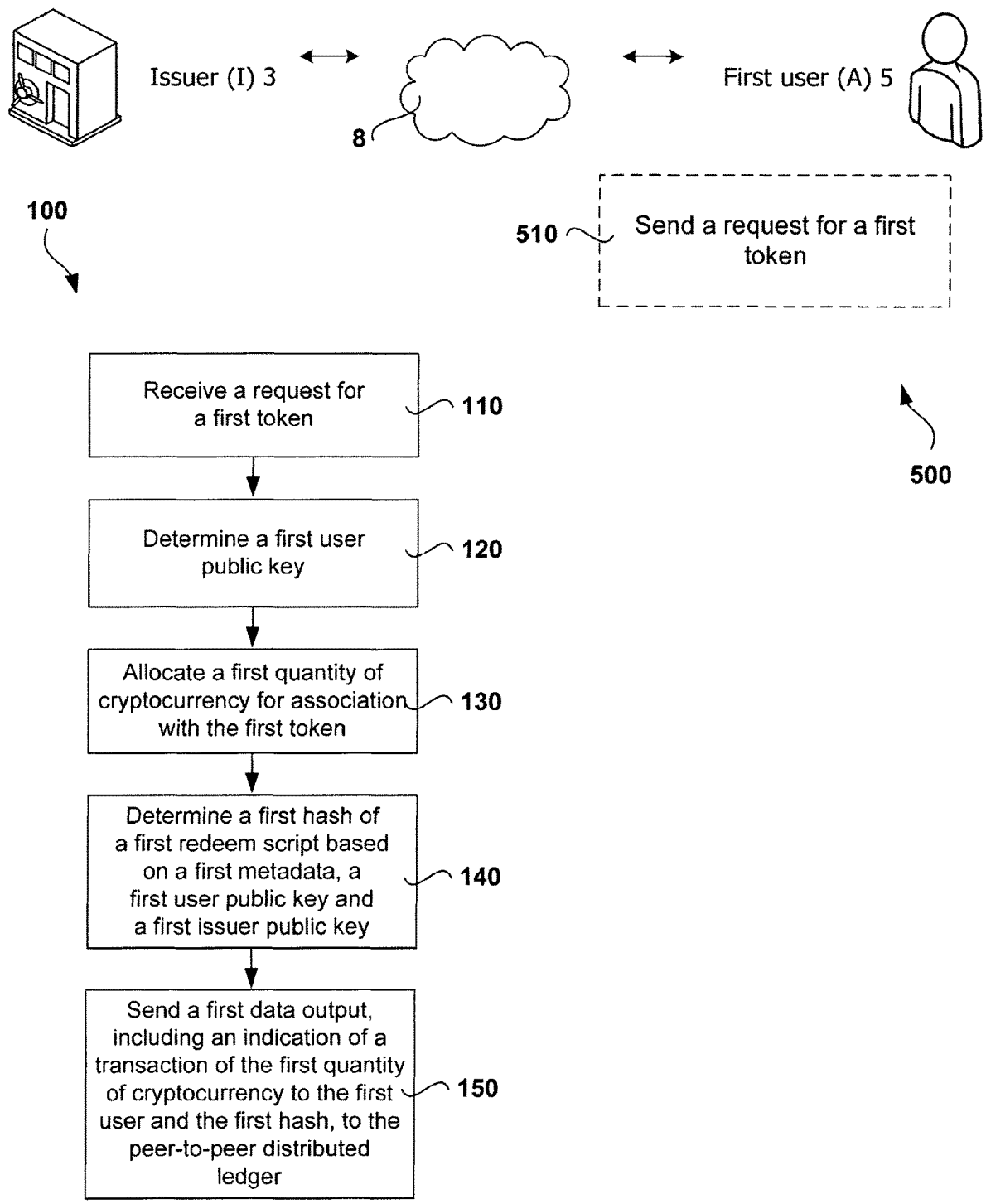
FIG. 4 is a flow chart of a computer-implemented method for creating a token.

An example of a method 100 of creating a first token (T1) by the first processing device 13 at the issuer (I) 3 will be now be described referring to FIGS. 2(a) and 4. The method 100 includes receiving 110, over the communications network 8, a request from the first user (A) 5 for a first token (T1). The method also includes determining 120 a first user public key (P1A) that forms a cryptographic pair with a first user private key (V1A).

The method 100 includes allocating 130 a first quantity of cryptocurrency (B1) for association with the first token (T1). The method 100 further includes determining 140 a first hash (H1) of a first redeem script (RS1), wherein the first redeem script (RS1) is based on: at least a first metadata (MD1) that includes information associated with the first token (T1); the first user public key (P1A); and a first issuer public key (P1I) associated with the issuer (I), wherein the first issuer public key (P1I) forms a cryptographic pair with a first issuer private key (V1I).

The method 100 also includes sending 150, over the communications network 8, a first data output (O1) to the peer-to-peer distributed ledger 9. The first data output (O1) includes: an indication of a transaction of the first quantity of cryptocurrency (B1) to the first user (A) 5; and the first hash (H1), wherein the first hash (H1) is associated with the first quantity of cryptocurrency (B1), to provide the first token (T1) that is associated with the first user (A) 5 and issuer (I) 3.

Thus, the method 100 allows creation of a token whereby a record of the token is sent to the peer-to-peer distributed ledger 9. An advantage of recording this transaction on the peer-to-peer distributed ledger 9 is that it may allow the recipient, such as the first user (A) 5 to validate the existence of the token (T1). Furthermore, because the at least first metadata (MD1) that includes information associated with the first token (T1) is hashed, this allows the validation of the transaction (which is on the public record) against the information associated with the token. In one example, information associated with the first token (T1) may be terms and conditions of a contract. Thus, including the terms and conditions in the first redeem script to be hashed may advantageously provide comfort to the first user (A) 5 (or any other user) that the terms and conditions cannot be varied, as any variation would alter the first hash (H1). Because the first hash (H1) was sent and recorded on the peer-to-peer distributed ledger 9 at the time of creating the first token (T1), it would be impossible (or difficult) to alter the terms and conditions at a later time that would provide an identical first hash (H1).

A detailed example of the issuer (I) 3 creating tokens for the first user (A) 5 will now be described, including the initial process of registration 400.

Method of Registration 400

Figure 5:
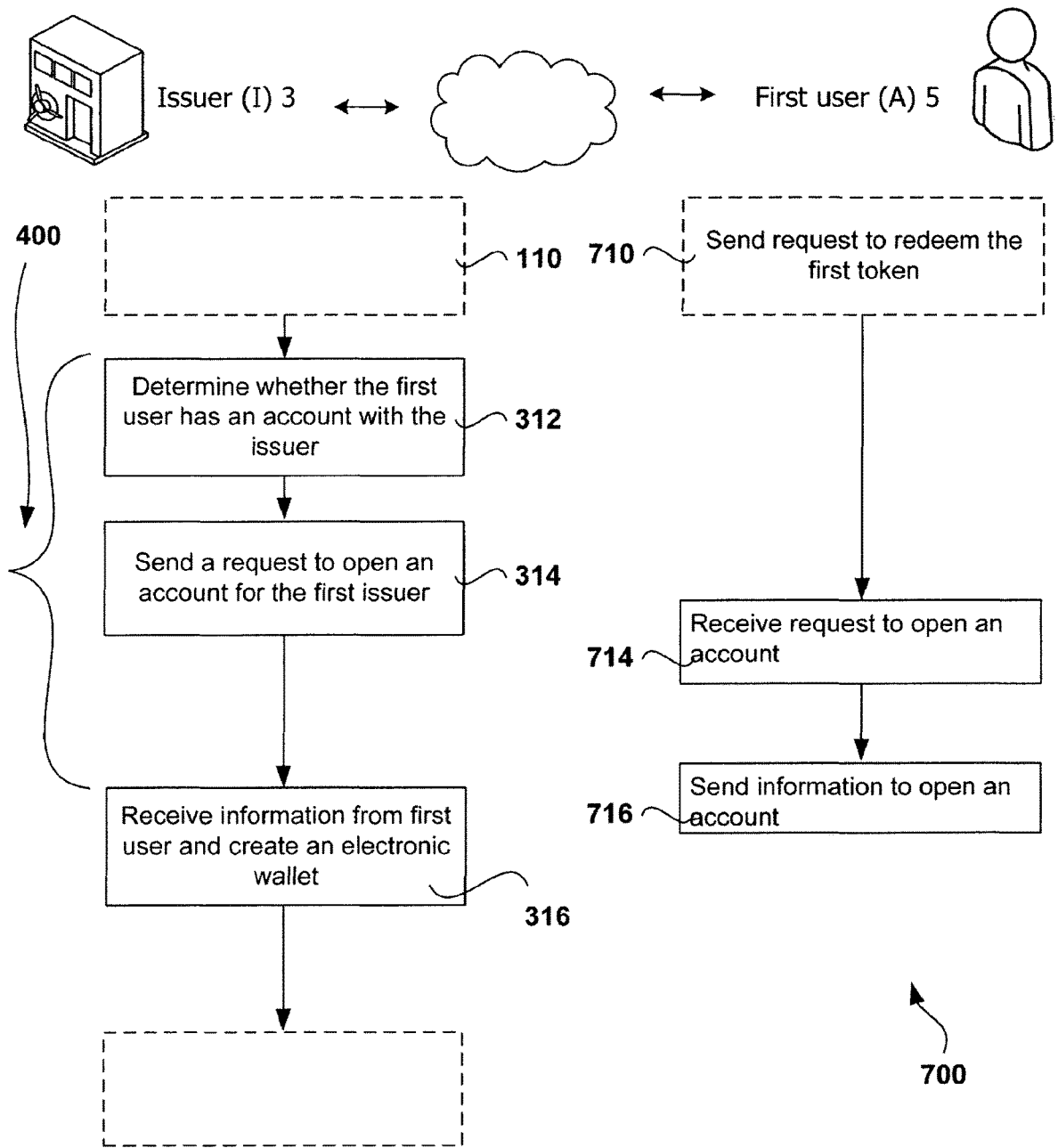
FIG. 5 is a flow chart of a computer-implemented method of registration of a user.

A method of registration 400 will now be described with reference to FIG. 5. The method 400 may include determining 312 whether the first user (A) 5 has an account with the issuer (I) 3. In particular, this may include determining if the first user (A) 5 has an account that is suitable for facilitating transactions associated with the first token (T1).

If the first user (A) 5 does not have an account, the method 400 may further include sending 314, over a communications network 8, a request to open an account for the first user (A) 5. The request to open account may include sending, to the first user (A) 5, general details of terms and conditions for an account with the issuer (I) 3 as well as a request to the first user (A) 5 to accept the terms and conditions. This may also include sending a request for details of the first user (A) 5.

In addition, sending a request to open an account may also include sending a request for generation of a cryptographic pair including a first user private key (V1A) and the first user public key (P1A) for the first user (A) 5. In some examples, this may include sending a request to another node associated with the issuer (I) 3 to generate the first user private key (V1A) and the first user public key (P1A), whereby the other node in turn generates and sends to the first user (A) 5. In other examples, this may include sending to the first user (A) 5 a request to generate, at the second processing device 15 associated with the first user (A) 5, the first user private key (V1A) and the first user public key (P1A). It is to be appreciated that these keys associated with the first user (A) 5 may be generated by, or at, other means, so long as the first user private key (V1A) is kept secure and used only with authorisation from the first user (A) 5.

The first user (A) 5 may receive 714 the request to open an account and in turn send 716, to the issuer (I) 3, information to open the account.

The method of registration 400 may also include creating 316 an electronic wallet associated with the account of the first user (A) 5 and storing information associated with this electronic wallet and account in the data store 11.

In some examples, the first user private key (V1A) may be stored in the electronic wallet, whereby ideally the first user private key (V1A) is only accessible with authorisation from the first user (A) 5. For example, the electronic wallet may have multiple private keys associated with the first user (A) 5, whereby the first private keys are available when the first user (A) 5 successfully, and securely, logs on with issuer (I) 3 (such as in a virtual machine environment or a terminal). The first user (A) 5 may then selectively authorise the issuer (I) 3 to retrieve and use these private keys from the data store 11 for transactions. In some examples, the user private keys are not stored in the electronic wallet, but are able to be recreated by the issuer (I) 3 with authorisation from the respective user. In yet another examples, the user private keys may be split keys, with the electronic wallet having one portion and the user having the remaining portion, whereby they can be combined to recreate the private key.

In other examples, the first user private key (V1A) may be kept separate to the issuer (I) 3, first processing device 13, and data store 11. For example, the first user (A) 5 may keep a hard copy of the first user private key (V1A) in a safe, or in a secure part of a personal electronic device, computer, or storage device.

It is to be appreciated that steps in the method 400 may be performed during method 100, for example after the step of receiving 110 a request from a first user (A) 5 for a first token (T1). In other examples, the method or registration 400 may be performed beforehand.

Detailed Method of Creating a Token 100

The method 100 of creating a first token (T1) will now be described in detail with reference to FIGS. 2(a), 4 and 6 (which shows the methods 100 and 500 performed by the issuer (I) 3 and first user (A) 5 respectively). In this example, the creating tokens will be discussed in the context of the first user (A) 5 depositing cash with the issuer (I) 3 in return for tokens representing the deposited cash. However, it is to be appreciated that this is a non-limiting example and that the tokens can be created in the context of other transactions. For example, the token may represent any other contract, negotiable instrument, tangible property, etc., and may represent a transferrable property including an access code for a barrier, for example, in the case of the token representing a ticket for a venue or a travel ticket or voucher.

Agreeing on Terms and Conditions for the Token

After or before the method of registration 400, the first user (A) 5 may send 510 a request for a first token (T1). In one example, the first user (A) 5 makes this request by depositing fiat currency, for example, $1000 AUD, with a request to have this amount in tokens (T1).

In one example, the request sent by the first user (A) 5 may include an offer for a contract. This offer may include one or more terms and conditions of a contract. For example, the first user (A) 5 may include in the request that the tokens associated with the deposit of $1000 AUD should have a fixed pegging rate to cryptocurrency. For example, a request includes that the pegging rate is 1000 satoshi/cent (AUD). It is to be appreciated that other terms and conditions may be included in the offer, such as account keeping fees, transaction fees, how the tokens can be redeemed, etc.

Figure 6:
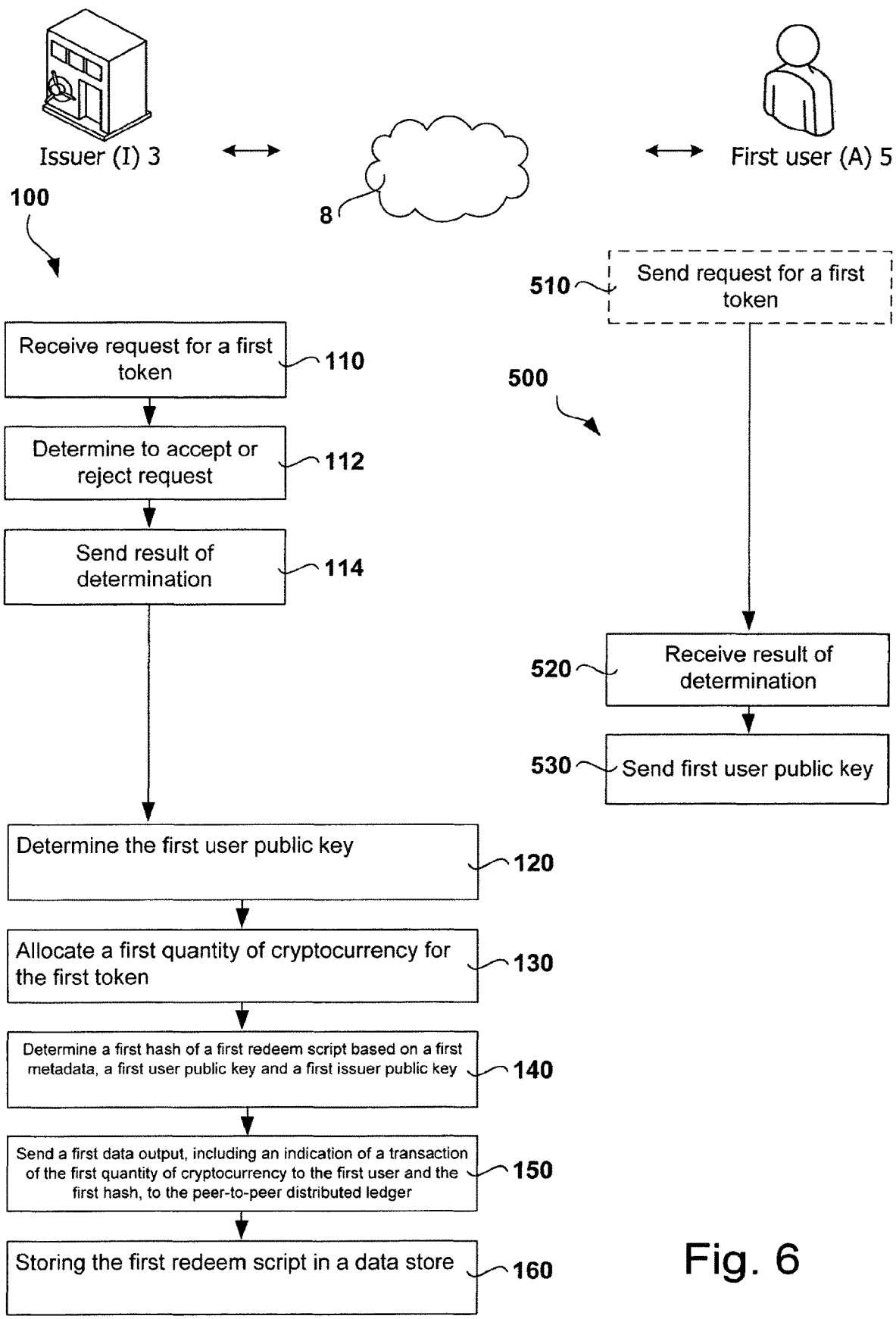
FIG. 6 is a flow chart of another example of a computer-implemented method of creating a token.

As shown in FIG. 6, the first processing device 13 of the issuer (I) 3 receives 110, over the communications network 8, the request from the first user (A) 5 for the first token (T1) and, in some cases, at least some of the terms and conditions.

The issuer (I) 3 may then determine 112 whether to accept the request, propose a counter offer that includes a modification of the terms and conditions of the request, or reject the request. The method 100 then includes sending 114, over the communications network 8, the result of the determination in step 112.

The first user (A) 5 may then receive 520, over the communications network 8, the result of the determination in step 112 that includes the acceptance, the counter offer, or rejection of the request.

In one alternative example, the request sent 510 to the issuer (I) 3 may simply include a request for a first token (T1). In this case, the issuer (I) 3 may send an offer, including terms and conditions, to the first user (A) 5. The first user (A) 5 may, in turn, determine whether to accept the offer, propose a counter offer, or reject the offer, which is then sent to the issuer (I) 3.

It is to be appreciated that steps 510, 520, and 110, 112, 114 may be modified to include multiple rounds of offers and counter offers that are sent and received between the issuer (I) 3 and first user (A) 5 until they are in agreement.

In some alternatives, the terms and conditions may be standardised, whereby the user accepts the terms and conditions by performing the steps in the methods 100, 500. In one example, the issuer (I) 3 may have standardised offers for tokens for their customers, including the first user (A) 5. Such offers for tokens may be listed publicly, such as on a public exchange or on the issuer's website. Standing offers may also be provided by the issuer (I) 3 to the first user (A) 5 privately, such as by email, through an application, or by logging in to a secure website.

The terms and conditions associated for the token may be stored in the data store 11, sent to a third party for storage, or torrented.

Determining the First User Public Key 120

The method 100 includes determining 120 the first user public key (P1A). In one example, the first user public key (P1A) may be sent 530 from the first user (A) 5, over the communications network 8, to the issuer (I) 3. In another example, the first user public key (P1A) may be stored in the data store 11 (which may, for example, be received and stored during registration of the first user (A) 5). Thus the step of determining 120 the first user public key (P1A) includes retrieving the key from the data store 11. In yet another example, the first user public key (P1A) may be received, over the communications network 8, from a third party. The third party may include, for example, a trusted third party that acts as a public directory, such as a certification authority.

Allocating a First Quantity of Cryptocurrency for Association with the Token 130

The method 100 includes allocating 130 a first quantity of cryptocurrency (B1) for association with the first token (T1). In order for a record of a transaction involving the first token (T1) to be recorded on the peer-to-peer distributed ledger (which in this example is the blockchain), the token must be associated with a quantity of cryptocurrency. In turn, that quantity of cryptocurrency is recorded on the peer-to-peer distributed ledger as a transaction from the issuer (I) 3 to the first user (A) 5. In other words, a blockchain transaction Tx is submitted to the blockchain network for inclusion in the ledger. The Tx includes an output which can be used to transfer the quantity of cryptocurrency (or ownership/control thereof) from one party e.g., the issuer (I) 3, to another party, e.g., the first user (A) 5.

The allocation of the first quantity of cryptocurrency (B1) for association with the first token (T1) may be based on a ratio of the token value. For example, a pegging rate (PR1) may be specified for the first token (T1). Thus, the step of allocating 130 a first quantity of cryptocurrency (B1) may include determining a first quantity of cryptocurrency (B1) based on the pegging rate (PR1) and the first token value (TV1). As an illustrative example, the pegging rate (PR1) may be 1000 satoshis/cent AUD and the first token value (TV1) is $1000 AUD. Thus, the first quantity of cryptocurrency (B1) may be 10,000,000.

The quantity of cryptocurrency to be allocated for a token may be influenced by some of the following considerations. Firstly, the allocated quantity of cryptocurrency ideally has a market value (for this purpose, this means the market value of the cryptocurrency in itself, assuming it has a value, without reference to the token value) that is less than the value of the token ("token value"). This is desirable so that there is no motivation to use the quantity of cryptocurrency for the underlying value rather than as a token. This may be analogous to cash coins where it is desirable to have the face value of the coin to be higher than the metal the coin is minted from, so that there is no desire to melt the coins for the value of the metal. In some examples, the token value is multiples larger than the underlying value of the quantity of cryptocurrency. However, it is to be appreciated that some tokens may not have a fixed or easily determinable token value. For example, the token may be representative of a contract to perform work, whereby the value may change day to day. In other examples, the contract may only have a value that is determinable on the day it is redeemed.

Another consideration is that the quantity of cryptocurrency allocated should not be too large, relative to the token value or the value of the transaction, since recording a transaction of the quantity of cryptocurrency on the peer-to-peer distributed ledger may be at a cost, such as incurring a transaction fee. In some examples, the transaction fee is based on the quantity of cryptocurrency in the transaction and therefore it may be desirable to keep the quantity of cryptocurrency for the token at a minimum level.

On the other hand, the quantity of cryptocurrency allocated for association with the token cannot be infinitely small. Firstly, the cryptocurrency may have a minimum denomination amount, and for example, Bitcoin has a minimum amount of one satoshi (where 1 bitcoin (BTC)=10,000,000 satoshi). Secondly, a transaction of cryptocurrency may be limited to a minimum size or else it will not be recorded (or the cost of the transaction will be close to, or exceed, the cost of performing the transaction). This minimum amount, in some examples, is a "dust" limit. Thus in some examples, allocating a quantity of cryptocurrency for a token must be above a minimum threshold of cryptocurrency (MT1). Therefore the method 100 may include determining the minimum threshold of cryptocurrency (MT1) suitable for the first token (T1) and determining a first quantity of cryptocurrency (B1) that is at or above the minimum threshold of cryptocurrency (MT1). In one example, the minimum threshold of cryptocurrency (MT1), in "Bitcoin," is 546 satoshis.

Another consideration when allocating the quantity of cryptocurrency for a token is divisibility of the quantity of cryptocurrency for subsequent tokens. For example, the first token (T1) may have a token value (TV1) of $1000 AUD and the first user (A) 5 may wish to transfer $800 AUD of the token value to the second user (B) 7 and keep the remaining $200 AUD tokens. Such a transaction would involve a transaction with the first token (T1) that results in a second token (T2) representing $200 AUD that stays with the first user (A) 5 as change and creating a third token (T3) representing $800 AUD to be transferred to the second user (B) 7. Thus the result of this transfer is two tokens, the second token (T2) and third token (T3), where each of these tokens must also be allocated a quantity of cryptocurrency. If the first quantity of cryptocurrency (B1) was minimal, for example at the "dust" limit, then further amounts of cryptocurrency will need to be sourced so that each of the new tokens created are also associated with sufficient quantities of cryptocurrency to satisfy a minimum threshold. Therefore, there may be advantages to allocating a sufficient quantity of cryptocurrency (B1) for the first token (T1) such that the amount is sufficient to be divided up to be used for an anticipated number of subsequent tokens.

In one example, the terms and conditions may specify the quantity of cryptocurrency or the minimum value or denomination of a token. For example, the terms and conditions may set the minimum denomination of token value to $10 AUD. Therefore, allocating a first quantity of cryptocurrency (B1) for a first token (T1) with a token value (TV1) of $1000 AUD may include determining a first quantity that will ensure that there is sufficient cryptocurrency if the entire token value (TV1) is divided up to the smallest denomination. In this example, the token value (TV1) may be divided to 100 subsequent tokens (calculated by $1000/$10). Therefore a suitable first quantity of cryptocurrency (B1) may be 100 times the "dust" limit.

Determining a First Hash (H1) of a First Redeem Script (RS1) 140

The method 100 further includes determining 140 a first hash (H1) of a first redeem script (RS1). In one example, the hash of the redeem script may be used to provide a pay-to-script hash (P2SH) address for a pay-to-script hash transaction. An example includes the hash functions used in P2SH script in the Bitcoin protocol. This may include a combination of SHA 256 followed by RIPEMD160.

The first redeem script (RS1) is a script that may be used to unlock the first token (T1), which, as discussed later, includes a transaction of the first quantity of cryptocurrency (B1). When unlocking the first token (T1), certain conditions of the first redeem script (RS1) must be met to unlock the transaction. In particular, the signatures of the first user (A) 5 and issuer (I) 3 are required. An example of the first redeem script (RS1) will now be described.

The First Redeem Script (RS1)

The first redeem script (RS1) is based on: at least a first metadata (MD1) that includes information associated with the first token, the first user public key (P1A) and the first issuer public key (P1I).

(i) Redeem Script in P2SH in General

As background, in a pay-to-script hash method, the redeem script may take the form of:

<NumSigs PubK1 PubK2 . . . PubK15 NumKeys OP_CHECKMULTISIG> where

NumSigs—is the number "m" of valid signatures required to satisfy the redeem script to unlock the transaction;

PubK1, PubK2 . . . PubK15—are the public keys that correspond to signatures that unlock the transaction (up to a maximum of 15 public keys); and NumKeys—is the number "n" of public keys (which must be 15 or less).

To unlock the above redeem script, at least a number "m" of signatures corresponding to the public keys are required. In some examples, the order of the public keys is important and the number "m" out of "n" signatures for signing must be done in sequence. For example, say that "m" is two and the number of public keys "n" is fifteen. Say that if two signatures are available for use, e.g., Sig1 (corresponding to PubK1) and Sig15 (corresponding to PubK15), then the redeem script must be signed by Sig1 first followed by Sig15.

(ii) The First Redeem Script (RS1) Using P2SH

Turning back to the present example, the first redeem script (RS1) that utilises P2SH may include the at least first metadata (MD1) in the redeem script. In particular, the at least first metadata (MD1) may be embedded in one or more of the 15 places available for the public keys in the redeem script.

Therefore in one example, the first redeem script (RS1) may take the form of:

<NumSigs Metadata1 Metadata2 . . . PubK1 PubK2 . . . NumKeys OP_CHECKMULTISIG> where NumSigs—is the number "m" of valid signatures required to satisfy the redeem script to unlock the transaction;

Metadata1 and Metadata2—includes metadata that takes the place of a public key;

PubK1 and PubK2—are actual public keys. In one example, PubK1 may be the first user public key (P1A) and PubK2 may be the issuer public key (P1I); and NumKeys—is the is total number of positions taken by the metadata and the public keys (which must be 15 or less).

The advantage of this is that the metadata will be included in the first redeem script (RS1), which in turn will be hashed and the record of which will be included in the peer-to-peer distributed ledger 9. Therefore it would be difficult, if not impossible, to change the values of the metadata without resulting in a change of the corresponding hash of the first redeem script hash (RS1).

A practical advantage may be illustrated by the following example. The first user (A) 5 and the issuer (I) 3 may wish to enter into a contract with particular terms and conditions. The contract may include the issuer (I) 3 creating a token, whereby the specific terms and conditions are included in the metadata embedded in the redeem script. A hash of the redeem script is then recorded on the peer-to-peer distributed ledger 9, which becomes a record of the transaction that is difficult or impossible to change. Say the issuer (I) 3 attempts to deceive the first user (A) 5, and, for example, attempts to modify a term and alleges that the modified term was in the originally agreed contract. The first user (A) 5 may be able to contest this by placing the modified term in the metadata of the redeem script and hashing it, and then showing that this does not match the redeem script recorded on the peer-to-peer distributed ledger. Therefore, including information associated with the token in the at least first metadata may be useful for ensuring the integrity of the token.

It is to be appreciated that the metadata in the redeem script may itself include a hash of other information. For example, if the terms and conditions are lengthy, a hash of the terms and conditions may be used to provide a shorter metadata.

The first redeem script (RS1) may be stored in the data store 11 as a record and for redeeming the first token (T1). In some alternative examples, the first redeem script may be sent to the first user (A) 5, or a third party.

The Metadata

In the present example, the first redeem script (RS1) takes the form:

<2 Metadata1 Metadata2 P1A P1I4 OP_CHECKMULTISIG>

Thus, the at least first metadata (MD1) includes both Metadata1 and Metadata2 that occupies two of the places in the redeem script. This is followed by two public keys in sequence, the first user public key (P1A) and the first issuer public key (P1I). The NumSigs is 2, which means two signatures are required to unlock the transaction.

The metadata may include information regarding the token in a number of ways. As discussed, in one example, the terms and conditions may be included in the metadata. In another example, a hash of the terms and conditions may be included in the metadata. In yet another example, the metadata may include a pointer to a file that contains the terms and conditions of a contract. In further embodiments, combinations including one or more of the above may be included in the metadata.

(i) Metadata with Pointer to Terms and Conditions

A specific example of the first metadata (MD1) is illustrated in Table 1 below.

TABLE 1

| Metadata1 | Sub-field | Bytes | Value | Comments |
|---|---|---|---|---|
| Metadata1 | ContractType | 4 | | Coded value indicates type of contract. |
| | ContractPointer | 16 | | IPv6 address of the actual contract file location |
| | ContractTypeData1 | 12 | | Format depends on value of ContractType. Padded with zeros |
| Metadata2 | ContractHash | 20 | | RIPEMD-160(SHA256(actual contract file addressed by ContractPointer)) |
| | ContractTypeData2 | 12 | | Format depends on value of ContractTyoe, Padded with zeros |

This example includes a minimum amount of information in relation to the token and transaction. This example includes providing a pointer to the contract, which may be useful where the size of the contract precludes including such details in the metadata. Furthermore, since the metadata may be made public, or transmitted over an unsecure network, it may be desirable that specific details of the token be veiled or hidden for privacy reasons.

The first 4 bytes of metadata1 indicates the type of contract. For example, the contract type may be for "Fiat Currency." The next 16 bytes holds the IP address of the location of the actual electronic contract file, making allowance for IPv6 addresses. Note that in some embodiments, this value may point to the seed of a torrent file such that the contract file can be distributed over the cloud rather than being centralised. The following 12 bytes contains data specific to the type of contract.

The first 20 bytes of metadata2 is a hash of the actual contract file using RIPEMD-160 over SHA256 applied to the file. As the actual contract file is retrievable, this allows validation of the transaction against the contract. Note that the contract file itself may be completely public (unencrypted and human readable) or may be encrypted for privacy, depending on the requirements of the specific embodiment. The content of the remaining 12 bytes of metadata2 may be used depending on the type of contract.

(ii) Metadata with Key Parameters of the Token

Another specific example of the first metadata (MD1) is illustrated in Table 2 below:

Importantly, inclusion of the key parameters in the metadata may assist in greater processing efficiency, as the issuer (I) 3 may, in some cases, process the tokens in transactions without retrieving the contract file for the key information required to process the transactions.

In addition to the above information, other information relating to the history of the token or the tokens preceding the token may be included. For example, if the first user (A) 5 wishes to redeem a portion of the first token (T1), and a second token (T2) is created by the issuer (I) 3 to represent the value of the remaining portion, the issuer (I) 3 may embed information in the metadata to associate the second token (T2) with the first token (T1). This may assist the issuer (I) 3 to account for and keep track of the tokens without the expense of tracing through the history of transactions which, for an issuer (I) 3 such as a bank, can be an intensive task.

In Table 2, the metadata contains a 2-byte field to indicate the fiat currency (FiatDenomination) and 1-byte field called PeggingRate. The pegging rate is set by the issuer (I) 3. Several different rates may be set for the same fiat currency; however, a different token (with a different contract) will be needed for each different rate. The choice of rate may be at the discretion of the issuer (I) 3, however, who may take similar considerations for the pegging rate as for the allocation of the quantity of cryptocurrency for the token as discussed above.

In one example, the PeggingRate is an 8-bit coded value as follows:

Leftmost bit will be used as a flag:
    1=rate expressed as satoshis/cent ("cent" refers to one hundredth of the fiat currency, which is the minimum fiat amount)

TABLE 2

| Metadata1 | Sub-field | Bytes | Value | Comments |
|---|---|---|---|---|
| Metadata1 | ContractType | 4 | 0x00000001 | Indicates Fiat Currency |
| | ContractPointer | 16 | | IPv6 address of the actual contract file location |
| | Fiat Denomination | 2 | | Coded value indicating currency (e.g. 0x0001 = CAD, 0x0002 = PHP, etc) |
| | PeggingRate | 1 | | Coded value represents the BTC/fiat pegging rate. |
| | Transaction Type | 1 | | Coded value represents type of output (issuance/payment/redemption) |
| | Padding | 8 | | Spare byes |
| Metadata2 | ContractHash | 20 | | RIPEMD-160(SHA256(actual contract file addressed by ContractPointer)) |
| | ContractTypeData2 | 12 | | Spare bytes |

In this example, some key parameters of the token are included in the metadata. By key parameters, this may include information relevant to the token itself or information that may assist in processing of the transaction. In particular, the bytes allocated to the Sub-field "ContractTypeData1" in Table 1 above have been used for indicating: fiat denomination, pegging rate, and transaction type.

0=rate expressed as cents/satoshi

The rightmost seven bits represents the rate as a power of ten in binary, for example:
    USD 10000010 means rate of 100 satoshis/cent (flag is on)
    PHP 00000000 means rate of 1 centavo/satoshi (flag is off)

IDR 00000001 means rate of 10 rupiah/satoshi (flag is off)

In one example, TransactionType is a 1-byte field indicating whether the transaction is an "issuance" (in which a token is created from cryptocurrency), a payment (in which at least part of the token value is transferred from one user to another user); or a redemption (in which tokens are transferred to the issuer (I) 3 and converted back to regular cryptocurrency).

In some examples, the "Padding" in both the Metadata1 and Metadata2 may include randomly generated values for each transaction. The result is that each of Metadata1 and Metadata2 will vary between transactions. An advantage is that this may lower the risk, and motivation, of an unscrupulous person trying to determine a private key that would match one or both of Metadata1 or Metadata2 as a cryptographic pair (for the purpose of using such a private key to sign the redeem script). This may be important for standardised tokens where the remaining bulk of the Metadata1 or Metadata2 is the same.

The Public Keys

The first user public key (P1A) and the issuer public key (P1I) are respectively paired with corresponding first user private key (V1A) and issuer private key (P1I). It is to be appreciated that the public keys may be known widely to the public, whilst in other examples it may be desirable to communicate the public keys as required. In any case, only the public key is required for the redeem script as the corresponding private keys are only required when signing and unlocking the redeem script (such as when redeeming the token).

provide a record of the first token (T1) that is associated with the first user (A) 5 and the issuer (I) 3.

Importantly, the first hash (H1) is on the peer-to-peer distributed ledger 9, which can be used to prove or verify the existence of the token (T1), the relationship between the issuer (I) 3 and first user (A) 5, and/or the terms and conditions of the token.

The method may also include storing 160 the first redeem script (RS1) in a data store 11 for later use.

A specific example of a transaction that creates a first token (T1) will now be described with reference to FIG. 2(a).

First User (A) 5 Deposits $1000 AUD to the Issuer (I) for Equivalent Value in a Token In this example, the first user (A) 5 wishes to deposit $1000 AUD to the issuer (I) 3, who, in return creates a first token (T1), with a token value (TV1) of $1000 AUD, by associating this with a first quantity of cryptocurrency (B1) of 10,000,000.

To create tokens, the issuer (I) 3 needs to have cryptocurrency. This may be sourced from previous transactions, or sourced in response to the request from the first user (A) 5 for a first token (T1). This is shown on the left hand side of FIG. 2(a) as the "First quantity of (untokenised) cryptocurrency."

Table 3 below shows an originating transaction output, in the form of transaction-ID/Satoshis amount/locking script. This originating transaction output represents the cryptocurrency that the issuer (I) 3 has acquired from a previous transaction and in which at least some of the cryptocurrency will be used for association with the first token.

TABLE 3

| ID-201 |
|---|
| 50,000,000 |
| OP_DUP OP_HASH160 <PubK-Issuer hash> OP_EQUALVERIFY OP_CHECKSIG |

As noted above, in some alternatives the first and second users 5, 7 may access their electronic wallet through a virtual machine environment or a terminal. The electronic wallet may be hosted by the issuer (I) 3 (or a server associated with the issuer (I) 3) wherein the private key(s) of a corresponding user are stored in the data store 11 but can only be accessed (or recreated) by the issuer (I) 3 with authorisation from that user. In such cases, the first and second users 5, 7 may authorise their private keys to be provided to the issuer (I) 3 to unlock the redeem script. This may include authorising the user's private key(s) to be sent to the first processing device 13 of the issuer (I) 3, wherein the first processing device 13 may unlock the redeem script with the user's private key(s) (e.g. P1A, P1B) and the first issuer public key (P1I).

Sending a First Data Output (O1) to a Peer-to-Peer Distributed Ledger 150

The method 100 further includes sending 150, over a communications network 8, a first data output (O1) to a peer-to-peer distributed ledger 9. This first data output (O1) may include an indication of a transaction of the first quantity of cryptocurrency (B1) to the first user (A) 5. That is, recording that the underlying quantity of cryptocurrency (B1) associated the first token (T1) has been transferred to the first user (A) 5. The first data output (O1) also includes the first hash (H1) discussed above. The first hash (H1) is associated with the first quantity of cryptocurrency (B1), to The first line "ID-201" is a transaction identifier to identify this transaction. The next line is the number of satoshis in this transaction, which is 50,000,000. The third line is the locking script (output script) for this transaction. The redeem script in this output, <PubK-Issuer hash>, shows that this output has been locked with the first issuer public key (P1I). That is, this transaction can be unlocked using the issuer's corresponding first issuer private key (V1I).

As discussed above, the method 100 includes allocating a first quantity of cryptocurrency (B1) suitable for the first token (T1). However, the quantities of cryptocurrency that the issuer (I) 3 has on hand may not exactly match the first quantity of cryptocurrency (B1). In the present example, the required first quantity of cryptocurrency (B1) is 10,000,000 which is much less than the 50,000,000 in the transaction ID-201.

Accordingly, a transaction to create a first token (T1) will include providing change of cryptocurrency back to the issuer (I) 3 for the excess amounts of cryptocurrency that was not required for the token.

Furthermore, the creation of the token may be a transaction that requires a payment of a transaction fee to a miner. This is illustrated with reference to Table 4 below which shows the transaction for creating the tokens.

TABLE 4

| | |
|---|---|
| ID-210 | Transaction-ID |
| Version number | Version number |
| 1 | Number of inputs |
| ID-201 | Prev Trans Output |
| IDX-00 | Prev Trans Output index |
| Sig-Issuer PubK-Issuer | ScriptSig |
| 00000000000000000000000000000011 | Sequence number |
| 2 | Number of outputs |
| 10,000,000 | Output value |
| Output script length | Output script length |
| OP_HASH160<redeem script hash> OP_EQUAL | Output script |
| 39,9999,000 | Output value |
| Output script length | Output script length |
| OP_DUP OP_HASH160<PubK-Issuer hash> OP_EQUALVERIFYOP_CHECKSIG | Output script |
| LockTime | LockTime |

The first line "ID-210" is a transaction identifier to identify this transaction. The second line indicates the "Version number," which states the version of the Bitcoin protocol used. The third line indicates the number of inputs for this transaction, which indicates a single input.

The fourth to seventh lines in Table 4 relates to those of the "input"—that is, a previous transaction, ID-201, that is funding the present transaction, ID-210. The fourth line is the transaction identifier of the previous transaction. The fifth line "IDX-00" is an index of the output of the previous transaction, ID-201 (which in this case is a reference that the first output from the previous transaction, ID-201, should be used). The sixth line is the "ScriptSig," which is the unlocking script for the previous transaction, ID-201. As noted above, the previous transaction was locked with the first issuer public key (P1I), which is represented by PubK-Issuer. Accordingly, the previous transaction can be unlocked using the issuer's corresponding first issuer private key (V1I) that is represented as Sig-Issuer. The seventh line is a sequence number associated with the input.

In Bitcoin transactions, each contains a 4-byte field called "sequence number," which is no longer used by the Bitcoin core. Depending on the issuer's implementation, an option is to utilise this field to allocate transaction inputs to outputs. The sequence number can represent a string of 1-bit flags whereby the position of each flag starting with the rightmost bit indicates that the input has contributed part of its funds to the flagged output. In this example, the sequence number "00000000000000000000000000000011" indicates that the input is to be paid into outputs 1 and 2, which will be described below.

Line 8 in Table 4 indicates the number of outputs for this transaction, which is two. Lines 9 to 11 represent the first output, and lines 12 to 14 represent the second output.

The first output reflects the first quantity of cryptocurrency (B1) that is associated with the first token (T1). Line 9 is an output value of first quantity of cryptocurrency (B1), which is 10,000,000 satoshis. Line 10 indicates the output script length. Line 11 is the output script—i.e., the locking script that locks the first quantity of cryptocurrency (B1). This includes the first hash (H1) of a first redeem script (RS1) and is represented by:

OP_HASH160<redeem script hash> OP_EQUAL

The "OP_HASH160" is a type of hash function where the input is hashed twice—with SHA-256 and subsequently with RIPEMD-160. The redeem script hash is the hash of the first redeem script (RS1), which is in the form described above, and for this example is:

2 metadata1 metadata2 P1A P1I4 OP_CHECKMULTISIG

This includes the first user public key (P1A) and the first issuer public key (P1I) as described above. The metadata 1 and metadata2 may include metadata as described above, including an indication that this is an "issuance" transaction. OP_EQUAL provides a Boolean result for verifying the output.

The second output reflects the issuer's change for the transaction. Since the input, being the previous transaction ID-201, included 50,000,000 satoshis, the issuer (I) 3 can expect to receive leftover satoshis. Line 12 is an output value for the second output, which is 39,999,000. Line 13 is the output script length, and line 14 is the output script for the second output. Because the second output is the change back to the issuer (I) 3, the issuer (I) 3 should be free to spend the second output. Accordingly, the output script (i.e., locking script) only includes the first issuer public key (P1I), which is represented by <PubK-Issuer hash>.

Generally, the output value(s) of a transaction must be equal to or less than the input. In the above example, the input was 50,000,000 and the output is 49,999,000 (based on 10,000,000 of the first output and 39,999,000 of the second output). Thus, there is a deficit of 1,000 satoshis. In this example, the 1,000 satoshis is a transaction fee (e.g., miner's fee).

Second Type of Transaction—First User (A) Redeems Tokens with Issuer (I)

Overview of Redeeming a Token

In this example, the issuer (I) 3 is a service provider that provides electronic wallets for the users 5, 7, wherein the private keys of the users are kept secure in a data store 11 associated with the issuer (I) 3. Therefore in this example, the users 5, 7 (or their respective processing devices 15, 17) do not sign the redeem script. Instead, the issuer (I) 3, with authorisation from the users 5, 7, signs the redeem script. This may be illustrated in the methods 200 and 600 shown in FIG. 7 where the first user (A) 5 sends 610 a request to redeem a first token to the issuer (I) 3. Either implicitly, or explicitly, this request to redeem a first token also includes an authorisation by the first user (A) 5 for the issuer (I) 3 to use the first user private key (P1A) to redeem the first token.

The method 200 includes receiving 210, over the communications network 8, a request 610 from the first user (A) 5 to redeem the first token (T1). The method 200 includes determining 220 the first redeem script (RS1) associated with the first token (T1).

The method also includes the issuer (I) 3 receiving 235 the first user private key (V1A). In one example, this includes retrieving the first user private key (V1A) from the data store 11. It would be appreciated that the user private keys, which may be contained in the electronic wallet administered by the issuer (I) 3 should be kept secure. In another alternative, the issuer (I) 3 may receive the first user private key (V1A) from another entity or node.

The issuer (I) 3 may then sign 245, with the user private key (P1A) and the first issuer private key (P1I), the first redeem script. This may be advantageous as the issuer (I) 3, who is the service provider for the first user (A) 5, can perform these steps securely at the first processing device 13 and without sending the first redeem script (RS1), signed or unsigned, over the communications network 8.

The method 200 also includes sending 260, over the communications network 8, a second data output (O2) to the peer-to-peer distributed ledger 9 comprising an indication of a transaction of the first quantity of cryptocurrency (B1) to the issuer (I) 3.

Thus, the method 200 returns the first quantity of cryptocurrency (B1) associated with the first token (T1) back to the issuer (I) 3. In one example, since the first redeem script (RS1) is signed with the private keys of both the first user (A) 5 and the issuer (I) 3, the recipient of the first quantity of cryptocurrency (B1) in this transaction, being the issuer (I) 3, may then spend the first quantity of cryptocurrency (B1) for other transactions—whether as cryptocurrency alone or with other associated tokens.

A specific example of a transaction to redeem the first token (T1) will now be described.

First User (A) 5 Redeems the First Token (T1) for $1000 AUD from the Issuer (I) 3

In this example, the first user (A) 5 wishes redeem the first token (T1) with the issuer (I) 3 for the token value as shown in FIG. 2(b). This results in a transaction of the first quantity of cryptocurrency (B1) from the first user (A) 5 to the issuer (I) 3, referred to as transaction ID-510 below. In return, the issuer (I) 3 provides $1000 AUD in fiat currency to the first user (A) 5.

In this example, the first token is redeemed by unlocking the first quantity of cryptocurrency (B1) and transferring them to the issuer (I) 3. The transfer of the first quantity of cryptocurrency (B1) back to the issuer (I) 3 allows to issuer (I) 3 to then spend the first quantity of cryptocurrency (B1) for future transactions. The issuer (I) 3 may also "detokenize" the first quantity of cryptocurrency (B1) by one or more transactions that removes the metadata (which may include the redeeming transaction that transferred the first quantity of cryptocurrency (B1) back to the issuer (I) 3). The issuer (I) 3 may further spend this cryptocurrency without the restriction of requiring authorisation (such as a signature) from the first user (A) 5 or other user.

Before describing the transaction to redeem the first token, ID-510, we will briefly describe the originating transaction outputs (from transaction ID-210 and ID-610) that are the inputs to the present redemption transaction, ID-510. The two inputs, in general, include the first quantity of cryptocurrency (B1) associated with the first token (T1), and another quantity of cryptocurrency which, at least in part, is used to pay the transaction fee (e.g., miner's fee).

From the earlier example, the first user (A) 5 received the first quantity of cryptocurrency (B1) in transaction ID-210. The outputs that went to the first user (A) 5 in transaction ID-210 may be summarised as:

ID-210

10,000,000

OP_HASH160<redeem script hash> OP_EQUAL

Table 5

The second line in Table 5 represents the first quantity of cryptocurrency (B1) associated with the first token (T1), which numbers in 10,000,000 satoshis. The third line represents the output script, which is equivalent to line 11 in Table 4 described above. From the earlier example, the transaction, ID-210, that created the first token (T1) had two outputs, but only the first output that corresponded to the first quantity of cryptocurrency (B1) is relevant to the redemption transaction ID-510. The second output in transaction ID-210 was change back to the issuer (I) 3 shown in Table 4.

The issuer (I) 3 also needs to pay the transaction fee (e.g., miner's fee) for the redemption transaction, ID-510, which is paid in part from a quantity of cryptocurrency received from a previous transaction, ID-610. This quantity of cryptocurrency may be summarised as:

ID-610

9,999,000

OP_DUP OP_HASH160<PubK-Issuer hash> OP_EQUALVERIFY OP_CHECKSIG

Table 6

The second line of Table 6 indicates the amount of cryptocurrency from the previous transaction, which is 9,999,000. The third line of Table 6 is the output script from this previous transaction. Since the cryptocurrency from this transaction, ID-610, is not associated with a token (or a user associated with a token), the redeem script hash is simply a hash of the first issuer public key (P1I), which is shown as PubK-Issuer. That is, to spend the output from transaction ID-610, this simply requires the signing with the first issuer private key (V1I).

The transaction, ID-510, to redeem the first token (T1), will now be discussed with reference to Table 7 below.

TABLE 7

| | |
|---|---|
| ID-510 | Transaction-ID |
| Version number | Version number |
| 2 | Number of inputs |
| ID-201 | Prev Trans Output |
| IDX-00 | Prev Trans Output index |
| Script length | Script length |
| Sig-V1A Sig-V1I <2 metadata1 metadata2 P1A P1I 4 OP_CHECKMULTISIG> | ScriptSig |
| 00000000000000000000000000000001 | Sequence number |
| ID-610 | Prev TransOutput |
| IDX-00 | Prev TransOutput index |
| Script length | Script length |
| Sig-Issuer PubK-Issuer | ScriptSig |
| 00000000000000000000000000000001 | Sequence number |
| 2 | Number of outputs |

TABLE 7-continued

| | |
|---|---|
| 10,000,000 | Output value |
| Output script length | Output script length |
| OP_HASH160<redeem script hash> OP_EQUAL | Output script |
| 9,998,000 | Output value |
| Output script length | Output script length |
| OP_DUP OP_HASH160<PubK-Issuer hash> OP_EQUALVERIFYOP_CHECKSIG | Output script |
| LockTime | LockTime |

The third line of Table 7 indicates that there are two inputs, and line 14 indicates that there are two outputs in this transaction, ID-510.

The first input is shown at lines 4 to 8, which is the input of the first quantity of cryptocurrency (B1) to be redeemed, which was from the previous transaction, ID-210. The fifth line, which is the previous transaction output index marked as "IDX-00," which refers to the first output from transaction ID-210, being the first quantity of cryptocurrency (B1). Line 7 shows the ScripSig to allow spending of the first quantity of cryptocurrency (B1). This shows that the first redeem script (RS1) requires a two of four signature, and in particular the signing with the first user private key (V1A) and the first issuer private key (V1I).

The second input is shown at lines 9 to 13, which is previous transaction, ID-610, used to fund the present transaction, ID-510. The ScriptSig at line 12 requires signing with the first issuer private key (V1I) to the previous output script that included the first issuer public key (P1I).

The first output, shown at lines 15 to 17, has an output of 10,000,000 satoshis. This corresponds to the first quantity of cryptocurrency (B1) from the first token (T1). The output script is at line 17, and the corresponding redeem script is:
1 metadata1 metadata2 PubK-Issuer 3 OP_CHECKMUL-TISIG This redeem script includes the metadata from the first token as well as the issuer public key (P1I) shown as PubK-Issuer. This redeem script requires one of three signatures to spend the 10,000,000 satoshis. In practice, the first issuer private key (V1I) may be used to sign and spend the cryptocurrency for subsequent transactions. It notable that the first user public key (P1A) is not in this redeem script. This is because this quantity of cryptocurrency has been redeemed with the issuer (I) 3 and therefore may be considered as spent by the first user (A) 5. Accordingly, the issuer (I) 3 should be free to spend this quantity of cryptocurrency without requiring authorisation (such as implicit authorisation through a signature of the first user (A) 5).

The issuer (I) 3 may then conduct a further transaction to redeem the redeem script from output script (in line 17) using the issuer public key (PH), whereby the further transaction results in an output script without the metadata.

Although the above mentioned first output retains metadata from the first token (T1) in the redeem script, it is to be appreciated that in some alternatives that this metadata need not be included in the first output as the first token (T1) has been redeemed and thus "untokenised." That is, the first quantity of cryptocurrency (B1) may be disassociated, during a redeem transaction, with the first token (T1) by removing the corresponding first and/or second metadata (MD1/MD2). Furthermore, it is to be appreciated that the output script may be in other forms as specified by the issuer (I) 3.

The second output, shown at lines 18 to 20, has an output of 9,998,000 satoshis. This is in contrast to the input corresponding to transaction ID-610 that had 9,999,000 satoshis. The difference of 1,000 satoshis reflects the miners fee for this transaction.

Fourth Type of Transaction—First User (A) Redeems a First Portion with Issuer (I)

Redeeming a Portion of the Value of the First Token (T1)

In the above example, the first user (A) 5 redeemed the entire value of the first token (T1). However, in some examples, the first user (A) 5 may want to only redeem a portion of the value of the first token (T1).

Figure 7:
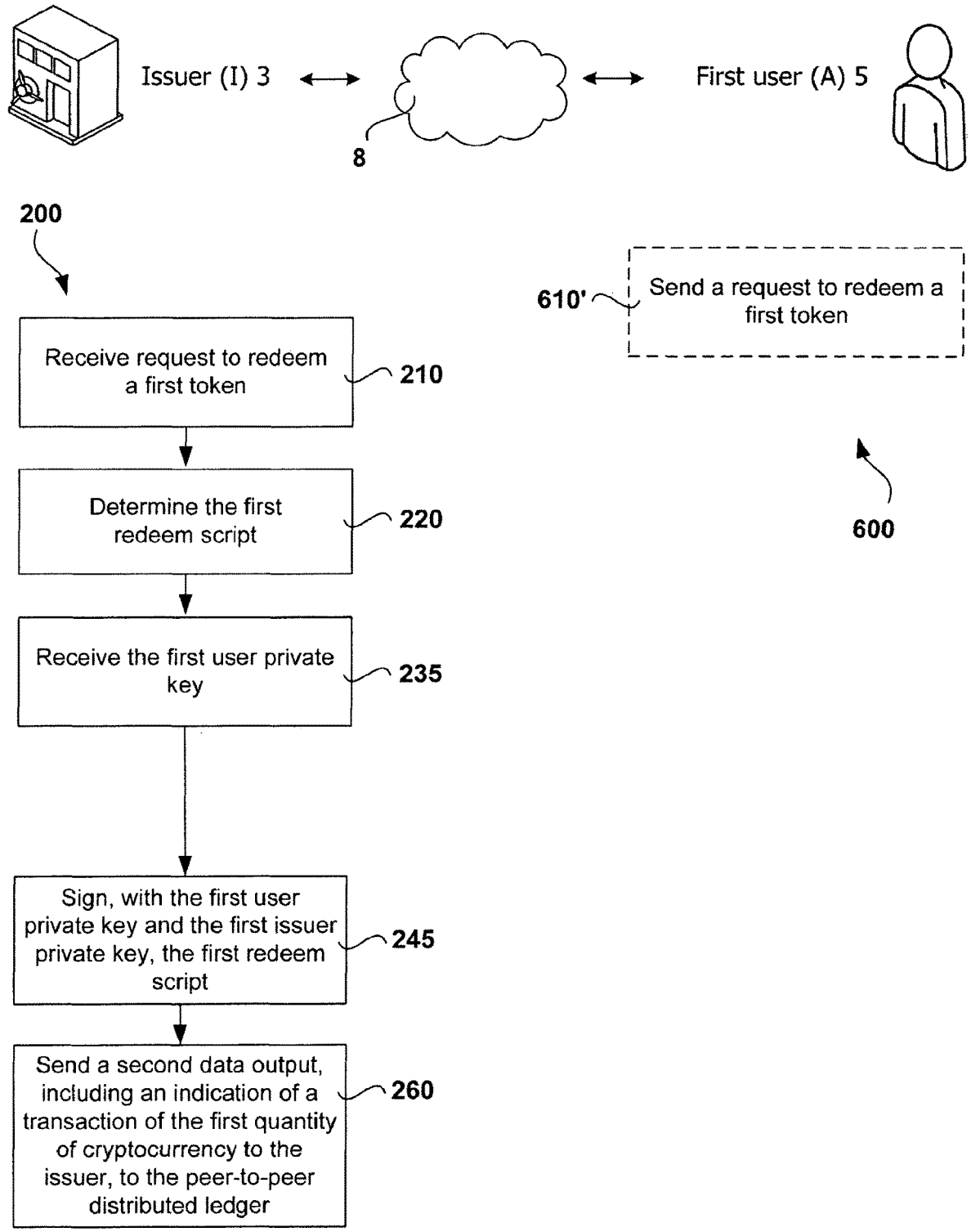
FIG. 7 is a flow chart of a computer-implemented method of redeeming a token.

Referring to FIGS. 3(a) and 7, the first token (T1) has a token value that may include the sum of a first portion (R1) and a second portion (R2). Thus, the first user (A) 5 may send 610', over the communications network 8, a request to redeem a value of the first portion (R1) of the first token (T1). In turn, the issuer (I) 3 receives 210, over the communications network 8, the request from the first user (A) 5 to redeem the first token (T1). The issuer may then perform steps 220, 235, 245 and 260 as described above for redeeming the first token (T1).

Figure 8:
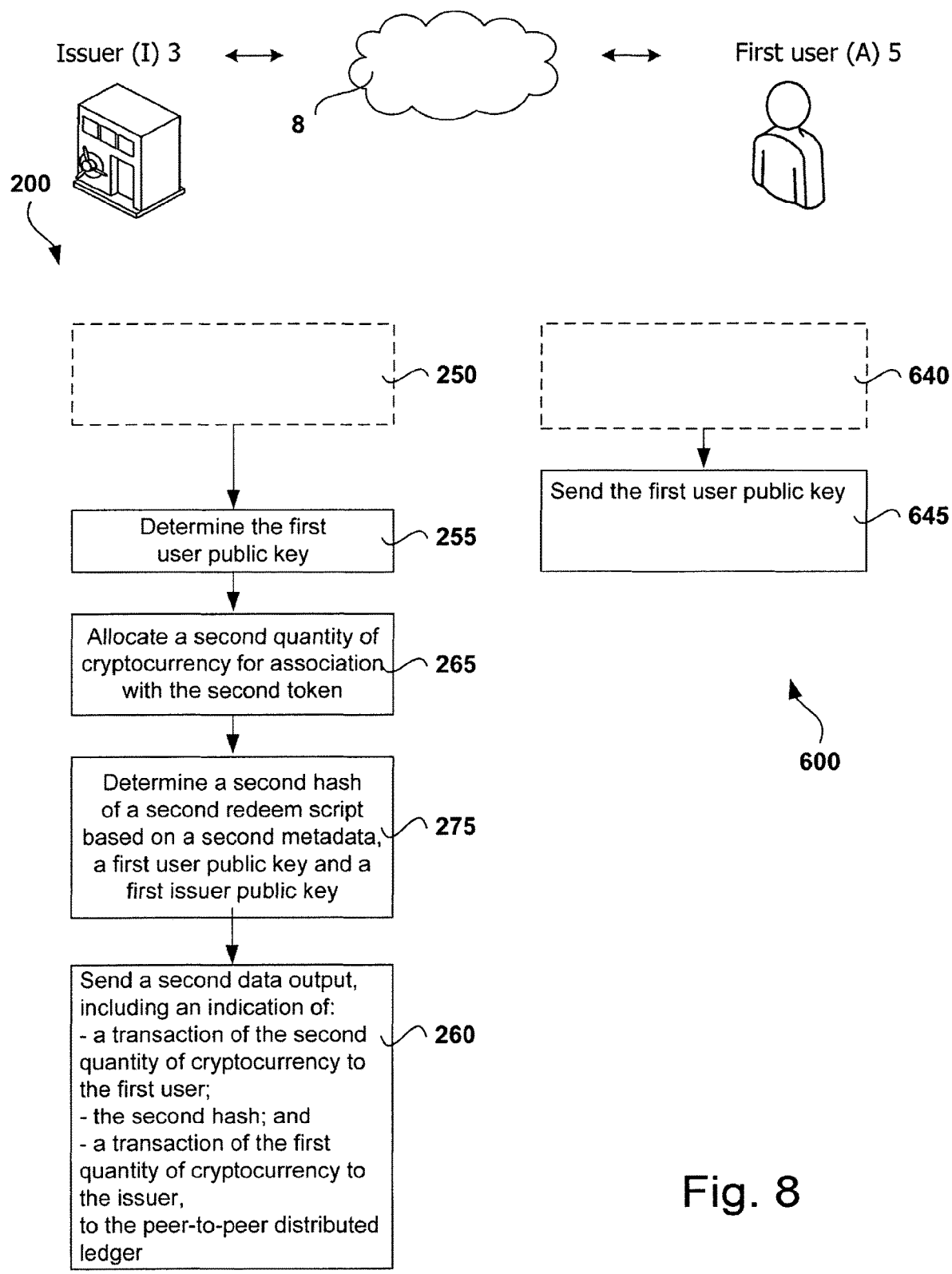
FIG. 8 is a flow chart of additional steps in the computer-implemented method of FIG. 7.

However, since the first user (A) 5 has made a request to redeem a value of the first portion (R1) of the total token value (T1), the value of the remaining second portion (R2) will need to allocated to a second token (T1) back to the first user (A) 5. The second token will now be described with reference to FIG. 8.

The first user (A) 5 may send 645, over the communication network 8, the first user public key (P1A) to the issuer (I) 3 for creating the second token (T2). In turn, the method 200 then includes the issuer (I) 3 determining 255 the first user public key (P1A) from the first user (A) 5. It is to be appreciated that the issuer (I) 3 may already have the first user public key (P1A) from a previous transaction (or in the electronic wallet), and in such cases, it may not be necessary for the first user public key (P1A) to be sent again by the first user (A) 5. Instead, the first user public key (P1A) may be received from a data store 11 and/or a third party.

In yet another alternative, the first user (A) 5 may wish to use a different cryptographic pair for the second token (T2). Thus, the steps of sending 645 and determining 255 the first user public key may include a first user public key that is different from the one associated with the first token (T1).

The method 200 then includes allocating 265 a second quantity of cryptocurrency (B2) for association with a second token (T2), wherein the second token has a second token value (TV2) based on the second portion (R2). This step of allocating 265 a second quantity of cryptocurrency (B2) may include similar considerations as allocating a first quantity of cryptocurrency (B1) described above.

In some examples the pegging rate (PR2) of the second token (T2) is the same as the pegging rate (PR1) of the first token (T1), which may be desirable for the first user (A) 5 as the terms and conditions of the first (T1) and second (T2) token remain the same, with the exception of quantum of the token value.

In other examples, the second quantity of cryptocurrency (B2) may need to be at or above a minimum threshold of cryptocurrency (MT2) that is different from the minimum threshold of cryptocurrency (MT1) for the first token (T1). Thus, allocating 265 the second quantity of cryptocurrency (B2) may include determining a minimum threshold of cryptocurrency (MT2) of the second token (T2) and determining a second quantity of cryptocurrency (B2) that is at or above the minimum threshold of cryptocurrency (MT2) of the second token (T2).

The method 200 further comprises determining 275 a second hash (H2) of a second redeem script (RS2), wherein the second redeem script (RS2) is based on: at least a second metadata that is based, at least in part, on the first metadata (MD2) associated with the first token (T1); the first user public key (P1A); and the first issuer public key (P1I) associated with the issuer (I) 3.

The at least second metadata (MD2) may include, for example, association with one or more of the terms and conditions of the first token (T1). Therefore, the second token (T2) may have the same or similar characteristics as the first token (T1), albeit with a different token value. In some particular examples, the at least second metadata (MD2) of the second token (T2) is the same as the at least first metadata (MD1) of the first token. In such examples, the second redeem script (RS2) of the second token (T2) is the same as the first redeem script (RS1) of the first token (T1). Accordingly the second hash (H2) associated with the second token (T2) is also the same as the first hash (H1) associated with the first token (T1). This may be advantageous, as it may be easy to verify the second hash (H2) of the second token (T2) by comparing it with the first hash (H1) of the first token (T1). This may also reduce the storage space, associated with storing the second hash (H2) (or subsequent hashes) as they will be the same.

As noted above, the first user public key (P1A) for the second token (T2) may, in some alternatives, be different from the first user public key associated with the first token (T1), and similarly, the first issuer public key (P1I) associated with the issuer (I) 3 for the second token (T2) may also be different. For example, the issuer (I) 3 and/or first user (A) 5 may wish to use different cryptographic pairs for security reasons.

In this example, the step of sending 260, over the communications network 8, a second data output (O2) to the peer-to-peer distributed ledger may further comprise an indication of a transaction of the second quantity of cryptocurrency (B2) to the first user (A) 5 and the second hash (H2), wherein the second hash (H2) is associated with the second quantity of cryptocurrency (B2), to provide the second token (T2) that is associated with the first user (A) 5 and the issuer (I) 3. Thus, the first user (A) 5 is provided with a second token (T2) that is based on the value of the second portion (R2) and, in some examples, carries similar characteristics to the first token (T1).

An example of redeeming a first portion is illustrated in FIG. 3(a), where the first user (A) 5 redeems the first token (T1) with the issuer (I) 3 that includes a request to redeem the value of a first portion (R1) of the first token (T1), where the first portion is equivalent to $500 AUD fiat currency. In return, the issuer (I) 3 provides $500 AUD in fiat currency and a second quantity of cryptocurrency (B2) to provide a second token (T2) to the first user (A) 5. The second quantity of cryptocurrency (B2) is associated with the second token that may be representative of the value of the second portion (R2) of $500 AUD.

Third Type of Transaction—First User (A) Transfers Value to Second User (B)

Overview of a Transfer of Value from the First User (A) 5 to the Second User (B)

Figure 9:
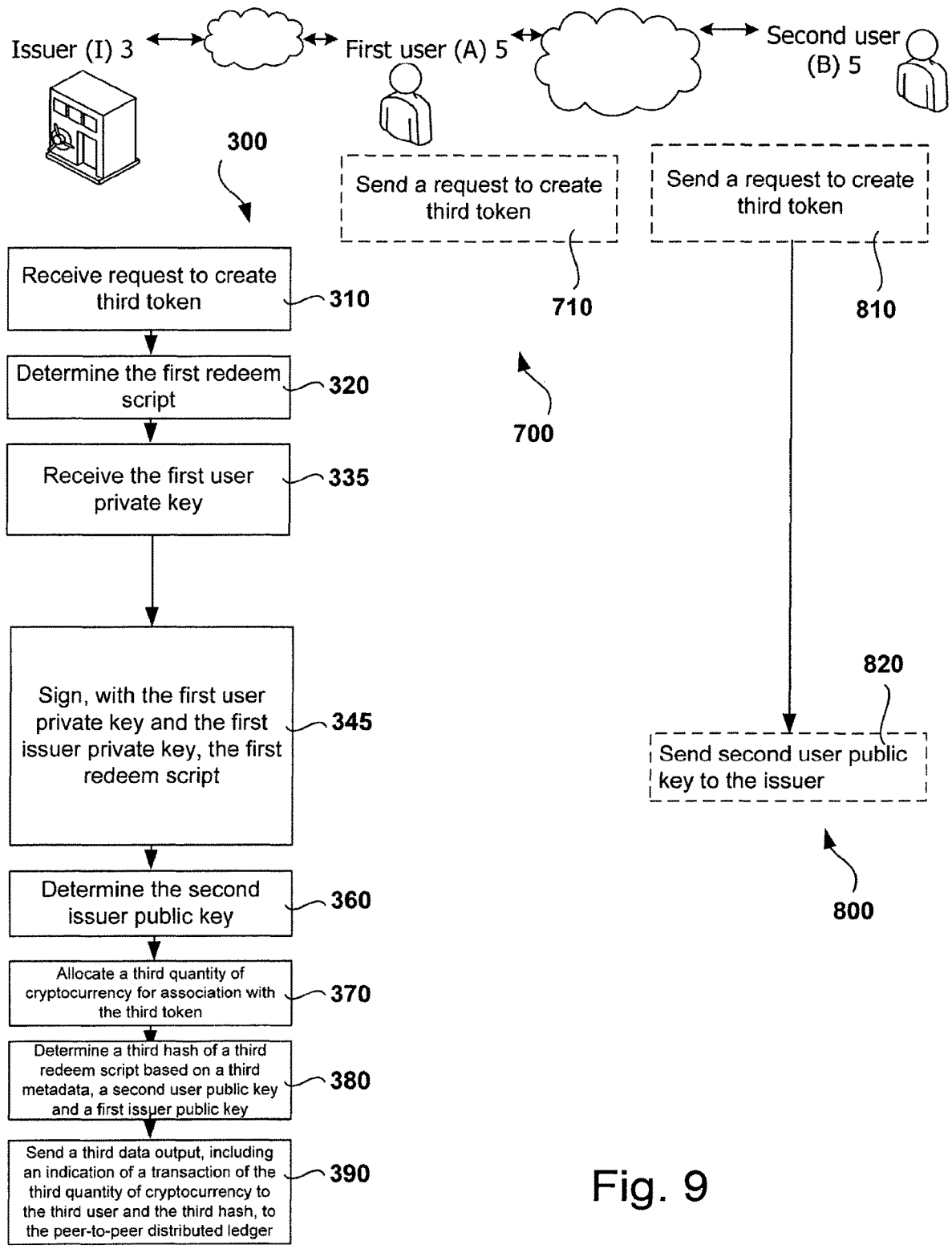
FIG. 9 is a flow chart of a computer-implemented method of transferring value from a first user to a second user, facilitated by the issuer.

The present disclosure also includes a method 300 of creating one or more additional tokens by the issuer (I) 3 as illustrated in FIG. 9. These additional tokens may be created as a result of, for example, the first user (A) 5 wishing to transfer the value, or portion thereof, the first token (T1) to the second user (B) 7. This may be achieved by creating a third token (T3) that is associated with the second user (B) 7 and the issuer (I) 3.

This may advantageously allow the first user (A) 5 to, in effect, transfer the same or similar rights associated with a first token (T1), to the second user (B). Although a new token, in the form of a third token (T3), is created, the third token (T3) may have similar characteristics as the first token (T1). For example, the tokens may have associated metadata that is the same or similar. This may be useful, for example, if the same or similar terms and conditions applicable between the first user (A) 5 and the issuer (I) 3 should also apply between the second user (B) 7 and the issuer (I) 3.

In some circumstances, the first user (A) 5 may wish to transfer at least part of the value of the first token (T1) to the second user (B) as shown in FIG. 2(c). In one example, this is achieved by a transaction of the first quantity of cryptocurrency (B1) associated with the first token (T1) from the first user (A) 5 to the second user (B) 7. In a transaction where the entire value of the first token (T1) is transferred to the second user (B) 7, this may involve the creation of a third token (T3) with the first quantity of cryptocurrency B1, that is transferred to the second user (B) 7. Effectively, the third token (T3) is the transfer of the first token (T1), and rights associated with the first token (T1), to the second user (B) 7.

In this example, the transfer of value from the first user (A) 5 to the second user (B) 7 involves the issuer (I) 3 as an intermediary to facilitate the transfer. This is distinguished from a direct transaction of the first quantity of cryptocurrency (B1) from the first user (A) 5 to the second user (B) 7. Involving the issuer (I) 3 in this transfer of value may be advantageous for a number of reasons. Firstly, involving the issuer (I) 3 reduces the risk of the first quantity of cryptocurrency (B1) from being transferred and spent by the first user (A) 5 as ordinary cryptocurrency as opposed to using the first quantity of cryptocurrency (B1) as a token. This is prevented by requiring the issuer (I) 3 to sign the redeem script. Secondly, involving the issuer (I) 3 may allow the issuer (I) 3 to keep track of the token(s) and particular rights and/or liabilities associated with particular users. This may be useful for accounting, financial reporting and/or regulatory purposes.

An example of transferring the value will now be described in detail with reference to FIGS. 2(c) and 9 where the methods 300, 700, 800 are performed by the issuer (I) 3, the first user (A) 5, and the second user (B) 7, respectively. The first user (A) 5 may send 710, over the communications network 8, a request to create the third token (T3), where the third token (T3) is associated with the first token (T1). In conjunction, or alternatively, the second user (B) 7 may send 810, over the communications network 8, a request to create the third token (T3). Whether these requests are sent by one or both the first user (A) 5 and/or second user (B) 7 may depend on the terms and conditions of the first token (T1).

The issuer (I) 3 then receives 310, over the communications network 8, the request to create the third token (T3). It is to be appreciated that the requests from the first user (A)

5 and second user (B) 7 may be sent via another party in the communications network 8. In addition, the request may be in piecemeal, with part of the request coming from the first user (A) 5 and the other part of the request from the second user (B) 7.

The method 300 then includes determining 320 the first redeem script (RS1) associated with the first token (T1).

The method 300 also includes receiving 335 the first user private key (V1A). In one example, this includes retrieving the first user private key (V1A) from the data store 11. The method 300 further includes the issuer (I) 3 signing 345, with the user private key (P1A) and the first issuer private key (P1I), the first redeem script. The steps 335 and 345 are analogous to the steps 235 and 245 in method 200 described above for redeeming the first token (T1), and similar considerations may also apply.

To create the third token (T3) the second user public key (P1B) is required. This second user public key (P1B) is a cryptographic pair with a second user private key (V1B). The issuer (I) 3 may determine 360 the second user public key (P1B) in a number of ways. Firstly, the issuer (I) 3 may be a service provider of the second user (B) 7 and the second user public key (P1B) may be stored in a data store 11 of the issuer (I) 3. Alternatively, the second user public key (P1B) may have been received by the issuer (I) 3 during an earlier transaction and accordingly, the second user public key (P1B) may, in some cases, be retrieved from the data store 11 of the issuer (I) 3. In some other alternatives, the second user public key (P1B) may be received via a third party in the communications network 8. In yet another alternative, the second user (B) 7 may send 820, over the communications network 8, the second user public key (P1B) to the issuer (I) 3.

The method 300 further includes allocating 370 a third quantity of cryptocurrency (B3) for association with the third token (T3). In some examples where the total value of the first token (T1) is to be transferred to the second user (B), it may be appropriate for the third quantity of cryptocurrency (B3) to be allocated from, and be the same as, the first quantity of cryptocurrency (B1). In other alternatives (such as the fifth type of transaction which will be discussed in further detail below), only a portion of the total value of the first token (T1) is to be transferred to the second user (B) and a corresponding proportion may be allocated for the third quantity of cryptocurrency (B3). In yet further examples, the third quantity of cryptocurrency (B3) may be allocated from other cryptocurrency that is not associated with the first quantity of cryptocurrency (B1). It is to be appreciated that the considerations for allocating 370 the third quantity of cryptocurrency (B3) may be the same or similar to those when allocating 130 the first quantity of cryptocurrency (B1) in method 100 and allocating 265 the second quantity of cryptocurrency (B2) in method 200.

The method further includes determining 380 a third hash (H3) of a third redeem script (RS3), wherein the third redeem script (RS3) is based on: at least a third metadata (MD3) that is based, at least in part, on the first metadata (MD1) associated with the first token; the second user public key (P1B); and the first issuer public key (PH). This may include similar or the same considerations as determining 140 a first hash (H1) of a first redeem script (RS1) in method 100 or determining 275 a second hash (H2) of a second redeem script (RS2) in method 200.

The method 300 further includes sending 390, over the communications network 8, a third data output (O3) to the peer-to-peer distributed ledger comprising: an indication of a transaction of at least the third quantity of cryptocurrency (B3) to the second user (B); and the third hash (H3), wherein the third hash (H3) is associated with the third quantity of cryptocurrency (B3) to provide the third token (T3) that is associated with the second user (B) 7 and the issuer (I) 3. This is similar to steps 150 and 260 described above, and like variations and alternatives may be applicable.

Fifth Type of Transaction—First User (A) Transfers a First Portion to Second User (B)

In a further example, only a first portion (R1) of the total value of the first token (T1) is transferred to the second user (B) 7, and in such cases, the remaining second portion (R2) of the total value may be included in a second token (T2) that is refunded back to the first user (A) 5. This may be similar to refunding a second portion (R2) of the value described above in method 200. Thus, the request to create the third token (T3) may comprise, explicitly or implicitly, a request to create the third token (T3) with a third token value (TV3) based on the first portion (R1).

Figure 10:
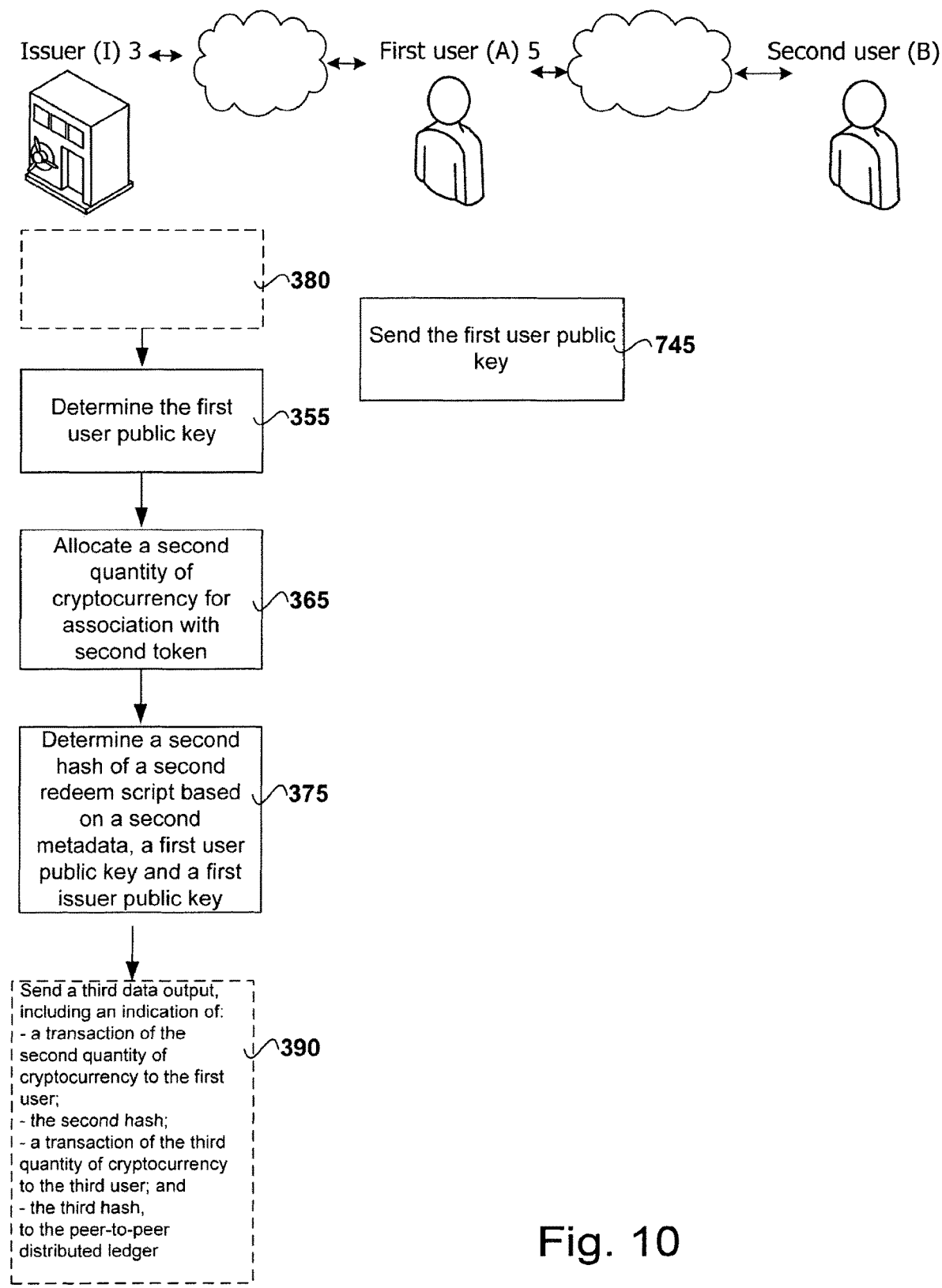
FIG. 10 is a flow chart of additional steps in the computer-implemented method of FIG. 9.

The refund back to the first user (A) 5, in the form of the second token (T2), will be described with reference to FIGS. 3(b) and 10. To create the second token (T2), the method 300 includes determining 355 the first user public key (P1A). This may be achieved in a number of ways as described above and may include receiving the first user public key (P1A) that is sent 745, over the communications network 8, from the first user (A) 5.

The method further includes allocating 365 a second quantity of cryptocurrency (B2) for association with the second token (T2), wherein the second token has a second token value (TV2) based on the second portion (R2). The method 300 also includes determining 375 a second hash (H2) of a second redeem script (RS2) that is based on: the second metadata (MD2) that is based, at least in part, on the first metadata (MD1) associated with the first token (T1); the first user public key (P1A); and the first issuer public key (P1I) associated with the issuer (I) 3. Thus, the step of sending 390 the third data output (O3) to the peer-to-peer distributed ledger further includes: an indication of a transaction of at least the second quantity of cryptocurrency (B2) to the first user (A) 5; and the second hash (H2), wherein the second hash (H2) is associated with the second quantity of cryptocurrency (B2), to provide the second token (T2) that is associated with the first user (A) 5 and the issuer (I) 3.

An Example of Transferring Value from the First User (A) 5 to the Second User (B)

A specific example of a transaction, ID-110, will now be described. Referring to FIG. 3(b), the first user (A) 5 has tokens with a total value of $10.00 AUD. The first user (A) 5 wishes to transfer a first portion (R1) of $7.30 AUD to the second user (B) 7 as a third token (T3) and have the remaining second portion (R2) of $2.70 provided as change in the form of second token (T2) back to the first user (A) 5.

In this example, the first token (T1) includes two blocks of tokens, with each block representing a value of $5.00 AUD. This may be representative of tokens that have standardised values, (e.g. in $5.00 blocks) or representative of the first user (A) 5 having acquired the two blocks from different transactions. Each of these blocks include 50,000 satoshis, which, at a pegging rate of 100 satoshis/cent, is equivalent to $5.00 AUD. This is illustrated below in Table 8 as transactions ID-101 and ID-102, which are transactions that created the first token (T1).

TABLE 8

| ID-101 |
|---|
| 50,000 |
| OP_HASH160 <redeem script hash> OP_EQUAL |
| ID-102 |
| 50,000 |
| OP_HASH160 <redeem script hash> OP_EQUAL |
| ID-103 |
| 10,000,000 |
| OP_DUP OP_HASH160 <PubK-Issuer hash> OP_EQUALVERIFY OP_CHECKSIG |

Line 3 of both ID-101 and ID-102 represents the output script of the respective transactions, which would be similar to line 11 in Table 4 described above.

The issuer (I) 3 also needs to pay a transaction fee (miner's fee) for this transaction. This transaction fee may be paid in part from a quantity of cryptocurrency received from a previous transaction, ID-103, as shown in Table 8. This shows a previous transaction of 10,000,000 satoshis, which will, in part, be used to fund the transaction. This is similar to the previous transaction ID-610 described above with reference to Table 6.

The transaction, ID-110, to transfer the value to the second user (B) will now be discussed with reference to Table 9 below.

TABLE 9

| ID-110 | Transaction-ID |
|---|---|
| Version number | Version number |
| 3 | Number of inputs |
| ID-101 | Prev Trans Output |
| IDX-00 | Prev Trans Output index |
| Script length | Script length |
| Sig-V1A Sig-V1I <2 metadata1 metadata2 P1A P1I 4 OP_CHECKMULTISIG> | ScriptSig |
| 00000000000000000000000000000001 | Sequence number |
| ID-102 | Prev TransOutput |
| IDX-00 | Prev TransOutput index |
| Script length | Script length |
| Sig-V1A Sig-V1I <2 metadata1 metadata2 P1A P1I 4 OP_CHECKMULTISIG> | ScriptSig |
| 00000000000000000000000000000011 | Sequence number |
| ID-103 | Prev TransOutput |
| IDX-00 | Prev TransOutput index |
| Script length | Script length |
| Sig-Issuer PubK-Issuer | ScriptSig |
| 00000000000000000000000000000100 | Sequence number |
| 3 | Number of outputs |
| 73,000 | Output value |
| Output script length | Output script length |
| OP_HASH160<redeem script hash> OP_EQUAL | Output script |
| 27,000 | Output value |
| Output script length | Output script length |
| OP_HASH160<redeem script hash> OP_EQUAL | Output script |
| 9,999,000 | Output value |
| Output script length | Output script length |
| OP_DUP OP_HASH160<PubK-Issuer hash> OP_EQUALVERIFYOP_CHECKSIG | Output script |
| LockTime | LockTime |

The third line of Table 9 indicates that there are three inputs, and line 19 indicates that there are three outputs. Two of the inputs represent the first token (T1) and the third input is for paying the transaction fee. The first output is representative of the transfer of value to the second user (B) 7, the second output representative of the change of tokens back to the first user (A) 5, and third output is the change of cryptocurrency back to the issuer (I) 3.

The first input, based on previous transaction ID-101, is shown at lines 4 to 8, which is the input of a first block of 50,000,000 satoshis, being half of the first quantity of cryptocurrency (B1) and represent $5.00 AUD in value. Line 7 shows the ScriptSig to allow spending of this quantity of cryptocurrency. This shows that the first redeem script (RS1) requires a two of four signatures, and in particular the signing with the first user private key (V1A) and the first issuer private key (V1I). Line 8 indicates a sequence number where this first input is marked to the first output.

The second input, based on previous transaction ID-102, is shown at lines 9 to 13, which is the input of a second block of 50,000,000 satoshis, being the second half of the first quantity of cryptocurrency (B1) and represents $5.00 AUD in value. Line 12 shows a ScriptSig similar to line 7 above. Line 12 indicates a sequence number where this second input is marked to output to both the first output and the second output. This is because this second block of 50,000,000 satoshis will be split, with 23,000 satoshis to the first output and 27,000 satoshis to the second output.

The third input is shown at lines 14 to 18, which is based on previous transaction ID-103 that is used to fund the present transaction ID-110. The ScriptSig at line 17 requires signing with the first issuer private key (V1I) to the previous output script that included the first issuer public key (P1I).

The first output is shown at lines 20 to 22 and has an output of 73,000 satoshis, which is the third quantity of cryptocurrency (B3) for the third token (T3). In this example, the pegging rate for the third token (T3) is 100 satoshis/cent (which is the same pegging rate as the first token (T1)) and therefore the third quantity of cryptocurrency (B3) has a third token value (TV3) of $7.30 AUD, which is based on the first portion (R1) of $7.30 AUD.

The output script is at line 22, and the corresponding redeem script for this example is:

2 metadata1 metadata2 P1B P1I 4 OP_CHECKMULTI-SIG

This includes the second user public key (P1B) and the first issuer public key (P1I) as described above. Importantly, the second user public key (P1B) is used since the third token (T3) is for the second user (B) 7 to redeem. The metadata 1 and metadata2 may include metadata as described above, including an indication that this is a "payment" or "transfer" transaction between users. Thus, the first output provides the third token (T3) that can be redeemed by the second user (B) 7 for a value of $7.30 AUD with the issuer (I) 3.

The second output is shown at lines 23 to 24 and has an output of 27,000 satoshis which is the second quantity of cryptocurrency (B2) for the second token (T2) back to the first user (A) 5. In this example, the same pegging rate of 100 satoshis/cent, and therefore the second quantity of cryptocurrency (B2) has a second token value (TV3) of $2.70 AUD, which is based on the remaining second portion (R2) of $2.70 AUD. The output script is at line 25, and the corresponding redeem script for this example is:

2 metadata1 metadata2 P1A P1I 4 OP_CHECKMULTISIG

This includes the first user public key (P1A) and the first issuer public key (P1I). Importantly, the first user public key (P1A) is used since the second token (T2) is for the first user (A) 5 to redeem. The metadata may also include an indication that this is part of a "payment" or "transfer" transaction between users.

The third output is shown at lines 26 to 28 and reflects the issuer's change for the transaction. In the present transaction, the transaction fee is 1,000 satoshis and accordingly, the issuer (I) 3 can expect to have change from the third input of 10,000,000 satoshis. Line 26 is an output value for the third output which is 9,999,000. Since the third output is the change back to the issuer (I) 3, the issuer (I) 3 should be free to spend the third output. Accordingly, the output script at line 28 only includes the first issuer public key (P1I), which is represented by <PubK-Issuer hash>.

The above example shows that a single transaction may have a mixture of cryptocurrency that is "tokenised" and "non-tokenised." In one example, it may be important to verify that the input token values are equal to the output token values. Thus the issuer (I) 3 may verify that a first token value (TV1) of the first token (T1) is equal to the sum of the second token value (TV2) and the third token value (TV3).

In the above example, the transaction fee is paid by the issuer (I) 3, who may pass on these costs by other means. It is to be appreciated that, in some alternatives, the transaction fee may be paid directly by the first user and/or second user. For example, the first user may be required to contribute cryptocurrency to be used for payment of the transaction fee. In another example, a portion of the first, second, or third quantity of cryptocurrency may be used in each transaction to pay the transaction fee. In yet another alternative, each transaction may include an additional output that creates an additional token for the miner facilitating the transaction to redeem with the issuer (I) 3.

Variation—the Users Sign the Redeem Script with Respective Private Keys

In the above examples, the issuers (I) 3 are the service providers for the first user (A) 5 and second user (B) 7 and manage respective electronic wallets. Accordingly, the issuer (I) 3 can access, with authorisation from the users, the respective user's private keys. This includes retrieving the user private keys from a data store 11.

In some alternative examples, it may be desirable from the users to keep the private keys themselves. This separation may allow the users to have greater control over their private keys. It may also be more secure, because a person having access to all the information in the data store 11 of the issuer (I) 3, including the first issuer private key (V1I), will not be able to unlock the redeem scripts as they would not have the respective user's private keys.

Accordingly, one variation of the method may include sending the redeem scripts to the users 5, 7 for signature with their respective private keys. In such examples, the issuer (I) 3 does not need to have possession of the user's private keys.

Figure 11:
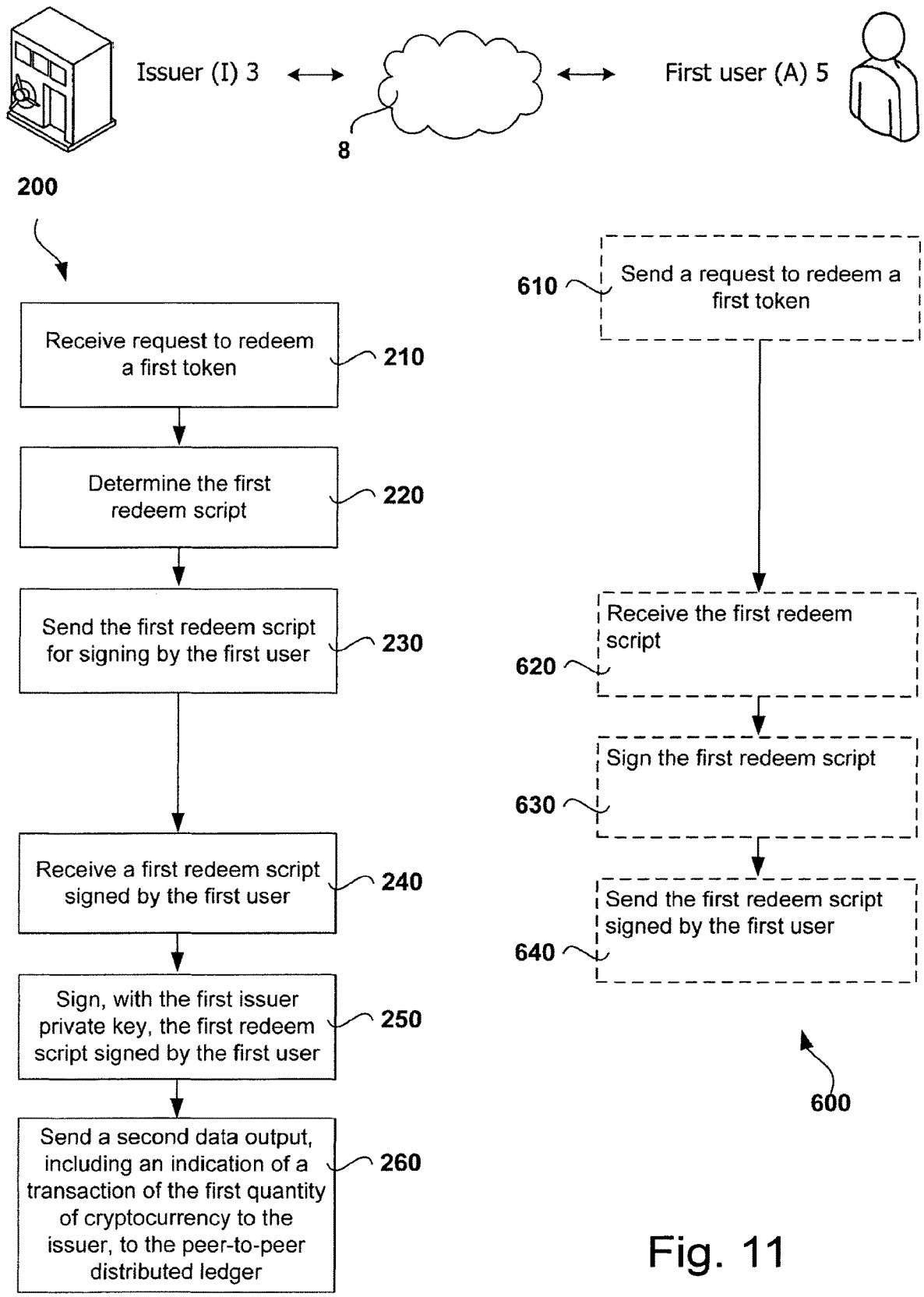
FIG. 11 is a flow chart of a variation of a computer-implemented method of redeeming a token whereby the redeem script is sent to the first user for signing.

Such a variation of methods 200', 600' of redeeming the first token (T1) will now be described with reference to FIG. 11.

The first user (A) 5 may send 610, over the communications network 8, a request to redeem the first token (T1). In turn, the issuer (I) 3 receives 210, over the communications network 8, the request from the first user (A) 5 to redeem the first token (T1). The method 200' then includes determining 220 the first redeem script (RS1) associated with the first token (T1). In one example, this may include retrieving the first redeem script (RS1) from the data store 11. In another example, this may include recreating the first redeem script (RS1) with data from one or more sources. For example, this may include retrieving the at least first metadata (MD1) and the first issuer public key (P1I) from the data store 11, and receiving, over the communications network 8, the first user public key (P1A). This data may then be combined to recreate the first redeem script (RS1).

The method 200' then includes sending 230, over the communications network 8, the first redeem script (RS1) for signing by the first user (A) 5. In turn, the first user (A) 5 receives 620 the first redeem script (RS1). It is to be appreciated that in some alternative examples, the step of sending the first redeem script (RS1) to the first user (A) 5 may be performed at other times. For example, the first redeem script (RS1) may be sent to the first user (A) 5 during or after the issuer (I) 3 creates the first token (T1). In another alternative, the first redeem script (RS1) may be retrieved by the first user (A) 5 from a data store. In yet other alternatives, the first user (A) 5 may determine the first redeem script (RS1) associated with the first token (T1) independently. For example, the first user (A) 5 may retrieve the first metadata (MD1), first issuer public key (PH) and first user public key (P1A) from one or more sources to determine the first redeem script (RS1).

The first user (A) 5 then signs 630, with the first user private key (VIA), the first redeem script (RS1) to provide a first redeem script signed by the first user (RS1A). The first redeem script signed by the first user (RS1A) is then sent 640, over the communications network 8, from the first user (A) 5 to the issuer (I) 3.

In turn, the method 200' includes receiving 240, over the communications network 8, the first redeem script signed by the first user (RS1A). The method 200' further includes signing 250, with the first issuer private key (V1I), the first redeem script signed by the first user (RS1A) to unlock the first quantity of cryptocurrency (B1) associated with the first token (T1).

The method 200' further includes the step of sending 260, over the communications network 8, a second data output (O2) to the peer-to-peer distributed ledger comprising an indication of a transaction of the first quantity of cryptocurrency (B1) to the issuer (I) 3. In one example, the first quantity of cryptocurrency (B1) is transferred back to the issuer (I) 3 and may no longer be associated with the first token (T1), since the first token (T1) has been redeemed. In some cases, the metadata associated with the first quantity of cryptocurrency (B1) may be removed to "untokenise" the cryptocurrency. This may be done in the same transaction or in a subsequent transaction, which may be a choice for the issuer (I) 3.

Notably, the above method 200' requires both the first user (A) 5 and the issuer (I) 3 to sign the first redeem script (RS1). This may be advantageous to prevent, or reduce the risk, of accidental or inadvertent spending of the first quantity of cryptocurrency (B1) by the first user (A) 5 beyond the intended token purpose. For example, if the first user (A) 5 attempted to spend the first quantity of cryptocurrency (B1) with another user (other than the issuer (I) 3), such a transaction will not proceed since the first issuer private key (V1I) is required to unlock the first quantity of cryptocurrency (B1). On the other hand, requiring the first user (A) 5 to sign the first redeem script (RS1) provides a degree of security for redeeming of the first quantity of cryptocurrency (B1), as the first user (A) 5 may control the first user private key (VIA) and selectively use it for authorised transactions.

In addition, having the issuer (I) 3 sign the redeem script last can improve security as it may avoid sending a completely signed redeem script over a communications network that may not be secure. For example, when redeeming the first token (T1), the order of the public keys may dictate that the first user (A) 5 signs the first redeem script (RS1), after which it is sent to the issuer (I) 3 for the final signature. Because the issuer (I) 3 provides the final signature for unlocking, this lowers the risks that a person intercepting communications between the issuer (I) 3 and the first user (A) 5 can fraudulently access the token (T1) and/or the first quantity of cryptocurrency (B1).

Figure 12:
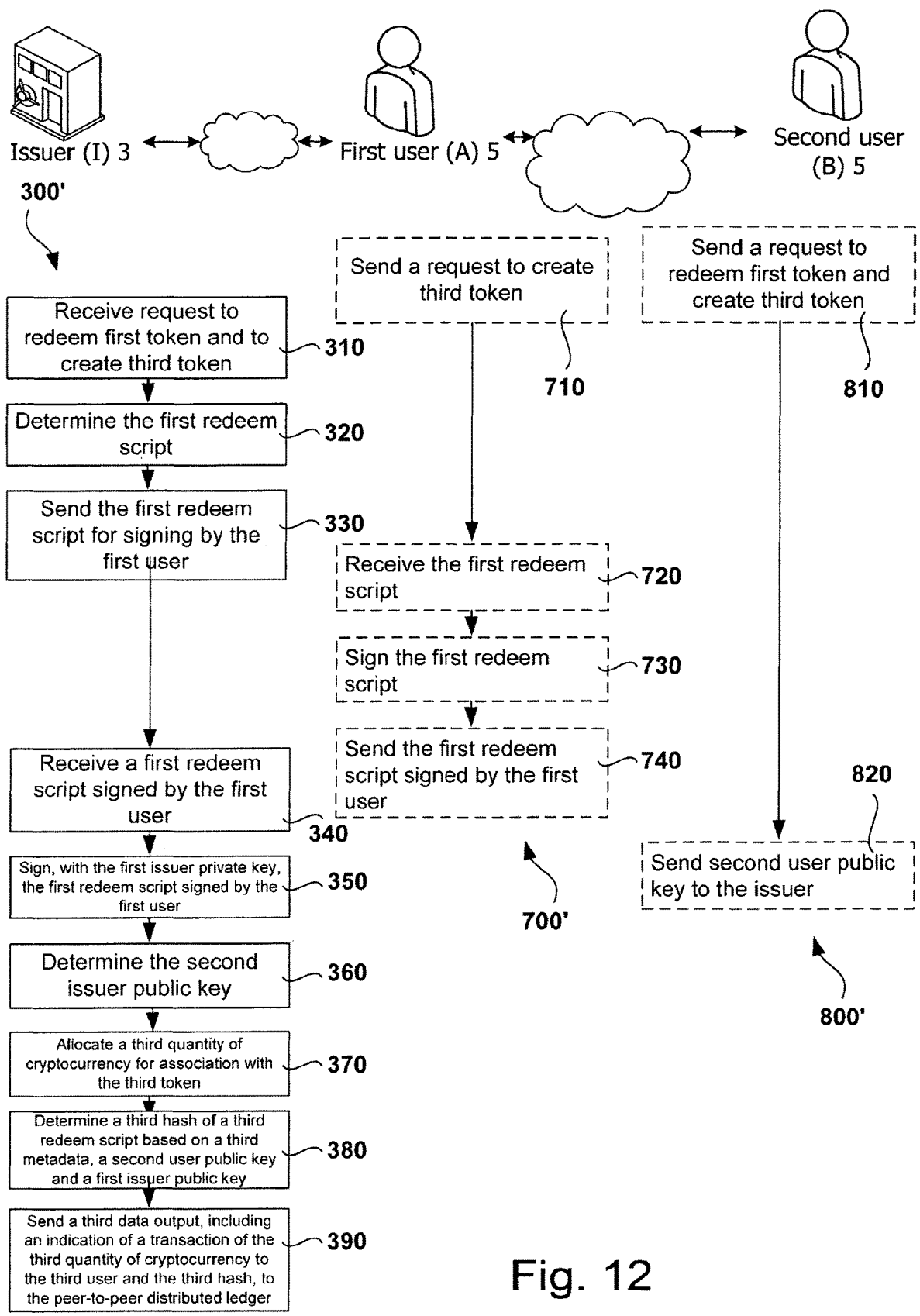
FIG. 12 is a flow chart of a variation of a computer-implemented method of transferring value from a first user to a second user, facilitated by the issuer, whereby the redeem script is sent to the first user for signing.

Similar steps may also be used when transferring the value of the first token (T1) from the first user (A) 5 to the second user (7) as shown in the methods 300', 700', 800' illustrated in FIG. 12. The methods 300', 700', 800' include similar steps to those described in methods 300, 700, 800 described above with reference to FIG. 9, but with the following exceptions. Instead of the issuer (I) 3 receiving 335 the first user private key (VIA) and using it to sign the first redeem script (RS1), this is done by the first user (A) 5. Thus the method 300' includes the issuer (I) 3 sending 330, over the communications network 8, the first redeem script (RS1) for signing by the first user (A) 5.

The first user (A) 5 receives 720 the first redeem script and signs 730 the first redeem script with the first user private key (VIA). This provides the first redeem script signed by the first user (RS1A) which is then sent 740, over the communications network 8, to the issuer (I) 3.

The method 300' then includes receiving 340, over the communications network 8, a first redeem script signed by the first user (RS1A). This is followed by signing 350, with the first issuer private key (V1I), the first redeem script signed by the first user (RS1A) to unlock the first quantity of cryptocurrency (B1) associated with the first token (T1).

The method 300' may further include steps 360, 370, 380 and 390 to complete creation of the third token (T3) in a similar manner to the method 300 described above.

Tokens and Codification Process

A contract is transferable if the rights it defines are conferred upon the holder or owner of the contract. An example of a non-transferable contract is one in which the participants are named—that is, where the rights are conferred upon a specific named entity rather than the holder of the contract. Only transferable contracts are discussed herein.

A token represents a specific contract that details or defines rights conferred by a contract. The actual contract may be a file stored in a distributed manner. For example, it may be stored in the cloud. In a preferred embodiment, the token is a representation of the contract in the form of a Bitcoin transaction.

A divisible token is one in which the value on a transaction output may be subdivided into smaller amounts allocated across multiple tokens (i.e., allocated across multiple transactions). The archetype is tokenised fiat currency. Divisible contracts are defined as those that specify a non-zero PeggingRate. For divisible contracts, the tokenised value transferred in the transaction output is tied to the underlying Bitcoin (BTC) value via the PeggingRate. That is, the contract specifies the holder's rights in terms of a pegging-rate. For non-divisible tokens there is no PeggingRate and the contract specifies the holder's rights in terms of a fixed value (e.g., like a bearer bond: "this contract is redeemable for exactly $1000" or a voucher: "this contract is redeemable for one haircut"). For non-divisible contracts, the underlying transaction BTC value is irrelevant to the contract value.

The phrase "Underlying BTC value" refers to the Bitcoin amount (BTC) attached to the transaction output. In the Bitcoin protocol every transaction output must have non-zero BTC amount to be considered valid. In fact, the BTC amount must be greater than a set minimum (known as 'dust') which, at the time of writing, is currently set to 546 satoshis. One (1) Bitcoin is defined as being equal to 100 million satoshis. As the Bitcoin transactions are here used only as a means of facilitating an exchange of ownership, the actual underlying BTC amount is arbitrary: the true value lies in the contract specification. In theory, every token could be carried by dust.

In the protocol of the present invention, specifically for divisible tokens, the underlying BTC value does have a meaning: it bears a relationship to the contract value via a PeggingRate. The PeggingRate is itself arbitrary and is chosen so as to keep the underlying BTC amount small. The reason for using a PeggingRate rather than simply underlying every token transaction with dust is because the protocol of the present invention facilitates divisibility: when a token is split into several transaction outputs of smaller amounts it is not necessary to adjust the original contract. Rather, the contract value of each subdivided token is simply calculated based on the PeggingRate and the subdivided amount of underlying BTC value.

A limited token is one in which a total issuance value is fixed (or "limited") by a fixed non-zero number of shares as defined by a quantity called NumShares. Therefore, no further shares may be issued under a limited contract. For example a contract for part ownership of a race horse is limited to 100% of the race horse (e.g., 100 shares at 1% each or 10 shares at 10% each, etc.). An unlimited contract implies that the issuer is able to underwrite further issuances of shares, for example by adding the required amount of fiat currency into their Reserve Account. NumShares must be explicitly stated on all contracts. Limited contracts must have NumShares>0; unlimited contracts are denoted by setting NumShares=0.

The archetypical example is a currency reserve (analogous to a gold reserve) such that the total value held in the reserve bank account matches the total value in promissory notes in existence (i.e., unredeemed tokens). This concept extends beyond currency reserves to include stock inventory. For example, an issuer of licensed printed t-shirt tokens may start with an inventory of 10,000 T-shirts in stock and may issue a divisible token to represent those 10,000 t-shirts (where, e.g., each share=1 t-shirt). The original token could be subdivided and each subdivided token would be redeemable for a number oft-shirts according to the transaction output's underlying BTC value as defined by the PeggingRate. If demand increases, however, the issuer may decide to issue further shares (i.e., increase the number of shares in circulation by, e.g., another 10,000). In such cases, it is incumbent on the issuer to deposit a further 10,000 t-shirts into his reserve account (i.e., stock warehouse) in order to underwrite the further issuance. Thus, the total number oft-shirts in stock (where stock acts as "reserve account") at any one time=the total number of unredeemed shares.

PeggingRates only apply to divisible contracts, wherein the value of a share (represented by a quantity called ShareVal) is pegged to the underlying BTC amount. For example, the contract might specify that the issuer promises to redeem the token at a rate of $10,000 for every underlying 1 BTC. That would mean (for example) that a transaction with a tokenised underlying output value of 15,400 satoshis would be redeemable for $1.54. A value of 0 for the PeggingRate indicates that the contract is non-divisible (i.e., can only be transferred whole, like a bearer bond). When the PeggingRate is set to 0 (meaning non-divisible token) the underlying BTC value is not relevant to the contract value and can be set at any amount. Normally in this case it is desirable to keep the underlying BTC amount as small as possible (i.e., set to dust) to minimise operating costs.

NumShares is the total (fixed) number of shares available under the (limited) contract. For limited contracts, NumShares must be a whole number greater than zero. For unlimited contracts, NumShares is not fixed, as more shares can be issued at any time (provided they are underwritten), which is denoted by setting the value to 0.

A share is defined as the unit of transfer and the ShareVal is the value of that unit. For example, for fiat currency, the unit of transfer may be set to 1 cent. Or, for example, it may be set to 50 cents, in which case transfers may only be executed in "lots" of 50 cents. ShareVal may also be expressed as a percentage: for example if a breeder wants to sell a racehorse in 10 equal shares then the ShareVal=10%. ShareVal must be >0 and must be defined on the contract.

TotalIssuance represents the total value of shares issued. This value only relates to limited contracts as for unlimited contracts the issuance is not fixed and more shares may be issued.

If the shares are expressed as a percentage then the TotalIssuance=100% by definition.

For limited contracts, NumShares, ShareVal, and TotalIssuance are related in the following way:

$$NumShares \times ShareVal = TotalIssuance.$$

A value of 0 for TotalIssuance implies it is an unlimited contract. An example of an unlimited contract is fiat currency (so TotalIssuance is set to 0); examples of limited contracts are: (i) limited edition commemorative coins (1000 minted, where 1 share=1 coin): TotalIssuance=1000×1=1000 coins; and (ii) seats at a ticketed venue, where TotalIssuance=total number of seats available.

The circulation is defined as the total value of unspent tokens (i.e., as determined by transactions in UTXO—unspent transaction output). The full set of all unspent transactions is kept in a list available to all bitcoin nodes. For example, if an issuer initially issues $10,000 as fiat currency type tokens and over time $5500 worth of tokens are redeemed, then the circulation=$4500 (being the value of unredeemed tokens). This value should reconcile to the balance in the associated reserve account.

It should be noted that in some (atypical) situations the circulation might fall below the reserve account balance, though never the reverse. For example, consider a breeder issuing 10 shares in a race horse (where by definition TotalIssuance=100%). A buyer may redeem their token by sending it back to the breeder, and if she detokenises it, there will only be 9 shares in circulation=90% of the horse, although of course the whole 100% horse is in the reserve (=stable). In this situation the reserve excess (i.e., the unaccounted 10% ownership) implicitly belongs to the issuer.

Although this situation is benign and falls within the scope of the invention, a protocol may be enforced wherein 100% of shares must be explicitly accounted for (i.e., the breeder in this illustrative situation is not allowed to detokenise the token).

Example 1—Firewood by weight. In this example, a contract reads: "The holder is entitled to firewood at a rate of 20 kg for every underlying 600 satoshi." The metadata is defined to represent the following critical parameters: NumShares=0; ShareVal=20 kg; and PeggingRate=600 satoshis/share. These parameters define an unlimited and divisible contract, wherein a share in the contract has a value of 20 kg of firewood, and wherein each multiple of 600 satoshis within the transaction corresponds to one share in the contract. In this example, the TotalIssuance is not fixed.

Example 2—Firewood by bag. In this example, the contract reads: "The holder is entitled to one 20 kg bag of firewood." The metadata is defined to represent the following critical parameters: NumShares=0; ShareVal=1 bag; and PeggingRate=0. These parameters define an unlimited and indivisible contract, wherein a share in the contract has a value of one 20 kg bag of firewood, and wherein any amount of underlying Bitcoin within the transaction corresponds to one share in the contract. In this example, the TotalIssuance is not fixed.

Example 3—A $1000 note. In this example, the contract reads: "The holder is entitled to $1000 exactly". The metadata is defined to represent the following critical parameters: NumShares=0; ShareVal=$1000; PeggingRate=0. These parameters define an unlimited and indivisible contract, wherein a share in the contract has a value of $1000, and wherein any amount of underlying Bitcoin within the transaction corresponds to one share in the contract. In this example, the TotalIssuance is not fixed.

Example 4—Commemorative coins #1. In this example, the contract reads: "The holder is entitled to a limited edition (1000 coins) Year 2000 Olympic Silver coin (maximum one per customer)". The metadata is defined to represent the following critical parameters: NumShares=1000; ShareVal=1 coin; PeggingRate=0. These parameters define an indivisible contract limited to 1000 shares, wherein a share in the contract has a value of 1 coin, and wherein any amount of underlying Bitcoin within the transaction corresponds to one share in the contract. In this example, the TotalIssuance is 1000 coins.

Example 5—Commemorative coins #2. In this example, the contract reads: "The holder is entitled to limited edition (10,000 coins) Year 2000 Olympic Bronze coins at a rate of 1 coin for every underlying 600 satoshis". The metadata is defined to represent the following critical parameters: NumShares=10,000; ShareVal=1 coin; PeggingRate=600 satoshis/share. These parameters define a divisible contract limited to 10,000 shares, wherein a share in the contract has a value of 1 coin, and wherein each multiple of 600 satoshis within the transaction corresponds to one share in the contract. In this embodiment, the TotalIssuance is 10,000 coins.

Example 6—Fiat currency #1. In this example, the contract reads: "The holder is entitled to Canadian dollars at a rate of $10,000 for every underlying Bitcoin. Unit of transfer is 50 cents." The metadata is defined to represent the following critical parameters: NumShares=0; ShareVal=50 cents; PeggingRate=5000 satoshis/share. These parameters define an unlimited and divisible contract, wherein a share in the contract has a value of 50 Canadian cents, and wherein each multiple of 5000 satoshis within the transaction corresponds to one share in the contract. In this example, the TotalIssuance is not fixed.

Example 7—Fiat currency #2. In this example, the contract reads: "The holder is entitled to Australian dollars AUD at a rate of $10,000 for every underlying Bitcoin. Unit of transfer is 1 cent." The metadata is defined to represent the following critical parameters: NumShares=0; ShareVal=1 cent; PeggingRate=100 satoshis/share. These parameters define an unlimited and divisible contract, wherein a share in the contract has a value of 1 Australian cent, and wherein each multiple of 100 satoshis within the transaction corresponds to one share in the contract. In this example, the TotalIssuance is not fixed. Incidentally, it will be seen that the minimum AUD that can actually be transferred in this example is 6 cents. Any less would result in an underlying BTC value lower than the current minimum required for a valid transaction.

Example 8—Shared house. In this example, the contract reads: "The holder is entitled to part ownership of the property at (address) at a rate of 10% for every underlying 600 satoshis." The metadata is defined to represent the following critical parameters: NumShares=10; ShareVal=10%; PeggingRate=600 satoshis/share. These parameters define a divisible contract limited to ten shares, wherein a share in the contract has a value of 10%, and wherein each multiple of 600 satoshis within the transaction corresponds to one share in the contract. In this example, the TotalIssuance is 100% ownership of a house.

Example 9—A race horse. In this example, the contract reads: "The holder is entitled to part ownership of 'Naka's Delight' at a rate of 1% for every underlying 600 satoshis." The metadata is defined to represent the following critical parameters: NumShares=100; ShareVal=1%; PeggingRate=600 satoshis/share. These parameters define a divisible contract limited to one hundred shares, wherein a share in the contract has a value of 1%, and wherein each multiple of 600 satoshis within the transaction corresponds to one share in the contract. In this example, the TotalIssuance is 100% ownership of a horse.

Example 10—Allocated seat ticket. In this example, the contract reads: "The holder is entitled to seat B54 at 'Dead Lizard' Concert on 14 Feb. 2016 at the Central Concert Hall." The metadata is defined to represent the following critical parameters: NumShares=1; ShareVal=1 ticket; PeggingRate=0. These parameters define an indivisible contract limited to one share, wherein a share in the contract has a value of 1 ticket, and wherein any amount of underlying Bitcoin within the transaction corresponds to one share in the contract. In this example, the TotalIssuance is 1 ticket. The ticket may include an access code to a barrier on entry into the event venue, thereby providing feedback that the ticket has been redeemed.

Example 11—A voucher for a celebrity date. In this example, the contract reads: "The holder is entitled to a one-off prize dinner date on 31 Mar. 2016 with George Kludgy at the Spiffy Hotel in central Sydney including a taxi ride home." The metadata is defined to represent the following critical parameters: NumShares=1; ShareVal=1 date; PeggingRate=0. These parameters define an indivisible contract limited to one share, wherein a share in the contract has a value of 1 date, and wherein any amount of underlying Bitcoin within the transaction corresponds to one share in the contract. In this example, the TotalIssuance is 1 date.

Example 12—Vouchers for haircuts. In this example, the contract reads: "The holder is entitled to one haircut and blowdry, valid any weekday except public holidays." The metadata is defined to represent the following critical parameters: NumShares=0; ShareVal=1 voucher; PeggingRate=0. These parameters define an unlimited and indivisible contract, wherein a share in the contract has a value of 1 voucher, and wherein any amount of underlying Bitcoin within the transaction corresponds to one share in the contract. In this example, the TotalIssuance is not fixed.

Example 13—T-shirts. In this example, the contract reads: "The holder is entitled to 'Dead Lizard' souvenir t-shirts for the 2016 World Tour at a rate of 1 t-shirt for every 1000 satoshis." The metadata is defined to represent the following critical parameters: NumShares=0; ShareVal=1 t-shirt; PeggingRate=1000. These parameters define an unlimited and divisible contract, wherein a share in the contract has a value of 1 t-shirt, and wherein each multiple of 1000 satoshis within the transaction corresponds to one share in the contract. In this example, the TotalIssuance is not fixed.

Example 14—Non-allocated seat ticket. In this example, the contract reads: "The holder is entitled to entry to The Jazz Jivers concert at Sadie's Pub on 29 Apr. 2016 at a rate of 1 entry ticket for every underlying 1000 satoshis. Only 137 spaces are available." The metadata is defined to represent the following critical parameters: NumShares=137; ShareVal=1 ticket; PeggingRate=1000. These parameters define a divisible contract limited to 137 shares, wherein a share in the contract has a value of 1 ticket, and wherein each multiple of 1000 satoshis within the transaction corresponds to one share in the contract. In this embodiment, the TotalIssuance is 137 tickets.

Example 15—A music file. In this example, the contract reads: "The holder is entitled to one copy of The Dead Lizard's album 'Chameleon Rising.'" The metadata is defined to represent the following critical parameters: NumShares=0; ShareVal=1 album; PeggingRate=0. These parameters define an unlimited and indivisible contract, wherein a share in the contract has a value of 1 file corresponding to or containing the album, and wherein any amount of underlying Bitcoin within the transaction corresponds to one share in the contract. In this example, the TotalIssuance is not fixed.

Example 16—Item of furniture from a catalogue. In this example, the contract reads: "The holder is entitled to this stunning and unique antique Georgian escritoire in excellent condition." The metadata is defined to represent the following critical parameters: NumShares=1; ShareVal=1 item; PeggingRate=0. These parameters define an indivisible contract limited to one share, wherein a share in the contract has a value of 1 item, and wherein any amount of underlying Bitcoin within the transaction corresponds to one share in the contract. In this example, the TotalIssuance is 1 item.

Example 17—Golf balls by the batch. In this example, the contract reads: "The holder is entitled to premium quality Tigger Wodes class 'A' golf balls at a rate of 12 balls for every underlying 600 satoshis." The metadata is defined to represent the following critical parameters: NumShares=0; ShareVal=12 golf balls; PeggingRate=600. These parameters define an unlimited and divisible contract, wherein a share in the contract has a value of 12 golf balls, and wherein each multiple of 600 satoshis within the transaction corresponds to one share in the contract. In this example, the TotalIssuance is not fixed.

Processing Device

As noted above, the issuer (I) 3, first user (A) 5 and second user (B) 7 may be associated with a first processing device 13, second processing device 15, and a third processing device 17. The peer-to-peer distributed ledger 9 may also be associated with multiple processing devices 19.

Such a processing device may be part of an electronic device, such as a computer, tablet computer, mobile communication device, computer server etc. In addition to a processing device, the electronic device may include a data store 11 and a user interface.

Figure 13:
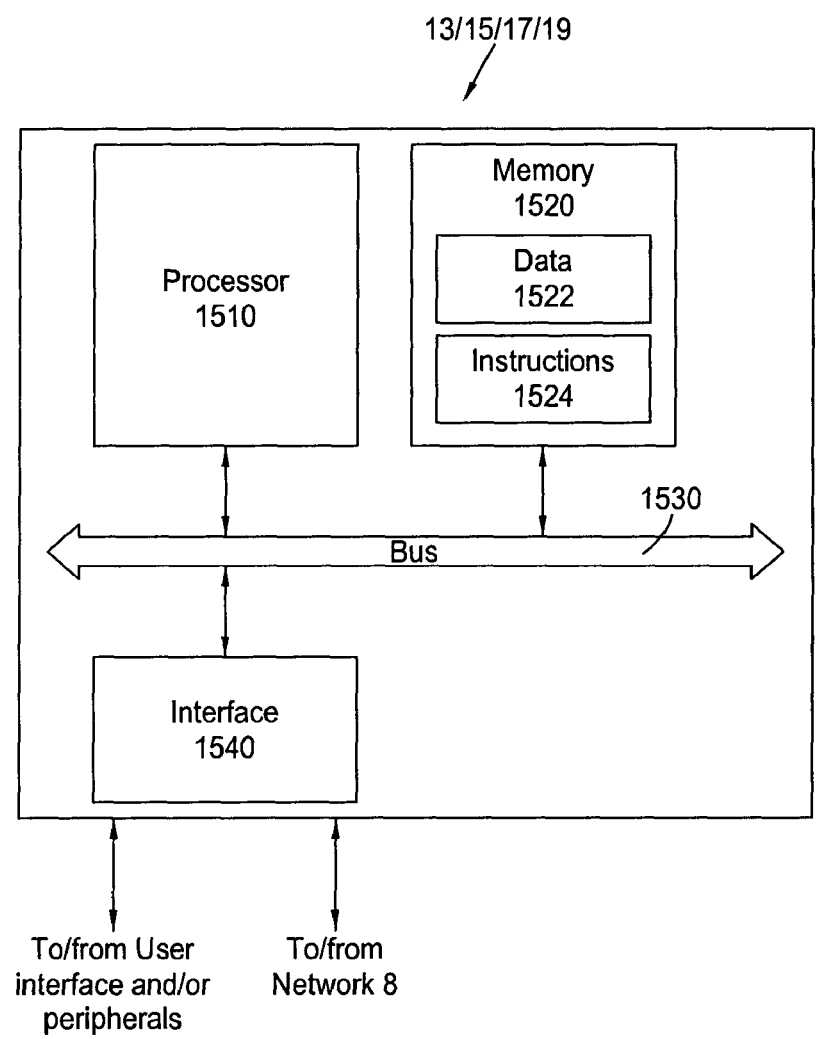
FIG. 13 illustrates a schematic example processing device.

FIG. 13 illustrates an example of a processing device 13, 15, 17, 19. The processing device 13, 15, 17, 19 includes a processor 1510, a memory 1520 and an interface device 1540 that communicate with each other via a bus 1530. The memory 1520 stores instructions and data for implementing the methods 100, 200, 300, 400, 500, 600, 700, 800 described above, and the processor 1510 performs the instructions from the memory 1520 to implement the methods. The interface device 1540 may include a communications module that facilitates communication with the communications network 8, and, in some examples, with the user interface and peripherals such as data store 11. It should be noted that although the processing device 1501 may be independent network elements, the processing device may also be part of another network element. Further, some functions performed by the processing device may be distributed between multiple network elements. For example, the issuer (I) 3 may have multiple processing devices 13 to perform methods 100, 200, 300, 400 in a secure local area network associated with the issuer (I) 3.

Where this disclosure describes that a user, issuer, merchant, provider or other entity performs a particular action (including signing, issuing, determining, calculating, sending, receiving, creating etc.), this wording is used for the sake of clarity of presentation. It should be understood that these actions are performed by the computing devices operated by these entities.

Signing may comprise executing a cryptographic function. The cryptographic function has an input for a clear text and an input for a key, such as a private key. A processor may execute the function to calculate a number or string that can be used as a signature. The signature is then provided together with the clear text to provide a signed text. The signature changes completely if the message text or the key changes by a single bit. While calculating the signature requires little computational power, recreating a message that has a given signature is practically impossible. This way, the clear text can only be changed and accompanied by a valid signature if the private key is available. Further, other entities can easily verify the signature using the publicly available public key.

In most circumstances, encrypting and decrypting comprises a processor executing a cryptographic function to calculate an output string representing the encrypted message or a clear text message respectively.

Keys, tokens, metadata, transactions, offers, contracts, signatures, scripts, metadata, invitations, and the like refer to data represented as numbers, text or strings stored on data memory, such as variables in program code of type "string" or "int" or other types or text files.

An example of the peer-to-peer ledger is the Bitcoin blockchain. Transferring funds or paying fees in Bitcoin currency comprises creating a transaction on the Bitcoin blockchain with the funds or fees being output from the transaction. An example of a Bitcoin transaction includes an input transaction hash, a transaction amount, one or more destinations, a public key of a payee or payees, and a signature created by using the input transaction as the input message and a private key of a payer to calculate the signature. The transaction can be verified by checking that the input transaction hash exists in a copy of the Bitcoin blockchain and that the signature is correct using the public key. To ensure that the same input transaction hash has not been used elsewhere already, the transaction is broadcast to a network of computing nodes ("miners"). A miner accepts and records the transaction on the blockchain only if the input transaction hash is not yet connected and the signatures are valid. A miner rejects the transaction if the input transaction hash is already linked to a different transaction.

Allocating cryptocurrency for a token comprises creating a transaction with the allocated cryptocurrency and the token represented in a metadata field in the transaction.

When two items are associated, this means that there is a logical connection between these items. In a database, for example, identifiers for the two items may be stored in the same records to make the two items associated with each other. In a transaction, identifiers for the two items may be included in the transaction string to make the two items associated with each other.

Using the Bitcoin protocol, redeeming a script and/or unlocking a token comprises calculating a signature string of the script and/or transaction using the private key. The script may require more than one signature derived from different private keys or other conditions. The output of this transaction is then provided to a miner.

Authorising another entity may comprise calculating a signature string of a transaction using a private key and providing the signature string to the entity to allow the entity to use the signature to verify the transaction.

A user having an account with another entity may comprise the entity storing information about the user, such as email address, name and potentially public keys. For example, the entity may maintain a database, such as SQL, OrientDB, MongoDB or others. In some examples, the entity may also store one or more of the user's private keys.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented tokenisation method implemented on a blockchain having a blockchain protocol, the computer-implemented tokenisation method comprising:
   generating a blockchain transaction (Tx) having an output (TxO) related to a quantity of cryptocurrency (B1) and a locking script comprising:
      metadata comprising information associated with a token (T1) that is transferrable through the blockchain transaction (Tx), wherein the token (T1) represents a tokenised entity, wherein the metadata includes randomly generated values and contract terms; and
      at least one public cryptographic key;
   receiving, over a communications network, a request from a user for the token (T1);
   allocating the quantity of cryptocurrency (B1) for association with the token (T1), wherein the allocating comprises:
      determining a pegging rate (PR1) for the token (T1) that defines a relationship between the quantity of cryptocurrency and a fiat currency value;
      determining a token value (TV1) in the fiat currency; and
      determining the quantity of cryptocurrency (B1) based on the pegging rate (PR1) and the token value (TV1), wherein the quantity of cryptocurrency (B1) has a market value in the fiat currency less than the token value (TV1); and
   sending, over the communications network, a data output to a peer-to-peer distributed ledger comprising the blockchain transaction (Tx) including the output (TxO) and the locking script, wherein:
      the pegging rate (PR1) fixes the token value to the fiat currency value; and
      the contract terms in the metadata that specify the token (T1) is redeemable for the token value (V1) in the fiat currency.

2. The computer-implemented tokenisation method according to claim 1, wherein the token (T1) is provided in a metadata field of the metadata in the blockchain transaction (Tx).

3. The computer-implemented tokenisation method according to claim 1, further comprising:
   storing the tokenised entity on or off the blockchain; and/or
   providing an unlocking script that meets requirements of the locking script for the output (TxO) to transfer ownership of the quantity of cryptocurrency (B1) to a redeeming party or user.

4. The computer-implemented tokenisation method according to claim 1, wherein the metadata further comprises a pointer to a file, control data, information relating to a contract, and/or information relating to how to process the blockchain transaction (Tx).

5. The computer-implemented tokenisation method according to claim 1, wherein the metadata is:
   hashed; and/or
   provided in the locking script of the output (TxO) as a cryptographic key.

6. The computer-implemented tokenisation method according to claim 1, wherein: the locking script comprises an operation that compares signatures with public keys; and/or
   the blockchain transaction (Tx) is an N-of-M blockchain transaction.

7. The computer-implemented tokenisation method according to claim 1, wherein the token (T1) relates to a contract and the blockchain transaction (Tx) and/or the metadata comprises parameters or data items indicating:
   an amount of shares available under the contract;
   a quantity of transfer units to be transferred from a sender to at least one recipient; and
   a factor for calculating a value for the quantity of transfer units.

8. The computer-implemented tokenisation method according to claim 1, wherein allocating the quantity of cryptocurrency (B1) for association with the token (T1) comprises:
   determining a minimum threshold (MT1) of the quantity of cryptocurrency (B1) of the token (T1); and
   determining the quantity of cryptocurrency (B1) that is at or above the minimum threshold (MT1).

9. The computer-implemented tokenisation method according to claim 1, wherein the metadata is provided within the blockchain transaction (Tx) such that:
   a blockchain protocol is agnostic to presence of the token (T1) and/or other metadata in the locking script;
   the metadata is usable as another token; and
   transfer of the token (T1) is performed via the blockchain without alteration of the blockchain protocol.

10. The computer-implemented tokenisation method according to claim 1, further comprising:
    sending or receiving, over a communications network, a request for the token (T1); or
    embedding additional information in the metadata to associate a second token (T2) with the token (T1).

11. The computer-implemented tokenisation method according to claim 1, wherein each of the at least one public cryptographic key forms a cryptographic pair with a corresponding private key, and wherein at least a portion of the cryptographic pair is stored in an electronic wallet or a data store.

12. A non-transitory computer-readable medium comprising executable instructions that, as a result of execution by one or more processors of a processing device, cause the processing device to implement a computer-implemented tokenisation method implemented on a blockchain having a blockchain protocol, the computer-implemented tokenisation method comprising:
    generating a blockchain transaction (Tx) having an output (TxO) related to a quantity of cryptocurrency (B1) and a locking script comprising:
       metadata comprising information associated with a token (T1) that is transferrable through the blockchain transaction (Tx), wherein the token (T1) represents a tokenised entity, wherein the metadata includes randomly generated values and contract terms; and
       at least one public cryptographic key;
    receiving, over a communications network, a request from a user for the token (T1);
    allocating the quantity of cryptocurrency (B1) for association with the token (T1), wherein the allocating comprises:
       determining a pegging rate (PR1) for the token (T1) that defines a relationship between the quantity of cryptocurrency and a fiat currency value;

determining a token value (TV1) in the fiat currency; and determining the quantity of cryptocurrency (B1) based on the pegging rate (PR1) and the token value (TV1), wherein the quantity of cryptocurrency (B1) has a market value in the fiat currency less than the token value (TV1); and sending, over the communications network, a data output to a peer-to-peer distributed ledger comprising the blockchain transaction (Tx) including the output (TxO) and the locking script, wherein:

the pegging rate (PR1) fixes the token value to the fiat currency value; and the contract terms in the metadata that specify the token (T1) is redeemable for the token value (V1) in the fiat currency.

13. A device comprising:
one or more processors; and
memory storing executable instructions that, as a result of execution by the one or more processors, cause the device to perform a computer-implemented tokenisation method implemented on a blockchain having a blockchain protocol, the computer-implemented tokenisation method comprising:

generating a blockchain transaction (Tx) having an output (TxO) related to a quantity of cryptocurrency (B1) and a locking script comprising:

metadata comprising information associated with a token (T1), wherein the token (T1) represents a tokenised entity that is transferrable through the blockchain transaction, wherein the metadata includes randomly generated values and contract terms; and at least one public cryptographic key;

receiving, over a communications network, a request from a user for the token (T1);

allocating the quantity of cryptocurrency (B1) for association with the token (T1), wherein the allocating comprises:

determining a pegging rate (PR1) for the token (T1) that defines a relationship between the quantity of cryptocurrency and a fiat currency value;

determining a token value (TV1) in the fiat currency; and determining the quantity of cryptocurrency (B1) based on the pegging rate (PR1) and the token value (TV1), wherein the quantity of cryptocurrency (B1) has a market value in the fiat currency less than the token value (TV1); and sending, over the communications network, a data output to a peer-to-peer distributed ledger comprising the blockchain transaction (Tx) including the output (TxO) and the locking script, wherein:

the pegging rate (PR1) fixes the token value to the fiat currency value; and the contract terms in the metadata that specify the token (T1) is redeemable for the token value (V1) in the fiat currency.

* * * * *